(12) United States Patent
Tietzen et al.

(10) Patent No.: US 11,710,160 B2
(45) Date of Patent: Jul. 25, 2023

(54) SYSTEMS AND NON-TRANSITORY COMPUTER-READABLE MEDIUM FOR COMMUNITY MERCHANT CROSS SELLING/PROMOTING WITH SHARED ECOMMERCE SHOPPING CART FOR ITEMS SELECTED BY COMMUNITY RESIDENTS INCENTED TO CONDUCT TRANSACTIONS TO INCENT COMMUNITY DONATIONS

(71) Applicants: Terrance Patrick Tietzen, Edmonton (CA); Richard M Balan, Edmonton (CA)

(72) Inventors: Terrance Patrick Tietzen, Edmonton (CA); Richard M Balan, Edmonton (CA)

(73) Assignee: EDATANETWORKS INC., Edmonton (CA)

(*) Notice: Subject to any disclaimer, the term of this patent is extended or adjusted under 35 U.S.C. 154(b) by 9 days.

(21) Appl. No.: 16/170,186

(22) Filed: Oct. 25, 2018

(65) Prior Publication Data

US 2019/0130462 A1    May 2, 2019

Related U.S. Application Data

(60) Provisional application No. 62/580,130, filed on Nov. 1, 2017.

(51) Int. Cl.
*G06Q 30/0601* (2023.01)
*G06Q 30/0226* (2023.01)
*G06Q 30/0279* (2023.01)

(52) U.S. Cl.
CPC ..... *G06Q 30/0605* (2013.01); *G06Q 30/0226* (2013.01); *G06Q 30/0279* (2013.01); *G06Q 30/0625* (2013.01); *G06Q 30/0635* (2013.01)

(58) Field of Classification Search
CPC . G06Q 30/0601–0645; G06Q 30/0605; G06Q 30/0226; G06Q 30/0279; G06Q 30/0625; G06Q 30/0635

(Continued)

(56) References Cited

U.S. PATENT DOCUMENTS

| 2004/0093302 A1* | 5/2004 | Baker | G06Q 30/0613 |
| | | | 705/37 |
| 2012/0078731 A1* | 3/2012 | Linevsky | G06Q 30/0603 |
| | | | 705/14.73 |

(Continued)

OTHER PUBLICATIONS

Smith, Kit. The Complete Guide to Cause Marketing. Published Nov. 23, 2016 by Brandwatch. Accessed via https://www.brandwatch.com/blog/cause-marketing/ (Year: 2016).*

*Primary Examiner* — Allison G Wood
(74) *Attorney, Agent, or Firm* — Bradley K. DeSandro; DeSandro Law Group PLLC

(57) ABSTRACT

A series of associated merchant websites or respective merchant websites each selling narrowly defined product categories to shoppers who browse to select products for placement into a shopping cart. While each website is operated and controlled by a different merchant or a single merchant, each website has access to a shared server farm where information about each shopper is stored. Also shared is a virtual e-commerce shopping cart that the shopper can use to check out at any of the merchant websites even though the virtual e-commerce shopping cart may contain products from multiple different merchant websites. Each merchant website is associated with metadata limited to the narrowly defined product category, thereby providing enhanced SEO benefits without the need to purchase ad words. Each boutique specifically targets a single category making the shopping and buying experience easier. Information gath- (Continued)

ered from shoppers at each unique boutique is stored at the server farm for being shared with other associated merchants in the collection of sites. A shopper's user account will transfer between sites and allow the data gathered to be used in a cross-promotional method and will ensure the shopper's experience is consistent with what they like and want in future visits. Moreover, a merchant incentivizes an account holder to make an authorized transaction by terms and agreement to auditably donate to the account holder's affinity entity. To incent desirable commerce with locals, the merchant's terms may limit its donation by a derivation of navigation time between account holder and merchant, and/or by date and time of the transaction. The account holder can direct the donation to one of more affinity entities within their own community, and/or within a community where the transaction was physically conducted. An account holder can also donate at the time of transaction where the donation is paid by the account's issuer for reimbursement as a debit to the account holder's account statement. Other payment system participants may donate (the merchant's acquirer, issuer, and transaction handler for the issuer and acquirer), by way of favorable interchange rates, can also make audible donations to account holder directed affinities entities.

18 Claims, 35 Drawing Sheets

(58) Field of Classification Search
USPC .................................. 705/26.1–27.2, 26.2
See application file for complete search history.

(56) References Cited

U.S. PATENT DOCUMENTS

| 2015/0317668 A1* | 11/2015 | Tietzen | G06Q 30/0276 705/14.39 |
| 2016/0019628 A1* | 1/2016 | Udumudi | G06Q 30/0633 705/26.8 |
| 2016/0104131 A1* | 4/2016 | Layng | G06Q 30/0601 705/26.1 |

* cited by examiner

*Fig. 1a*
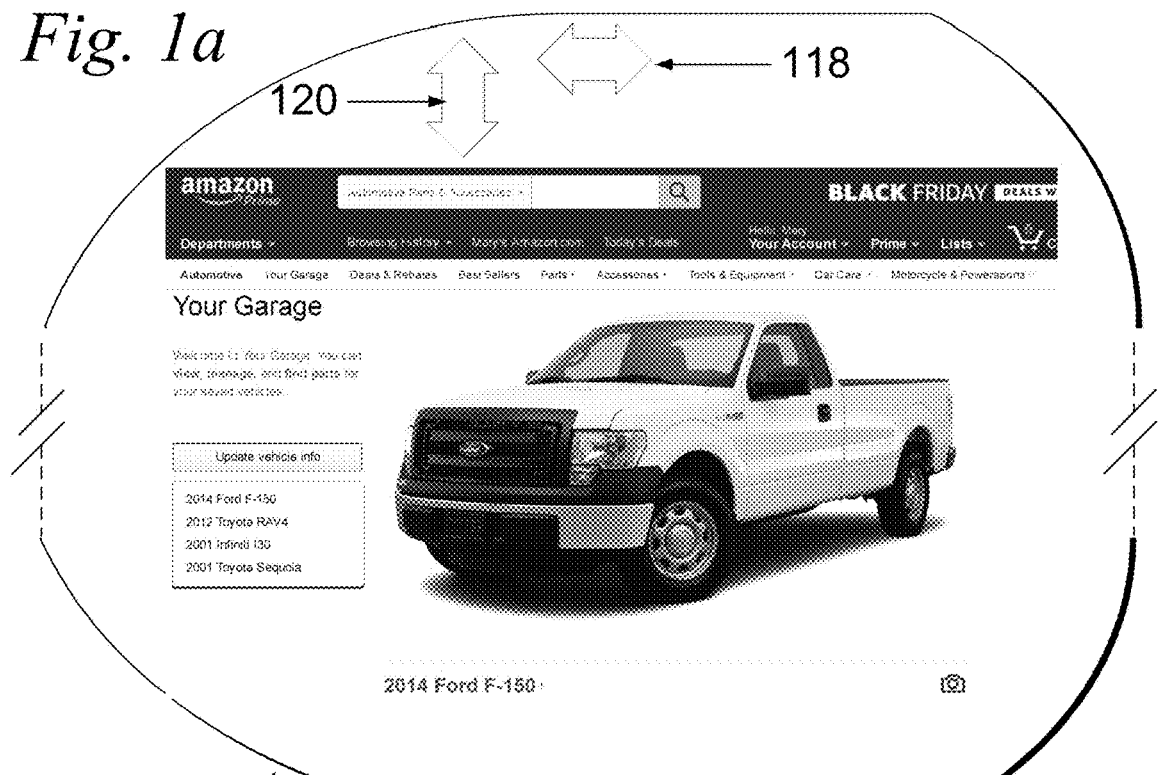
*Prior Art*
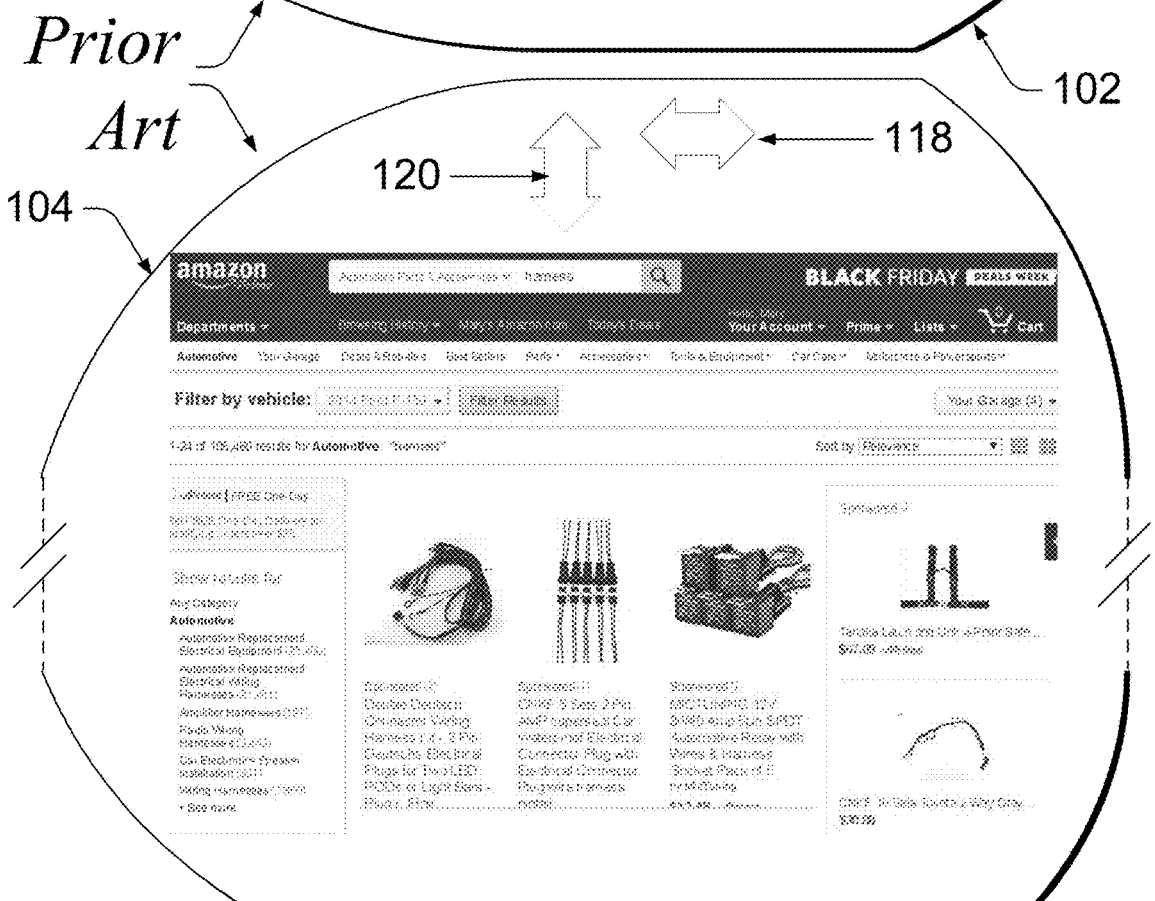
*Fig. 1b*

*Prior Art*

SYSTEMS AND NON-TRANSITORY COMPUTER-READABLE MEDIUM FOR COMMUNITY MERCHANT CROSS SELLING/PROMOTING WITH SHARED ECOMMERCE SHOPPING CART FOR ITEMS SELECTED BY COMMUNITY RESIDENTS INCENTED TO CONDUCT TRANSACTIONS TO INCENT COMMUNITY DONATIONS

RELATED APPLICATION

This application claims priority to U.S. Provisional Application Ser. No. 62/580,130, titled "Community Merchant Cross Selling/Promoting With Shared eCommerce Shopping Cart For Items Selected By Community Residents Incented To Conduct Transactions To Incent Community Donations," which was filed in Nov. 1, 2017, which is incorporated herein by reference. This application is related to U.S. patent application Ser. No. 13/748,459, titled "Authorized Transaction Incented By Merchant Donation," filed Jan. 23, 2013, and published May 15, 2014, as US Patent Application Publication No. US 2014/0136300A1, which is incorporated herein by reference.

This application relates to U.S. patent application Ser. No. 15/915,248, titled "Web Address Agnostic Transaction Consolidating Multi-Merchant Purchases," filed on Mar. 8, 2018, published as Publication No. US-2018-0260874-A1 on Sep. 13, 2018, which is incorporated herein by reference.

FIELD

Implementations generally relate to electronic shopping, online shopping, or e-commerce, and more particularly relate to systems and methods enabling a shopper to enter search terms that are used to identify goods and services associated with or related to a common good or service, present to the shopper for selection and purchase only those goods and services that are associated with or related to the common good or service, which presented goods and services are being offered for sale by a variety of different merchants, or a single merchant with a network of connected sites, by way of rendering of corresponding displays to the shopper's browser by service of one or more webpages from each of the merchants' respectively different websites, allow the shopper to select from among the presented goods and services for placement in the shopper's virtual shopping cart, and then enable the shopper to conduct a single transaction to purchase all of the goods and services in the shopper's virtual shopping cart at the same time from a checkout procedure offered to the shopper from any one of the merchants' respective different websites.

Implementations further relate to an incentive by a merchant to encourage a consumer to make a purchase, and more particularly to the merchant providing the incentive of making a donation in exchange for the consumer conducting a transaction with the merchant on an account issued to the consumer by an issuer.

BACKGROUND

E-commerce is an effective, convenient and efficient way for shoppers to conduct transactions with merchants worldwide to buy goods and services. In prior art applications, the merchant having merchandise to offer typically implements a website at a merchant server, which may be maintained by the merchant's staff or hosted at a hosting facility. The merchant website typically includes a product database, representing the database of products to be sold, and a shopper database, representing the database of the merchant's shoppers and their respective profiles. To facilitate the transaction process, a variety of search, virtual shopping cart, and checkout tools may be provided. In general, these tools facilitate the interaction between a specific merchant website and the shopper. On the shopper's side, the interaction typically takes place through a software application installed on the user's computer device, or by way of an appropriate user interface at the shopper's computer terminal that may be executing a user interface in the form of a browser (e.g., Google Chrome, Microsoft Internet Explorer).

To facilitate discussion, FIGS. 1a-1b illustrate respective screen shots 102, 104 of a user interface of a prior art e-commerce arrangement between a browser operating on a consumer device and the vendor Amazon. To facilitate their electronic commerce activities, the interaction between the consumer and Amazon is facilitated through the shopper's computer terminal with which the shopper enters the URL (Universal Resource Locator) http://www.amazon.com to access that website with the browser, where the website and the shopper's computer terminal are connected to the World Wide Web. To conduct an e-commerce transaction with Amazon via the World Wide Web, the shopper typically utilizes a commercially available browser executing on the shopper's computer terminal.

An e-commerce application known as "My Garage" is shown in FIGS. 1a/1b. The My Garage application presented to the shopper is an aftermarket automotive parts shopping experience. In this experience, Amazon offers aftermarket automotive parts that are available for same either from Amazon or from a number of other merchants. In Amazon's approach, a single URL (e.g., //http:www.AMAZON.com) serves multiple webpages. Each webpage is limited to showing only those parts to the shopper that are specific to a particular make and model of a vehicle that the shopper has selected from a pull down menu shown in the list called "Your Garage" in FIG. 1a. This menu is populated only with automobiles specified as being owned by the shopper. As such, that the shopper only sees aftermarket automotive parts and accessories on webpages that are relevant to the shopper's aftermarket automotive parts search for a specific vehicle. By way of example, FIG. 1a shows the shopper selecting the "2015 Ford F-150" as the automobile for which aftermarket automotive parts are being sought for purchase from among the other vehicles shown in the pull down menu for "Your Garage", and FIG. 1b shows the shopper having entered the search term "harness" with the result that the only products that are displayed for sale are harness automotive parts or accessories that are specifically designed to be aftermarket parts for the "2015 Ford F-150" automobile. Although Amazon offers automotive parts to the shopper that are available for sale from Amazon or from a number of other merchants, a limitation of Amazon's My Garage application is that the shopper is limited to only one (1) Amazon website where the shopper can purchase the goods and services in the shopper's electronic shopping cart.

FIG. 2 is a flowchart illustrating an exemplary prior art process for a shopper 202 to shop for multiple different goods and services and then conduct an electronic purchasing transaction at a website 204 by way of a check-out application 208 provided by a merchant that provides generic support functionalities 206. As shown in FIG. 2, a customer is provided with service in a traditional way in which the customer 202 visits "Site 1" 204, adds items into the customer's virtual shopping cart via website support 206, and the checks out of "Site 1" by way of checkout functionality 208 to purchase item(s) in the customer's virtual shopping cart. This prior art process is typical of an e-commerce merchant website that offers a particular type of good or service, and is presently what most users experience while using the Internet. A user visits a site and when they determine what they want to purchase. They then check out and purchase the items from the same e-commerce merchant website. Note, however, that data collected from the customer is not shared with any other merchant at any other merchant website. As such, each merchant's website at which the customer shops will be required to collect data from the customer and to provide the customer with a separate user experience varying from one merchant to another.

FIG. 3 illustrates a screen shot 300 characterizing an exemplary prior art user interface for the sale of floor liner parts for automotive vehicles at the merchant "Floor Liner Canada". Note that the shopper can visit this webpage at this website to enter the customer's shipping address after adding multiple items into the shopper's electronic shopping cart, and thereafter the customer will pay for the items in the shopping cart for shipment to the customer-entered shipping address. Screen shot 300 can be used in conjunction with a typical user experience including but not limited to keyboard data entry, pull down menus, etc. Horizontal 318 and vertical 320 panning can be user activated to move that portion of the display that is being rendered horizontally and vertically, respectively.

Another prior art e-commerce arrangement is presented in US Patent Application Publication No. US 2013/0133056 A1, which describes an e-commerce process for customers to conduct online shopping at multiple retailer websites using a single login identifier that allows prospective consumers to access various retailer websites on the Internet without the need to remember multiple logins and passwords or to log into such retailer websites each time the consumers uses a new electronic device. However, limitations of this prior art e-commerce arrangement are that the shopper is required to interact with third party vendors who are unrelated and unconnected, and the shopper is not provided with any vendor cross-selling capabilities among the vendors, each vendor website that the shopper visits requires a separate permission form the vendor, and the shopper is required to check-out via a third party at only one (1) website.

Yet another prior art e-commerce arrangement is presented in International Publication No. WO 01/01313 A2, which describes centrally implemented multi-vendor central processing unit acting cooperatively with a centrally implemented multi-vendor shared data store. In this prior art application, the e-commerce consumer is offered to make purchase selections from one of several different merchants, each selection being placed in a shared shopping cart to proceed to a shared, multi-vendor checkout, rather than implementing the checkout procedure at individual vendor websites. Also described is how each respective merchant website has access to a server farm (e.g., a Multi-Vendor Shared Data store) that includes a consumer database to track consumer profiles (i.e., shopper profiles) on behalf of the plurality of participating merchant websites. The information tracked by the consumer database for each consumer may include, for example, consumer personal information such as name, home address, phone number, payment method, and payment information (such as credit card information or deposit account information), as well as a unique shopper ID for uniquely identifying a consumer. The consumer profile for each consumer may also include a universal, cross-vendor virtual shopping cart into which items selected from a plurality of vendors may be deposited. However, limitations of this prior art e-commerce arrangement are that the vendors are required to be either co-operating vendors or the shopper is required to login with a password to an authentication system that is operated by a third party vendor. Also, the vendors are unrelated and unconnected and that, although the e-commerce application functions as a site or platform that allows the shopper to view third party products, the shopper is required to check-out at a only one (1) vendor server with a virtual shopping cart that navigates entirely to a third-party vendor for the shopper's check-out.

In another prior art e-commerce arrangement that is presented in US Patent Application Publication No. US 2014/0122203 A1, a multi-merchant virtual shopping cart collects goods and services to be purchased by operation of a web browser. The shopping cart can be used at a plurality of unrelated merchant shopping sites and remains within the browser regardless of the displayed website. The user is also able to save products from a plurality of shopping sites to the shopping cart or purchase products from the shopping cart at one time. For each product to be purchased, a purchase transaction is conducted, on behalf of the user, with the merchant associated with the website from which the user added the product to the virtual shopping cart. This Publication also describes how the user is able to commence a purchase transaction for one or more products via the electronic shopping cart or save products from a plurality of unrelated merchant shopping sites to the virtual shopping cart for retrieval later. In certain cases, conducting a purchase transaction may include retrieving a user-saved address and payment information, providing the information to the merchant associated with the purchase transaction, receiving a purchase confirmation from the merchant, and communicating the purchase confirmation to the user. The user may elect to purchase at one time a single product, multiple products from a single merchant shopping site, or multiple products from multiple unrelated merchants shopping sites that are saved to the electronic shopping cart. For each product to be purchased, a purchase transaction is conducted, on behalf of the user, with the merchant associated with the supported website from which the user added the product to the electronic shopping cart. However, limitations of this prior art e-commerce arrangement include that it uses a website that has an overlay that is not built into, and is external to, other vendor websites. In addition, although the described website saves products from unrelated unconnected sites and vendors, the shopper is required to check out at the website of each vendor using an individual pass code and username for each vendor or an authorization style application. Further limitations include the requirement that the shopper be presented with separate and different user interfaces at each different website that are unrelated and operated by unrelated vendors.

Yet another prior art e-commerce arrangement is presented in US Patent Application Publication No. US 2014/0244441, where an e-commerce shopping cart is described that is shared by multiple merchants, where the cart is a persistent cart of products online. The multi-merchant shared e-commerce virtual shopping cart can have products from a single vendor or from a variety of different vendors. However, limitations of this prior art e-commerce arrangement are that it functions like a plug-in for a third party e-commerce browsing site where all of the vendors are unrelated and where the shopper is required to use a check-out that is either an external vendor website or a third party partner website.

In another prior art e-commerce arrangement that is presented in U.S. Pat. No. 6,101,482, a customer chooses an item (e.g., a product or service) for subsequent purchase by putting each item in a virtual shopping cart via a Web browser that browses each of several different Web virtual stores. The virtual shopping cart is maintained across multiple independent transaction sessions across heterogeneous websites each of which corresponds to a different merchant. The shopper is able to suspend a purchasing decision about any item in the virtual shopping cart while comparison shopping across unaffiliated merchant websites before making a decision about which products in the virtual shopping cart to buy. However, limitations of this prior art e-commerce arrangement are that it functions like a plug-in for a third party e-commerce browsing site, the requirement that multiple different servers must be used, that all of the vendors and their respective websites are unrelated, the requirement that the shopper use separate logins for each vendor website in order to check-out, and the requirement that the shopper use a check-out that is either an external vendor website or a third party partner website.

One known limitation in prior art e-commerce applications is the necessity to purchase one or more 'ad words' in order to attract commercial traffic to an e-commerce website. This ad service is largely focused on keywords that are 'sold' to operators of e-commerce websites at which goods and sales are offered for sale that are associated with or related to the keywords that are sold by the ad service to the operators of e-commerce websites. By way of example, an 'ad word' can be sold as an advertising service to businesses that wants to display advertisement on a search engine's results and the search engine's advertising network (e.g., the Google search engine). This advertising service enables businesses to set a budget, which can be prohibitively expensive, for advertising and pay when people operate browsers to click the ads corresponding to the ad words sold to the business by the advertising service.

Given the above and other numerous problems imposed upon shoppers and merchants in prior art electronic shopping systems and methods, it would be an advance in the relevant arts to provide methods and systems that provide the following five (5) advantages (hereinafter, the "Five Advantages"): (i) allow the shopper to use any one of several different merchant websites to check-out so as to purchase the selected goods and services in the shopper's virtual shopping cart that the shopper selected from any of the several different merchant websites; (ii) allow merchants to collect shopper data that can be shared with any other merchants' websites so that any merchant will have cross-selling capabilities among the merchants; (iii) allow the shopper to avoid interacting with third party vendors, such as when performing an electronic checkout function with the shopper's virtual shopping cart, where the vendor are unrelated and unconnected; (iv) allow the shopper to shop with different merchants at different webpages without requiring the shopper to use a separate permission or log-in for each different merchant; and (v) to avoid and reduce the need to purchase 'ad words' in order to attract commercial traffic to the e-commerce website. The collection of affiliated and associated sites creates a conglomerate under an umbrella site that creates benefits for the users and the business (merchant-members) because of the connectivity and the sharing of data and rich user information.

Merchants often use techniques to prompt consumers into making a particular purchase. These techniques are commonly in the form of monetary incentives, relying on the principle that a lower price will result in increased sales. Merchants may employ these techniques, for example, to help clear inventory before a new season's merchandise is released, to ease the release of a new product, to increase sales near the end of the fiscal year, to compete with a competitor over particular products, or to generally spur sales. Monetary incentives may come in the form of a "sale" (i.e., temporary reduction in price at the register), a discount coupon, a mail-in rebate (i.e., a refund of part or the entire purchase price which is received by mail), or a store credit (i.e., credit that can be applied to another store purchase). These incentives usually only apply to a particular product and have a time component. For example, a sale may only apply to a particular brand of product purchased on a particular holiday weekend, and a rebate may only be valid for a particular product purchased within two weeks before the start of a school year.

Although consumers are typically incented to make purchases by a form of price reduction, non-monetary reasons also motivate consumers to make purchases with a merchant. For instance, the charitable actions by and intentions of a merchant may demonstrate to a consumer that the merchant is a force for good such that the consumer is non-monetarily incented to do business with the merchant who the consumer deems worthy of such support. As such, it would be an advance in the relevant arts to develop non-monetary incentive methodologies that will motivate a consumer to conduct a transaction with a merchant.

A problem for small to mid-sized merchants is that discount offers and rebates require time and attention at a Point of Service terminal (POS) at a brick and mortar store in order to ensure compliance with terms and conditions of the offer or rebate. The terms and conditions may require checks and verifications at the POS that include, date and time compliance with an offer or rebate, as well as product-specific data checks and verifications such as by examining Level 3 data, Stock Keeping Unit (SKU) data, serial number data, etc. Smaller merchants rarely have surplus time, neither at the POS nor post-transaction, to properly manage such checks, verifications, data tracking and administrations of these kinds of discounts and rebates. Accordingly, it would be an advance in the relevant arts to provide a system of incentives to consumers to conduct transactions with merchants, where the system requires little or no time of the merchant's time to be spent at the POS for the merchant to make good on the incentive to the customer.

Another problem for merchants, especially small to mid-sized merchants, is that an increasing number of transactions are conducted online with larger sized merchants instead of inside the brick and mortar stores of small to mid-sized merchants. Online transactions conducted with larger merchants can represent a loss in sales to traditional small and medium size merchants whose main business method tends to be attracting sales is a traditional retail, brick and mortar store environment, instead of by mail orders, telephone orders, and/or electronic commerce (e-commerce) transactions. The loss of the in-store purchase is a lost opportunity for the local merchant and local customer to build a sense of community by getting to know each other, personally, and a lost opportunity for the local customer to become a live advertisement for the merchant's retail store and its wares and services. Online sales also deny the traditional brick and mortar merchant an opportunity to sell customers in the retail environment best understood by the merchant. The loss of in-store purchases to online sales causes economic problems for traditional small and medium size merchants and the communities they serve. In some North American neighborhoods the number of small retail shops has dramatically declined, leaving traditional community commercial areas in a state of blight and disuse.

In addition to economic downturn sensitivities, small, family-owned stores also face extinction threats from sophisticated online retailers, with resultant losses to local community retail diversity and neighborhood health with the death of the neighborhood 'mom-and-pop' store. Neighborhood streets can seem vacant during the day and open only after 5 p.m. to serve the interests of only one demographic, namely young urban professionals with disposable income. Previously successful North American businesses have been closing when e-commerce competition from online auctions and retailers attract previously loyal neighbors. Accordingly, it would be an advance in the art of commerce to provide a system of incentives to neighborhood customers to engage in neighborhood brick and mortar, in-person transactions. It would be a further advance in the art of commerce to provide a system that gives incentives to customers to conduct transactions in the brick and mortar stores of neighborhood merchants so as to bring sales revenue into the neighborhood merchants and away from electronically competing, non-local merchants. It would be a still further advance in the art of commerce to provide a system that shifts sales tax revenue towards neighborhood authorities that would otherwise be lost to e-commerce transactions. It would also be an advance in the art of commerce to provide a system that incents local merchants in the community to receive foot traffic both from customers shopping with the merchant as well as incidentally from shoppers doing in-person shopping with other brick and mortar merchants. A yet further advance in the art of commerce would be to provide methods and systems that combine the aforesaid Five Advantages with a system that provides an incentive to a customer, who would have otherwise only window-shopped a product at the brick and mortar store of a local merchant but then buy that product on-line from an electronic competitor merchant, to buy that product at the brick and mortar store of the local merchant.

SUMMARY

In one computerized implementation, a customer operates a web browser to select and place into a virtual shopping cart goods and/or services from a plurality of different merchant e-commerce websites, where each merchant e-commerce website is a boutique that offers for sale a specialized, limited and focused offering of goods and/or services, where each merchant e-commerce website features search engine discoverable metadata identifying the specialized, limited and focused offering of goods and/or services, and where customer can check-out to purchase the contents of the virtual shopping cart in a single transaction at any of the merchant e-commerce websites so to make the single purchase transaction agnostic as to the web address of the merchant e-commerce website at which the single purchase transaction was conducted by the customer.

In another computerized implementation, a series of respective merchant websites each sell narrowly defined product categories to shoppers who browse to select products for placement into a shopping cart. While each website is operated and controlled by a different merchant or a single merchant with a network of specialized sites, all websites have access to a shared server farm where information about each shopper is stored. Having a conglomerate of sites under the umbrella will provide a user greater access to products of interest because of the ease to create a collection of sites of similar interest for the user. The collection of sites under the umbrella will also create rich a collection of rich user data that can be repurposed for cross selling. Having the opportunity to repurpose this type of rich data will provide the affiliated and associated merchant sites with information to create a successful user experience. Also shared is a virtual e-commerce shopping cart that the shopper can use to check out at any of the merchant websites even though the virtual e-commerce shopping cart may contain products from multiple different merchants. Each merchant website is associated with metadata limited to the narrowly defined product category corresponding to the website, thereby providing enhanced Search Engine Optimization (SEO) benefits without the need to purchase advertising words. Each boutique specifically targets a single category. Information gathered from shoppers at each unique boutique is stored at the server farm or in cloud based storage for being shared with other associated merchants in the collection of sites under the umbrella site concept.

The shopper, by way of example pertaining to an automotive parts aftermarket collection of website, enters vehicle information at a first website where there may also be a creation of a user account and collection of further personalization information that will be used to guide the user to other products at other specialized websites pertaining to the vehicle or the user's interests entered by the shopper, thereby providing a specific boutique or specialized site shopping experience. This user account will transfer between sites and allow the data gathered to be used in a cross-promotional method and will ensure that the user's experience is consistent with what they like and want as to purchase offers in future visits.

One or more implementations relate to computer-implemented methods and server-implemented methods where, for each transaction between an account holder and a merchant, information is received that is derived from an authorization response for the transaction, where the information includes the date and the time, a currency amount, and an identifier for the merchant. For each transaction for which the date and time of the corresponding authorization response are within a predetermined time period, and for each identifier for the merchant, there is a deriving of the sum of the currency amounts by using the identifier for the merchant to access a database to retrieve (i) the logical address for the merchant, or its agent, corresponding to the identifier for the merchant and (ii) a business rule for making a donation corresponding to an identifier for an affinity entity or charity having a logical address, wherein in the currency amount of each donation is a function, at least in part, of the currency amount of each transaction. A transmission is made to the logical address for the merchant, or its agent, that includes the donation to the affinity entity or charity for the predetermined time-period. Within a predetermined audit time-period before and after the predetermined time-period, a plurality of donation receipts is received, each including (i) the respective identifiers for the affinity entity or charity and the merchant and (ii) a currency amount. For each identifier for the merchant, the sum of the currency amounts of the donation receipts for each identifier for the affinity entity or charity is derived.

After the predetermined audit time-period for the predetermined time, for each identifier for the merchant, and for each identifier corresponding to each affinity entity or charity to whom a donation was to be made as per the retrieved business rule, a determination is made of a difference between: (i) the donation for the predetermined time period that was transmitted to the logical address of the merchant, and (ii) the sum of the currency amounts of the donation receipts received for the affinity entity or charity for the predetermined time period. Then, the determined difference is transmitted to the logical address for the merchant, or its agent.

In various implementations, an account issued by an issuer to an account holder can be a revolving credit account, a debit account, a charge account, an Automatic Teller Machine (AMT) account, a prepaid account, a gift account, etc. Also, a shared eCommerce shopping cart, as disclosed herein, can be a method of payment.

In other implementations, the affinity entities to which the merchant donates can be limited to those within the merchant's community, within the account holder's community, within both communities, or within neither community. In still further implementations, the account holders can designate those affinity entities to which the merchant is to make a donation, regardless of the location or charitable object or mission of the affinity entity. In yet other implementations, an acquirer for the merchant to a transaction can make the donation on the merchant's behalf incident to clearing and settling the transaction with the issuer that issued the account to the account holder, and where, optionally, the acquirer's donation can be in the form of an adjustment to exchange rate assessed to the merchant against the transaction amount for conducting the transaction on the account holder's account. Other participants in a payment processing system, including the issuer and the transaction handler, can similarly make donations as further incentives to the account holder to conduct a transaction on the account holder's account.

In still further implementations, in an open loop cashless payment system for making charitable donations, the merchant funds and makes direct payment of all donations to the merchant's designated affinity entities or charities according to a merchant designated business rule, wherein, in a variation thereof, the merchant funds and makes direct payment of all donations to merchant's designated affinity entities or charities that are located in, and/or provide services to, the merchant's neighborhood, which may be defined geographically or by other definitions.

In yet further implementations, in an open loop cashless payment system for making charitable donations, the merchant funds and the merchant's acquirer makes direct payment, incident to a process of closing and settlement, of all donations to all affinity entities or charities for those transaction conducted by account holders with the merchant on respective accounts issued to the account holder by respective issuers.

In still further implementations, in an open loop cashless payment system for making charitable donations, the merchant funds the charitable donations and the merchant's acquirer makes direct payment, incident to a process of closing and settlement, of all donations to all charities for those transaction conducted by the account holders with the merchant on respective accounts issued to respective account holders by respective issuers, wherein, in a variation thereof, the donations are made to those affinity entities or charities having a physical location within the merchant's neighborhood, which may or may not be a geographically defined community.

In yet further implementations, the merchant funds and makes direct payment of donations to account holder-designated charities for those transactions conducted by the account holder with the merchant.

In still further implementations, in an open loop cashless payment system for making charitable donations, the merchant funds and makes direct payment of all donations to all account holder designated charities for those transactions conducted by the account holder with the merchant on an account issued to the account holder by an issuer, wherein, in a variation thereof, the donations are made to those charities having a physical location within the merchant geographically defined community.

In still further implementations, in an open loop cashless payment system for making charitable donations, both the merchant and its acquirer fund donations to charities, incident to a process of closing and settlement, of all donations to all account holder designated charities for those transaction conducted by the account holder with the merchant on an account issued to the account holder by an issuer, wherein, in a variation thereof, the donations are made to those charities designated by the account holder, which charities may have a physical location within a neighborhood where the account holder resides and the merchant's brick and mortar store is located. In a still further variation thereof, a downward adjustment is made to an exchange fee assessed to the merchant by the merchant's acquirer such that the merchant is able to pay a lower exchange fee to compensate for the merchant's charitable contribution, and, optionally, the acquirer for the transaction can also pay the same local charities a donation out of increased transaction volume due to the incentive.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches at least a portion of the merchant's contribution to the affinity entity or charity by the account holder's issuer making direct payment to that affinity entity or charity incident to a process of closing and settlement such as by way of a charge for the account holder's charitable donation that is rendered as a statement debit on the account holder's periodic revolving credit account statement.

In still other implementations, methods and systems providing the aforesaid Five Advantages are used in combination with implementations mentioned above for merchant donations to account holder designated charities for those transactions conducted by the account holder with the merchant on an account issued to the account holder by an issuer.

Variations on the foregoing implementations include allowing the customer to specify one or more affinity entities (e.g., charities) that provide goods and/or services in their local community to which donations are to be made by merchants with whom the customer conducts transactions. In such implementations, each merchant is given notice of its total periodic obligatory donations. Such notice, however, is given without providing the merchant with any notice or knowledge as to the specific identity of those affinity entities that are to be its recipients. Such implementations leave the direction of merchant's donations fully within the discretion of the merchant's customers. In some implementations, the customer's discretion can be limited by the restriction that the customer can only select affinity entities from among those that serve the local community in common to both the merchant and the customer, while leaving the actual amount of the merchant's donation fully within the discretion of the merchant. Variations on such implementations include alternative definitions for the local community in common to both the merchant and the customer.

Still further variations on the foregoing implementations include deriving a donation to be made by the merchant to the affinity entity for a predetermined time-period by using a merchant donation business rule as well as a rule previously specified by the account holder who conducts the transaction with the merchant. By way of example, and not by way of limitation, the merchant's donation business rule might choose the amount of the donation whereas the account holder's rule might choose the affinity entity that is not located in the same community or either the merchant of the account holder.

It will be appreciated that the foregoing summary merely describes exemplary implementations to which claimed subject matter is not limited.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 1a-1b illustrate respective screen shots showing user interfaces for a prior art e-commerce arrangement between a browser-operating consumer and a vendor;

FIG. 4 is also an example of the associate and affiliate site concept which as a member of the umbrella site. This provides a benefit to both the merchant sites and the user;

FIG. 6 is also an example of how both associated and affiliated sites become part of the conglomerate of sites under the umbrella of sites;

Figure 2:
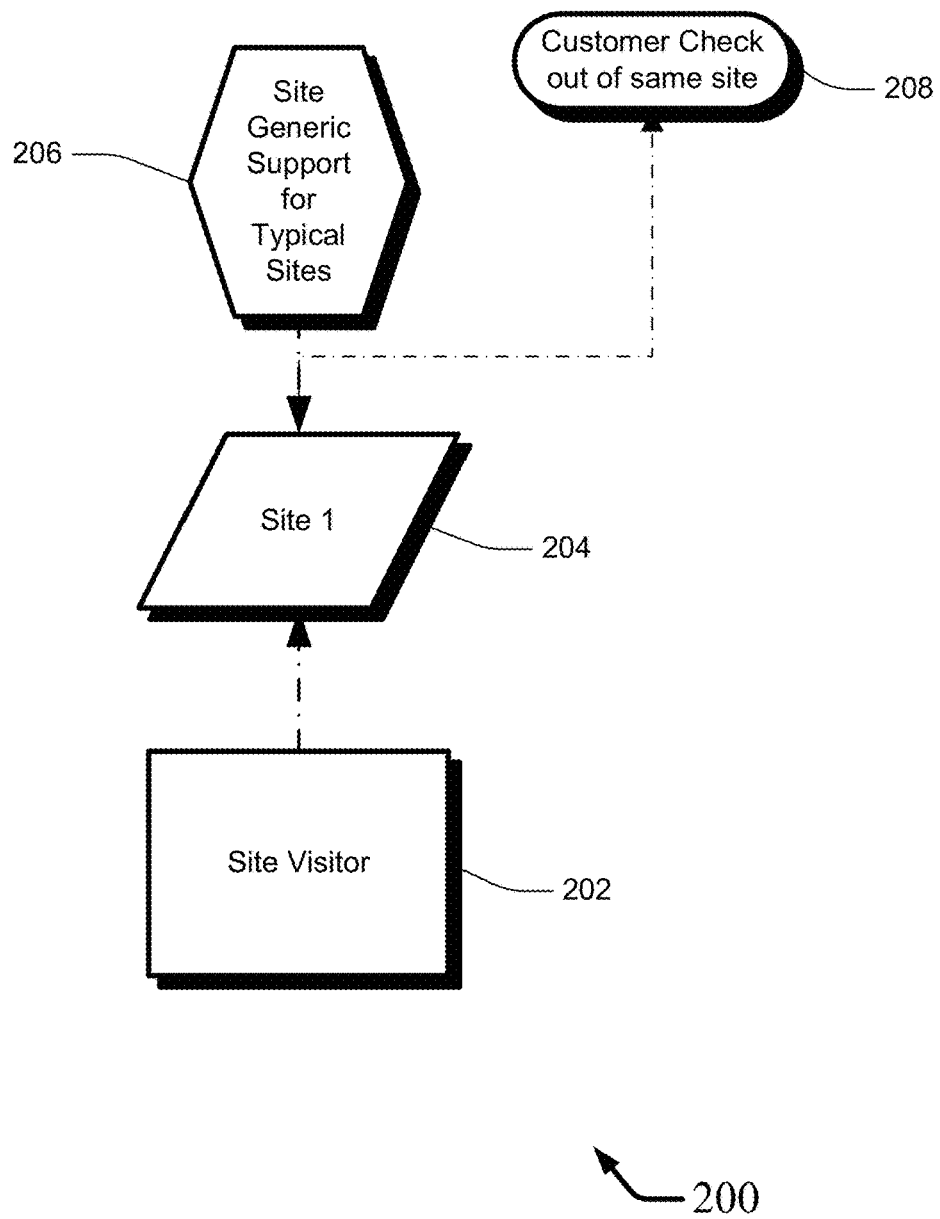
FIG. 2 is a flowchart illustrating an exemplary prior art process for a shopper to shop for multiple different goods and services and then conduct an electronic purchasing transaction at a website at a check-out application provided by a merchant by way of generic support functionalities.
Figure 3:
FIG. 3 illustrates a screen shot 300 characterizing a prior art user interface for a customer to enter shipping data to be used for the sale of floor liner parts for automotive vehicles at a merchant.

Implementations will become more apparent from the detailed description set forth below when taken in conjunction with the drawings.

Implementations will become more apparent from the detailed description set forth below when taken in conjunction with the drawings, in which like elements bear like reference numerals.

DETAILED DESCRIPTION

In a computerized implementation, a method enables a user over the World Wide Web (WWW) to interact and easily find products, simplify the user's session e-commerce shopping experience, provide information that is specific to the user's active request as to purchase interests, provide passive suggestions that are applicable to the user's active requests, acquire and share specific user profile information to ensure that the user has a personalized shopping experience, and to provide e-commerce merchants who offer goods and services to the user with enhanced Search Engine Optimization (SEO) benefits for the e-commerce merchants who are part of the network of sites.

The method of the computerized implementation provides a plurality of e-commerce specialty websites. Each e-commerce specialty website offers only a limited set of goods and services that are associated with or related to a common good or service. As such, when a shopper enters search terms directed to the common good or service, the shopper will be directed only to those e-commerce specialty websites that present to the shopper only those goods and services that are associated with or related to the common good or service. However, the presented goods and services that are offered for sale by a variety of different merchants, where each merchant operates a separate and distinct e-commerce specialty website.

The method of the computerized implementation provides a network of specialty e-commerce merchant websites through which the shopper is quickly and efficiently guided so as to provide the shopper with a shopping experience that is personalized to the data accumulated that pertains to the shopper and the shopping interests of that shopper. As such, the method of the computerized implementation provides a greater likelihood of optimized SEO benefits. The SEO benefits occur because each specialty e-commerce merchant website is associated search engine discoverable metadata that specifically targets a single category that can be matched to the data accumulated that pertains to the shopper and the shopping interests of that shopper, thereby providing the shopper with greater likelihood that the shopper is being presented with relevant and correlated specialty e-commerce websites at which textual, verbal, or artificial intelligence category experts can be offered to the shopper to improve the shopper's buying process.

Since each e-commerce specialty website offers only a limited set of goods and services that are associated with or related to a common good or service, and since each specialty e-commerce merchant website is associated search engine discoverable metadata that specifically targets a single category, there is a reduced need to purchase 'ad words' in order to attract commercial traffic to each specialty e-commerce merchant website. In practice, when a shopper enters search terms directed to the common good or service, the computerized method will provide multiple hits points that give each e-commerce merchant website a greater likelihood for organic search growth even though few or no ad word were purchased by the merchant for their e-commerce merchant website. Although a single boutique website isn't unique, uniqueness is found in the provision of a conglomerate of associated and affiliated specialty sites sharing a merchant cart under an umbrella, as well as in this provision of ease of use for the user and significant value for the connected sites. The umbrella site can provide a granular level or local community based site representation. This granular or local collection of sites under an umbrella allows smaller and local merchants to compete and survive under the face of a narrow quantity of site domination. The affiliate or associated specialty site concept improves the user experience and provides a platform for merchants to build a long term sustainable service and product offering. The umbrella site will provide an environment to compete with large sites that are eroding local and smaller merchants. It will also allow the affiliated and associated sites to pool local marketing dollars and reduce operating costs for the boutique members.

By way of example, and not by way of limitation, search engine discoverable metadata associated with a specialty e-commerce merchant website will be metadata that identifies a special category. One such category could be the category of automobile floor liners, another such category could be the category of automobile roof racks, another such category could be the category of automobile hitches, another such category could be the category of automobile truck covers, etc. Each good or service in each special category can be identified by inventory-related data, such as by way of a Vehicle Identification Number (VIN) or some portion thereof, a Global Trade Item Number (GTIN) that is used to uniquely identify items for sale, a Manufacturer Part Number (MPN) to identify a part with a series of numbers and/or letters given to that part by the manufacturer, a Universal Product Code (UPC) to uniquely identify a product, a part number provided by a manufacturer that uses an internal part number or a unique code to bundle parts where a plurality of parts are bundled together into an assembly for re-sale purposes, etc.

The linking together of the e-commerce merchant websites over the network allow for more effective targeting of the shopper and the shopper's interests. Also, this provides effective multi-site linkage among merchants or affiliates and associates that improves the shopper's experience with personalization while also assisting the shopper in locating items that are relevant only to the shopper's interests. The foregoing improves the network of e-commerce merchant websites in optimizing the likelihood that their respective goods and services will be discovered by algorithms in use by search engines (e.g., Google, Bing, Dog Pile, etc.), as well as improving its reputation among its shoppers. Thus, the method of the computerized implementation provides the likelihood of an increase in the number or inbound links from these search engines, and higher shopper response rates. It will also provide the umbrella sites to enjoy the benefits of shared data and optimization that will create an environment of success for its members. Through the benefits of shared data, the merchants will be able to collectively lower costs associated with the expense of ad words, advertising, and site optimization.

The method of the computerized implementation provides a significant improvement over the typical single specialty e-commerce merchant website where the shopper visits the site, determines what they want to purchase, and then checks out to purchase the items from the same site. Having the ability of a shared cart that transfers between each of the network connected specialty e-commerce merchant websites provides the user with an experience that is unique and helpful. This agnostic approach reduces consumer frustrations of finding an item of interest at a general site, and reduces the purchase time to only a few clicks or steps. The agnostic approach will also provide significant benefits for the collection of sites.

Figure 4:
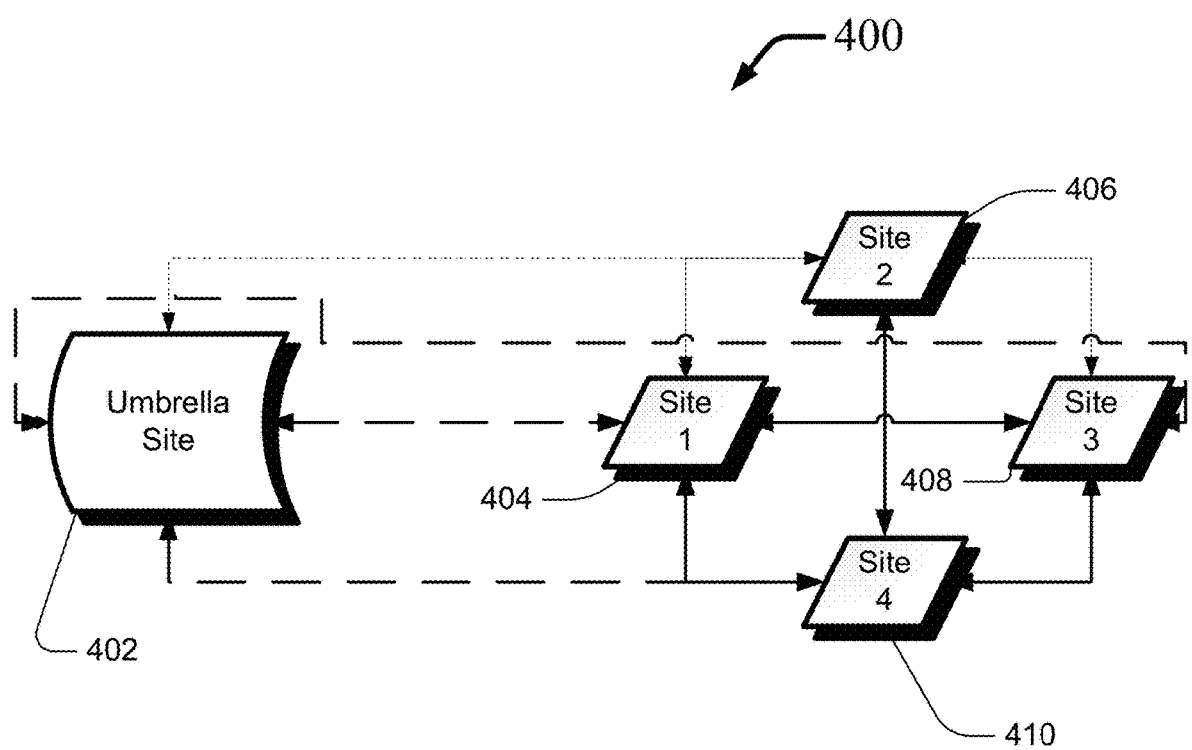
FIG. 4 is a flowchart illustrating an exemplary process that affords Search Engine Optimization (SEO) enhancements provided by an umbrella site among a plurality of different e-commerce merchant websites.
Figure 5:
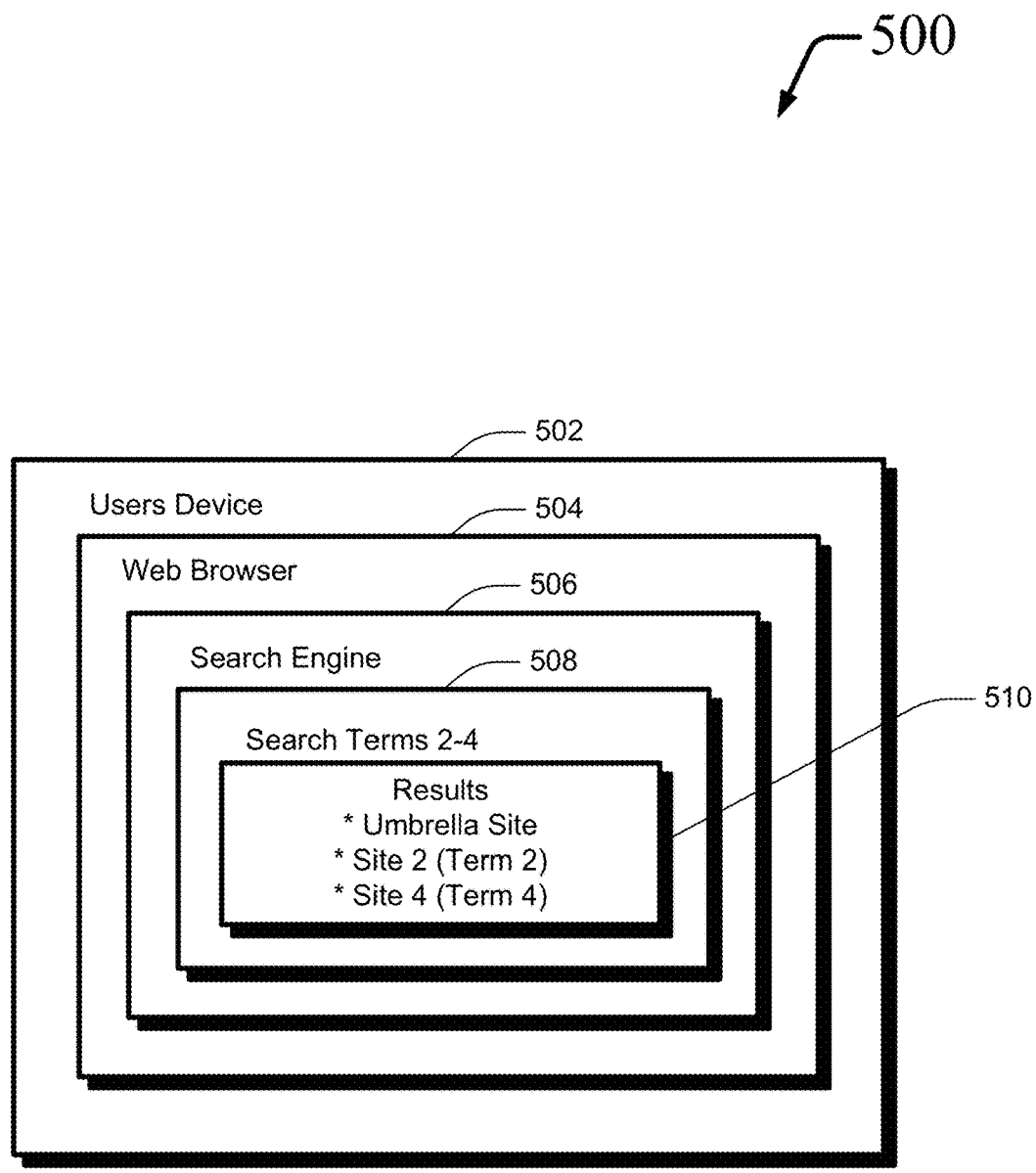
FIG. 5 is diagram showing aspects of the Search Engine Optimization (SEO) enhancements provided by the umbrella site among the plurality of different e-commerce merchant websites shown in FIG. 4.

Referring now to FIGS. 4-5, a flowchart 400 illustrates a process that affords Search Engine Optimization (SEO) enhancements that are provided by an umbrella site 402 among four (4) e-commerce merchant websites 404-410. The flowchart 400 seen in FIG. 4 operates with components 500 illustrated in FIG. 5, including a user device 502, a web browser 504, a search engine 506, search terms 508 actively selected by the shopper, and search engine results 510 that are provided to e-commerce websites 404-410 depending upon the search engine discoverable metadata associate with each website.

The process seen in flowchart 400 provides a method for enabling users over the WWW to interact and easily find products, simplify a user's e-commerce shopping session experience, provide information that is specific, provide suggestions that are applicable to the shopper's original request, accumulate and store specific shopper profile information that ensures a specific experience for the shopper, and provide enhanced SEO benefits for the network of e-commerce merchant websites 404-408. Each e-commerce merchant website 404-410 is a specialty e-commerce merchant website that offers only a limited set of goods and services that are associated with or related to a common good or service. Since each specialty e-commerce merchant website 404-410 is associated with search engine discoverable metadata that specifically targets a single category of or relating to the common good or service, there is a reduced need to purchase 'ad words' in order to attract commercial traffic to each specialty e-commerce merchant website 404-410.

In practice, when a shopper enters search terms directed to the common good or service, the computerized method, via umbrella site 402, will provide multiple hits points that give each e-commerce merchant website 404-410 a greater likelihood for organic search growth even though few or no ad words were purchased for each e-commerce merchant website 404-410. As such, the umbrella site 402 facilitates a multi-merchant network of specialty e-commerce websites that guide the user quickly and efficiently into sites 404-420 that are only relevant to the shopper and the shopper's interest, thus personalizing the shopper's shopping experience. Using a Specialty Site strategy will provide sites 404-410 a greater chance of SEO benefits. The SEO benefits occur because each Site 404-410 specifically targets a single category so as to provide the shopper the greatest comfort that they are dealing with category experts at each site 404-410 and more importantly making the buying process easier.

As shown in FIG. 4, the shopper traverses multiple web sites 404-410, entering and leaving each, to access, for example, aftermarket automotive parts offered for sale by respective different merchants at site 404-410, each e-commerce merchant website 404-410 allowing the shopping the ability to add a merchant's auto part for sale for a particular automobile make and model to a common virtual shopping cart that is shared by all participating merchants, and then allow the shopper to check out and make payment at any of the websites 404-410. As such, all participating merchants are paid by the single payment that is made at any of the websites 404-410. The computerized method thus facilitates the consolidation of all purchases being made by the shopper into one transaction from goods and services sold to the shopper by the four (4) merchants operating the four (4) sites 404-410.

The method of the computerized implementation enables web shoppers to actively selected search terms so that they interact and easily find products, simplify the shopper's browsing, shopping, and check-out session experience, provide information that is specific to the shopper's actively selected search terms, provides passive suggestions that are applicable to the shopper's actively selected search terms, enable the use of shopper-specific profile information that ensures a specific and personalized shopper experience, and provided enhanced SEO benefits for the network of sites 404-410.

Figure 6:
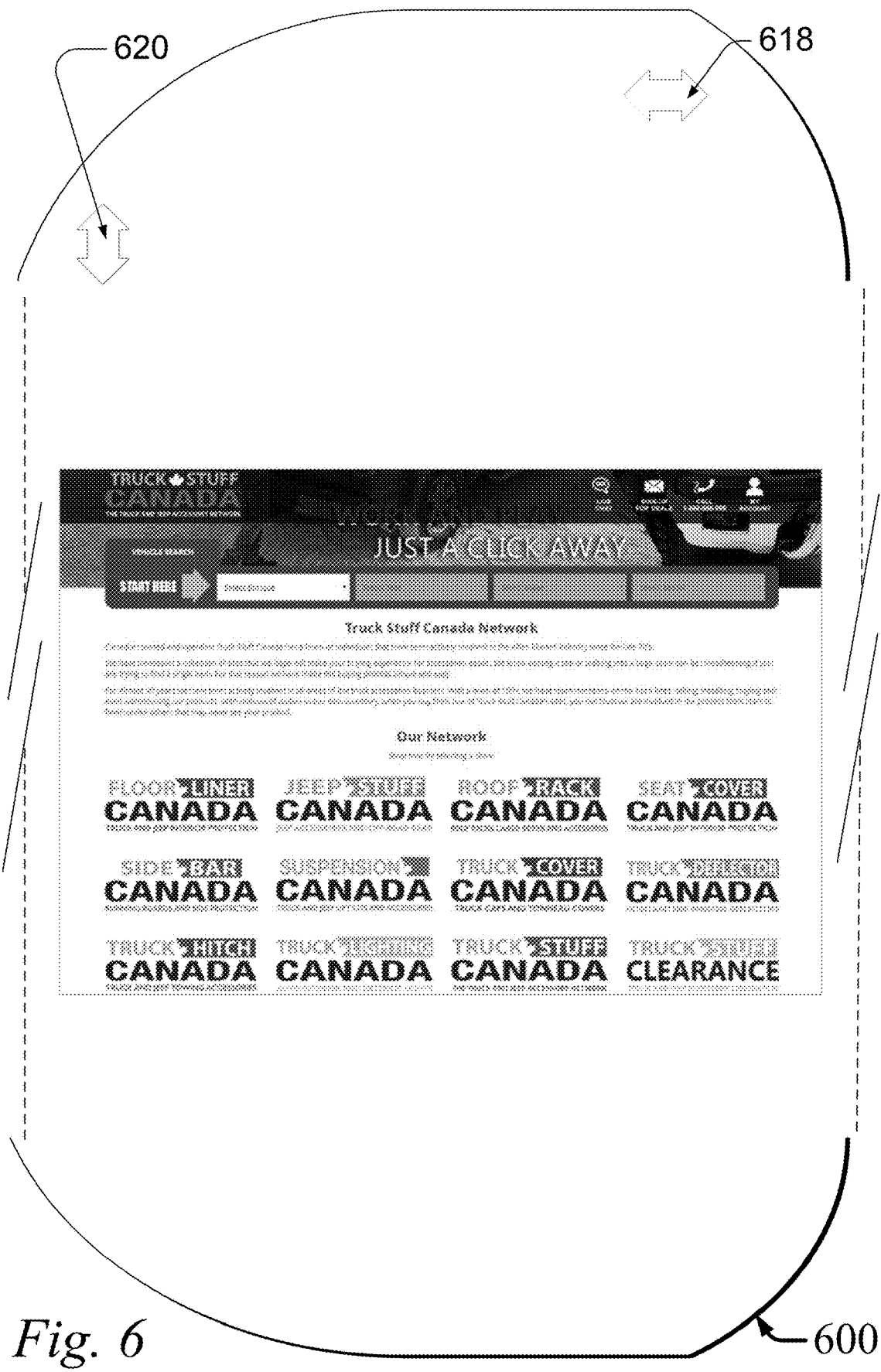
FIG. 6 illustrates a screen shot characterizing, inter alia, an exemplary user interface for a shopper to enter search terms pertaining to automotive parts and accessories, by way of a plurality of different pull down menus, in order to ensure that a search engine will select and present to the shopper only those automotive parts and accessories that pertain to the entered search terms, whereby the shopper can navigate to one or more specialty e-commerce merchant websites each presenting to the shopper only those automotive parts and accessories that pertain to the entered search terms.

FIG. 6 shows screen shot 600 which can be a user interface where a shopper enters, via selections from pull down menus, search terms corresponding to the shopper's interests. Here, the shopper is interested in automotive parts and accessories for a particular make and model truck. As shown in FIG. 6, a plurality of different e-commerce websites, shown in the bottom of the screen shot 600, are possible websites to which the shopper will be directed depending upon the search terms that the shopper actively enters by way of selections from the pull-down menus.

Note that each e-commerce websites shown in the bottom of the screen shot 600 will be associated with search engine discoverable metadata that is limited to those categories of goods and services directly identifiable to that website, for instance: (i) goods and services pertaining to automotive floor liners; (ii) goods and services pertaining to automotive jeep stuff; (iii) goods and services pertaining to automotive roof racks; (iv) goods and services pertaining to automotive seat covers; (v) goods and services pertaining to automotive side parts; (vi) goods and services pertaining to automotive suspension; (vii) goods and services pertaining to automotive truck covers; (viii) goods and services pertaining to automotive truck deflectors, goods and services pertaining to automotive truck hitches; (ix) goods and services pertaining to automotive truck lighting; (x) goods and services pertaining to automotive truck stuff on clearance sale, etc. Note, also, that the shopper can enter search terms pertaining to each of the foregoing categories by way of the shopper actively entering the same with selections from the pull-down menus.

As the shopper searches for subject matter in accordance with the entered search terms, the computerised method will provide multiple hits points to give the networked merchants' websites, shown in the bottom of the screen shot 600, a greater chance for organic search growth—albeit without having to pay of ad words. In addition to targeting the shopper by sharing of the shopper's profile data among networked merchants' websites, an effective multi-site linkage is provided that improves the shopper's experience and assists the shopper in finding goods and services, improves the networked merchants' websites reputation with its shoppers, and optimizes the discoverability of the networked merchants' websites by search engines. From the foregoing, the networked merchants' websites are more likely to have more inbound links and higher response rates from their shoppers. With good information and a better selection of external links, the computerized method of networked merchants' websites provides SEO benefits which single sites cannot achieve.

In screen shot 600, horizontal 618 and vertical 620 panning can be user activated, such as by operation of a mouse or other pointing device for a graphical user interface, to move that portion of the display being rendered horizontally and vertically, respectively.

Figure 7:
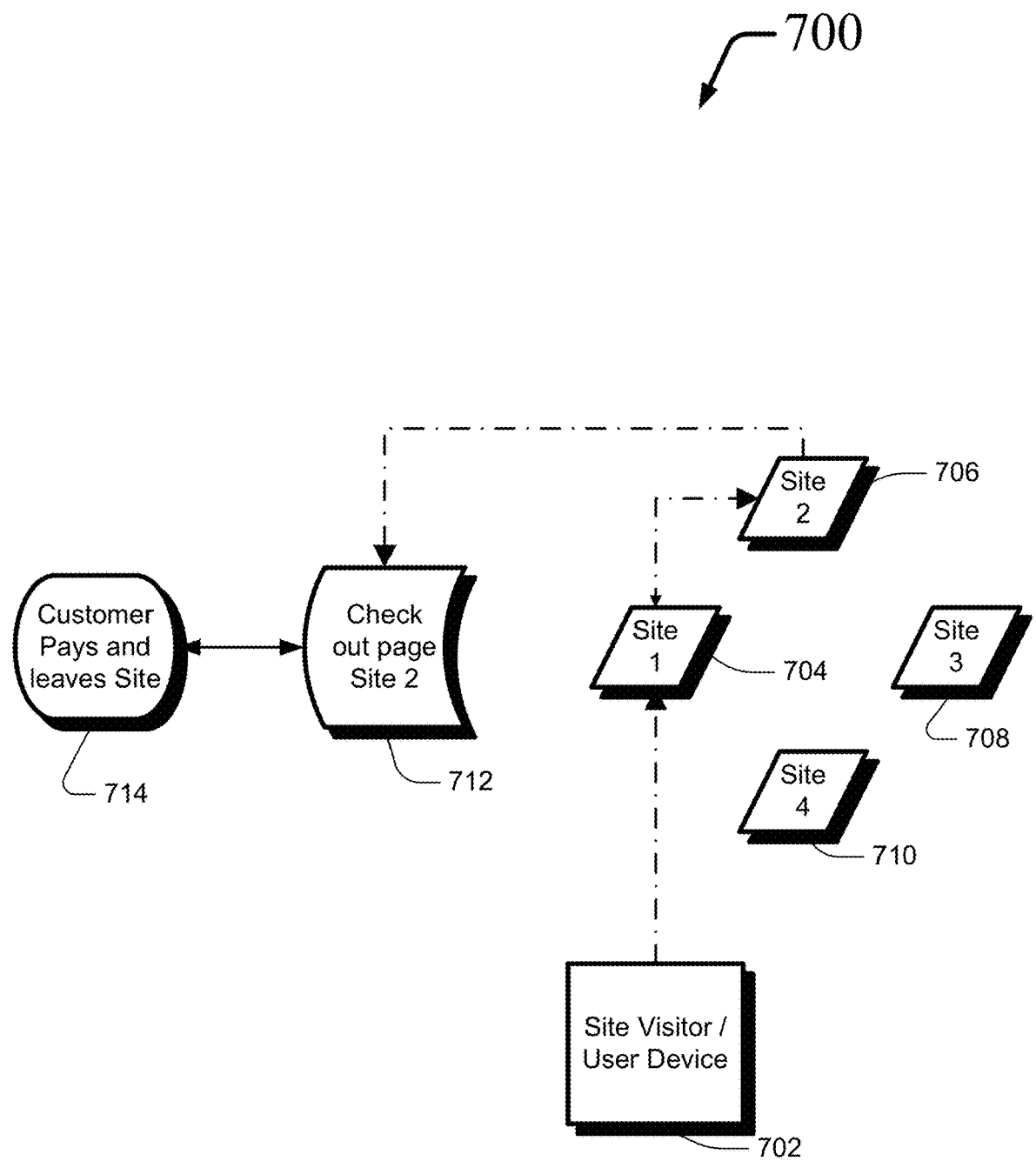
FIGS. 7-8 are respective flowcharts illustrating exemplary processes for a shopper to shop at only some or at all of a plurality of different e-commerce merchant websites, and then conduct a single e-commercial check-out transaction at any one of the different e-commerce merchant websites so as to purchase all of the of the items in the shopper's electronic shopping cart that were selected and put into the shopper's electronic shopping cart at only some or at all of a plurality of different e-commerce merchant websites.
Figure 8:
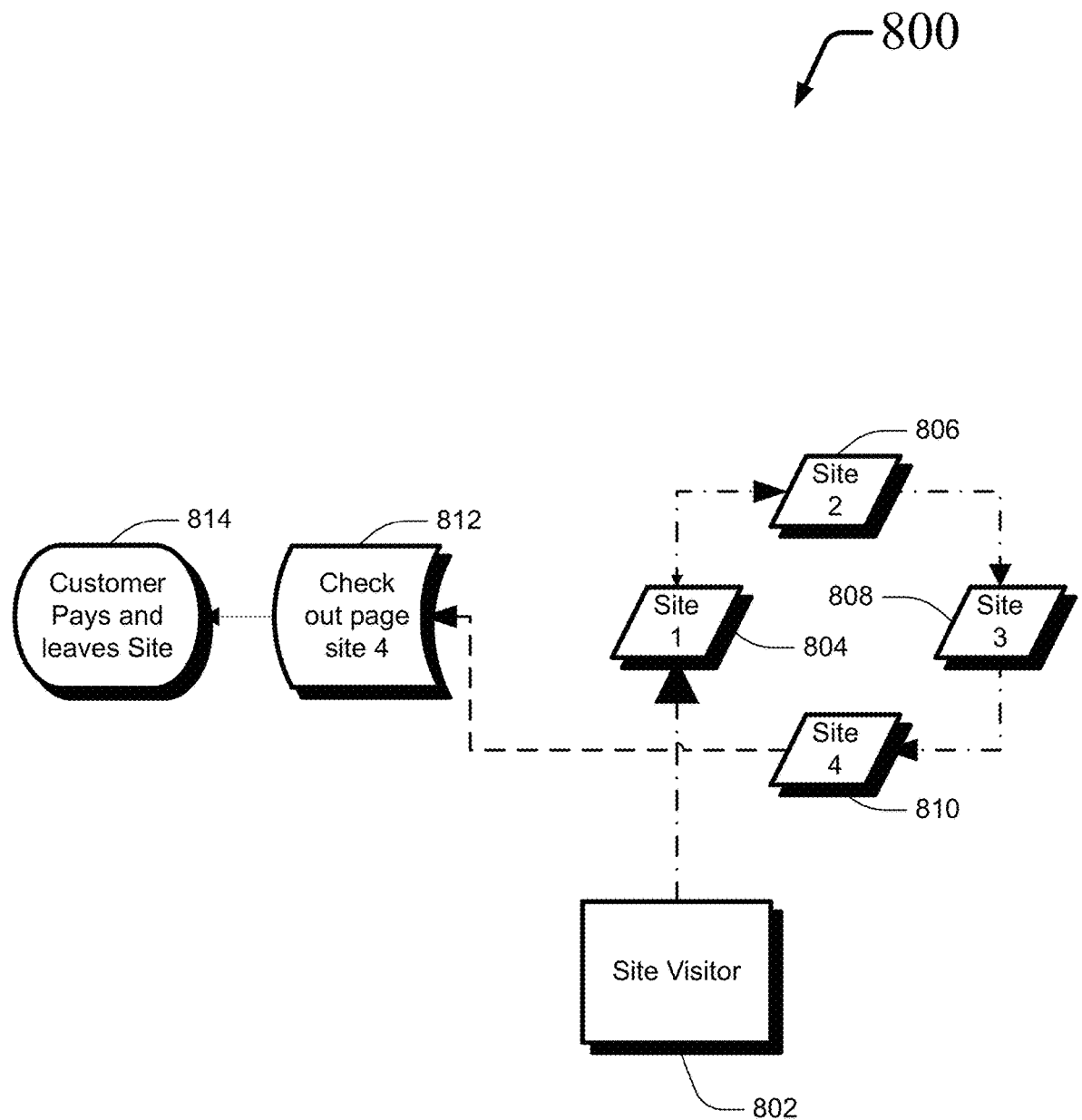

While conventional e-commerce merchant websites allow a user to visit the site, determine what they want to purchase, and then check-out to purchase the items from the same site, the computerized methods and systems disclosed herein provide the enhanced ability to have a shared electronic shopping cart that transfers between each of the connected networked merchants' websites so as to provide the shopper with an experience that is unique and helpful when visiting the networked merchants' websites. Referring to FIGS. 7-8, there are illustrated flowcharts 700-800 that illustrate shopper check-out processes for goods and services purchased at one more of networked merchants' websites 804-810. In FIGS. 7, a site visitor 702, 802 uses device 702 to identify items they want to purchase and places them into an electronic shopping cart. The information is sent to an umbrella site (e.g., see Ref. Num. 402 in FIG. 4). When the user 702 visits site 706 they still have the items from site 704 in the cart, allowing the user to purchase items from site 704 and site 706 when at the check-out at process 712. This unique feature will also provide benefits to the member affiliate and associated sites that are part of the umbrella specialty site network.

FIG. 8 again provides a picture of how the shared virtual shopping cart works in the specialty site network. The user 802 visits sites 804 and then leaves the site 804 to visit website 806. The user identifies something they want and places the item into the virtual shopping cart. The user then goes to website 808 and again identifies something they want and places it into the cart. The user now has items from specialty websites 804 and 806. The user lastly visits site 810 and finds nothing, so they decide to check-out at website 810 with the items from sites 806-808. Having connected websites 804-810, the ease of being able to purchase between the websites 804-810 is not only possible but is easy and provides a unique experience in the specialty site network of e-commerce websites 804-810.

As shown in the process of flowchart 700, a customer visits merchant e-commerce website 704. The customer adds items into a virtual shopping cart from merchant e-commerce website 704. The customer leaves merchant e-commerce website 704 and visits merchant e-commerce website 706 during which the virtual shopping cart retains the items therein from merchant e-commerce website 704. The customer adds items into the cart from merchant e-commerce website 706 such that the virtual shopping cart retains the items therein from merchant e-commerce websites 704-706. Thereafter, the customer checks out at merchant e-commerce website 710 in a single transaction to purchase the items in the virtual shopping cart from merchant e-commerce websites 704-706 at website 710.

As shown in the process of flowchart 800, a customer 802 enters, visits, and leaves each of merchant e-commerce websites 804-810. The customer adds one or more items into the virtual shopping cart from two or more merchant e-commerce websites 804-810 such that the virtual shopping cart retains the items therein that selected from merchant e-commerce websites 704-710. When the customer 802 is shopping at any of the merchant e-commerce websites 804-810 the customer 802 can see the contents of the virtual shopping cart as to the quantity and pricing of items in the virtual shopping cart.

Figure 9:
FIG. 9 illustrates a screen shot characterizing a user interface for a customer to enter shipping data to be used for the sale of floor liner parts for the automotive vehicle pertaining to the search terms entered via the user interface of FIG. 6 for the shipment of the items in the shopper's electronic shopping cart that were selected and put into the shopper's electronic shopping cart at only some or at all of a plurality of different e-commerce merchant websites.
Figure 10:
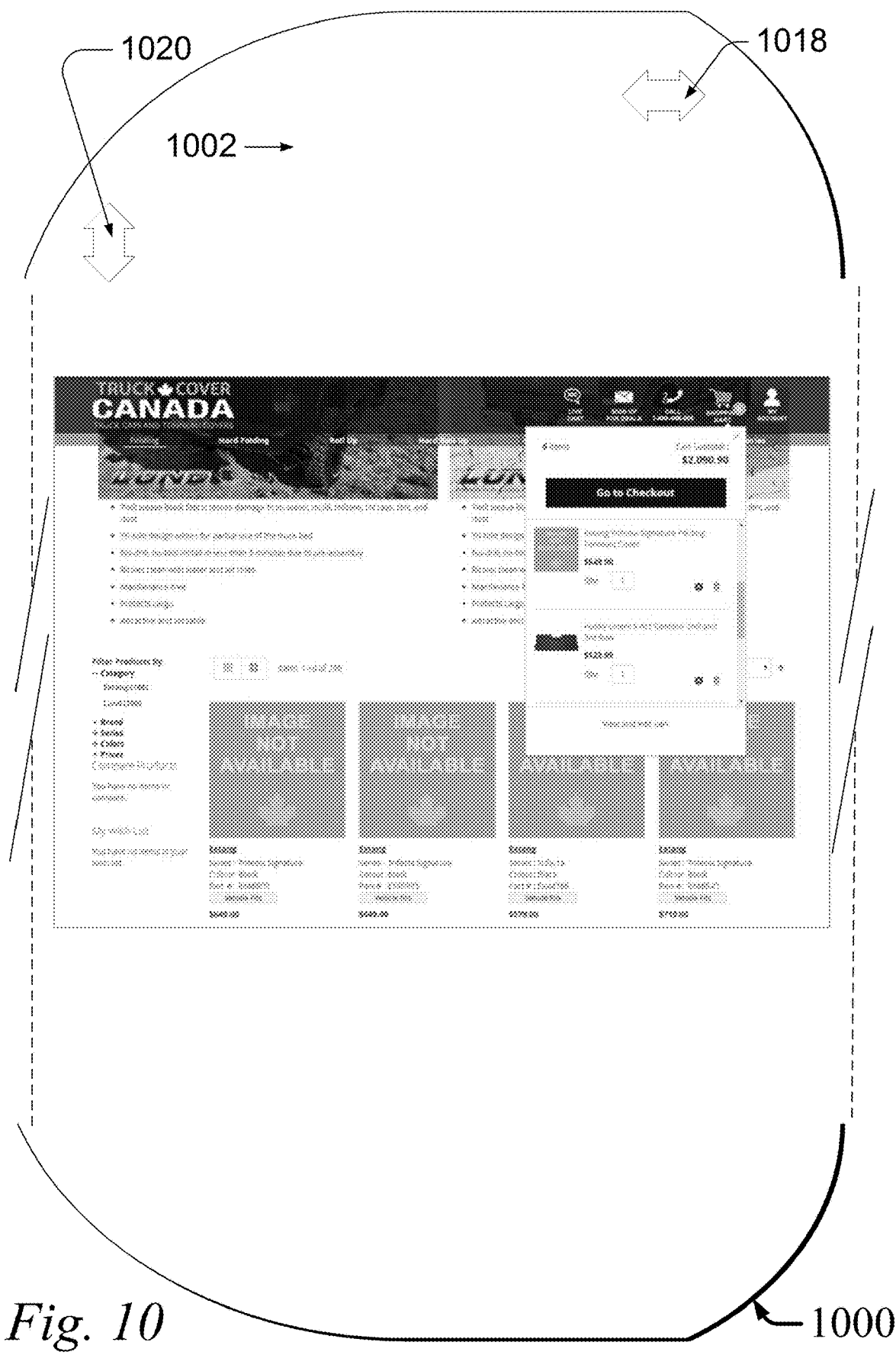
FIG. 10 illustrates a screen shot characterizing a user interface for a shopper to view the contents of shopper's electronic shopping cart which contains different items that the shopper selected and put into the shopper's electronic shopping cart at different e-commerce merchant websites.
Figure 11:
FIG. 11 illustrates a screen shot characterizing a user interface for a shopper to enter shipping data to be used to ship the purchased contents of shopper's electronic shopping cart which contains different items that the shopper selected and put into the shopper's electronic shopping cart at different e-commerce merchant websites.

FIGS. 9-11 show screen shots 900, 1000, 1100 for respective user interfaces for a shopper using the networked e-commerce merchant websites 704-710 of FIG. 7 or the networked e-commerce merchant websites under the umbrella site which is a collection of both affiliated or associated members 804-810 of FIG. 8 to enter data. In FIG. 9, shipping data to be used for the sale of floor liner parts for the automotive vehicle pertaining to the search terms entered via the user interface of FIG. 9 for the shipment of the items in the shopper's electronic shopping cart that were selected and put into the shopper's electronic shopping cart at only some or at all of a plurality of different e-commerce merchant websites.

FIG. 10 illustrates a screen shot characterizing a user interface for the shopper to view the contents of shopper's electronic shopping cart, which contains different items that the shopper selected and put into the shopper's electronic shopping cart at different e-commerce merchant websites. Horizontal 1018 and vertical 1020 panning can be user activated to move that portion of the display being rendered horizontally and vertically, respectively.

In FIG. 10, a customer is shown to be visiting an automotive floor liner merchant e-commerce website where two (2) floor liners have been added to the virtual shopping cart. The customer then leaves the floor line merchant e-commerce website and goes to an automotive tonneau cover merchant e-commerce website to add two (2) more items to the virtual shopping cart. Note that parts added to the virtual shopping cart from the prior merchant e-commerce website remain in the shopping cart. Horizontal 918 and vertical 920 panning can be user activated to move that portion of the display that is being rendered horizontally and vertically, respectively.

FIG. 11 illustrates a screen shot characterizing a user interface for the shopper to enter shipping data to be used to ship the purchased contents of shopper's electronic shopping cart as shown in FIG. 11 which contains different items that the shopper selected and put into the shopper's electronic shopping cart at different e-commerce merchant websites, where each website features goods and services in a category different than that of the other networked websites. In FIG. 11, an automotive truck cover merchant e-commerce website shows four items in the virtual shopping cart: two (2) items from an automotive floor liner merchant e-commerce website, and two (2) items from an automotive tonneau merchant e-commerce website. If the customer pays for all of the items in the virtual shopping cart at the automotive tonneau merchant e-commerce website, then the customer would receive an invoice from the automotive tonneau merchant e-commerce or the umbrella merchant's website even though some of the virtual shopping cart had items from the automotive floor cover merchant e-commerce website. Horizontal 1118 and vertical 1120 panning can be user activated to move that portion of the display being rendered horizontally and vertically, respectively.

Figure 12:
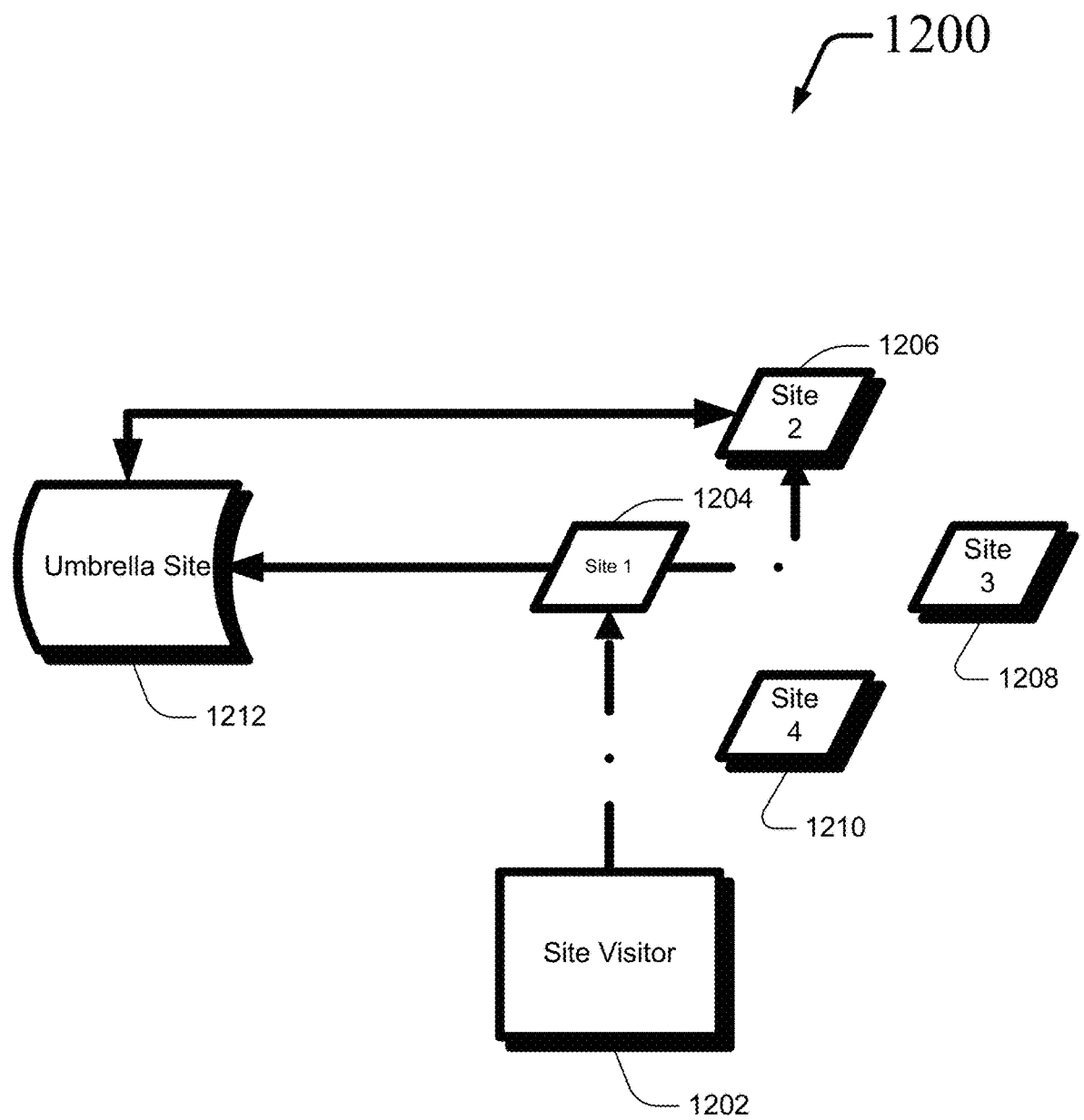
FIGS. 12-14 are respective flowcharts illustrating exemplary processes for a shopper to shop at only some or at all of a plurality of affiliated or associated e-commerce merchant websites, where the shopper has the ability to change information requested by one or more of the websites, and where the changed information is updated for use at and by any of the other plurality of different e-commerce merchant websites as the shopper is shopping.
Figure 13:
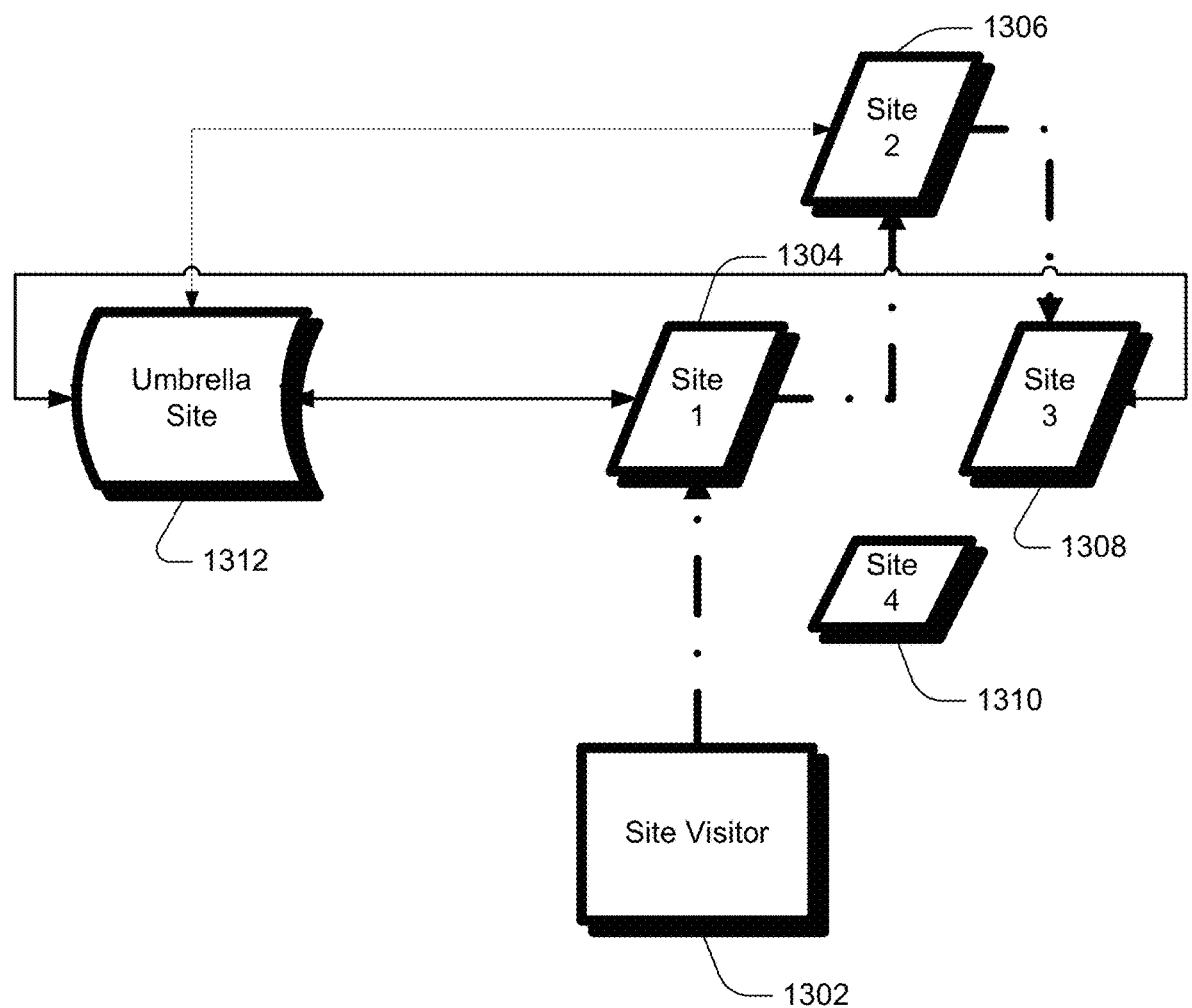
Figure 14:
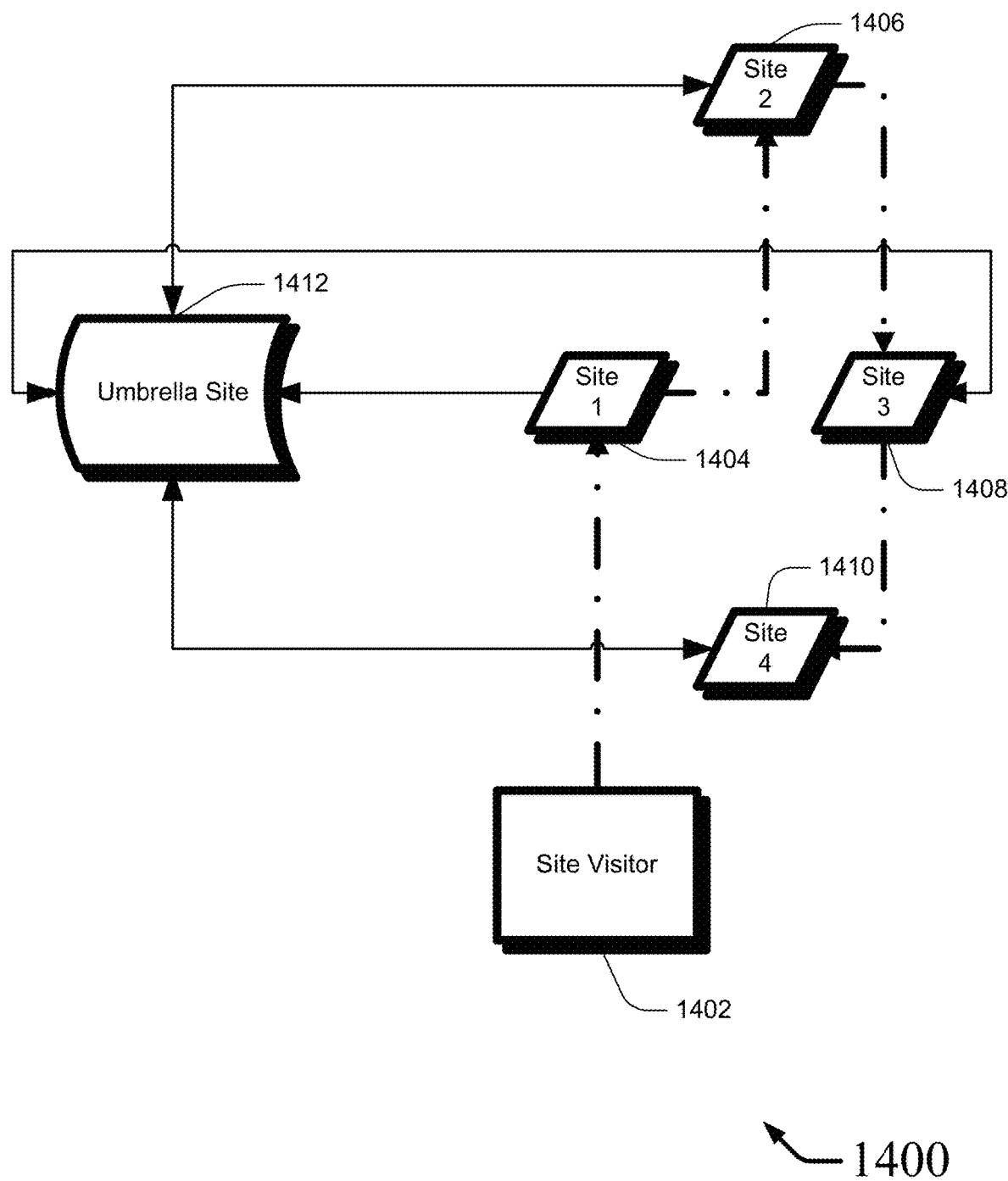

FIGS. 12-14 show flowcharts 1200, 1300 and 1400 illustrating respective exemplary processes that afford Search Engine Optimization (SEO) enhancements to shopper 1202, 1302, and 1402 provided by umbrella sites 1212, 1312, and 1412 among e-commerce merchant websites 1204-1210, 1304-1310, and 1404-1410. By way of example, each flowchart 1200, 1300 and 1400 can operate with components similar to those at reference numeral 500 illustrated in FIG. 5, including a user device 502, a web browser 504, a search engine 506, search terms 508 actively selected by the shopper, and engine results 510 that are provided to various of the e-commerce merchant websites 1204-1210, 1304-1310, and 1404-1410, thereby enhancing the Web shopping experience and making the buying process easier for shoppers. Referring to FIG. 5 and FIGS. 12-14, nested processes 500 assist a user's use of a device 502 executing a web browser 504 to obtain results 510 from a search engine 506 with search terms 508 when shopping at the e-commerce merchant websites 1204-1210, 1304-1310, and 1404-1410.

Having multiple domain names connected to a single site creates additional touch points for a search engine to enable a user to find the network of e-commerce websites 1204-1210, 1304-1310, and 1404-1410, which is better and more effective that use of a sub/domain strategy. By linking the network of e-commerce websites 1204-1210, 1304-1310, and 1404-1410, there is an improvement in the user's experience, and the user is assisted in finding goods and services related to the user's search. This in turn improves the reputation of the network of e-commerce websites 1204-1210, 1304-1310, and 1404-1410 with users and search engines, resulting in more inbound links, and higher response rates. The multiple domain strategy will help make the buying and searching process easier for users across all ages because of its optimization strategy and ease of merchant specialized sites. The virtual cart that can travel between these connected boutiques will shift the user experience to a granular level which ultimately provides greater levels of user satisfaction and ease. The multiple domain strategy also creates a platform for affiliated and associated sites to work together by sharing data and site traffic which will provide significant value to both the user and the merchant members. It will also assist the merchant sites that are under the umbrella to pool marketing and expensive ad word purchases thereby reducing expenses for the participating merchants.

The processes illustrated in FIGS. 12-14 show how a user can shop in a session to view, select and purchase goods and services from different merchant e-commerce websites, each being a boutique that offers goods and services of a common or related category, so that the user is provided with a personalized experience by use of information that gathered from the user. Each boutique's or specialized merchant's website unique session experience gathers the user's information which is contained in the user's network assessable profile to provide the user advice regarding multiple products should they want to visit other merchant e-commerce websites or while checking out in a single multi-merchant transaction from the web address of a single merchant e-commerce website. This specialty or boutique merchant e-commerce website system also provides the user with a quick path to the items they are seeking or wanting thereby making the internet experience easier and buying goods quicker for the user.

When a user searches for a specific product, the collection of merchant e-commerce websites will bring them to a particular merchant e-commerce website, thereby significantly shortening the user's experience and thereby reducing the frustration of finding a specific product or service to meet the user's needs. Guiding the customer to the specific merchant e-commerce website target will shorten the search cycle and optimize the methodology of search on the Web. This unique benefit for the user will also provide a significant opportunity for the associated or affiliated members under the umbrella.

By way of example an aftermarket automotive collection of merchant e-commerce websites, after the user enters the automobile vehicle information into the first merchant e-commerce website during that session, the user can thereafter can visit any other merchant e-commerce website in a network thereof, and the information entered will be saved in a network accessible database, thereby ensuring that the information so collected will help the user find what the user is looking in a manner that is consistent across the entire network of merchant e-commerce websites The user provides the initial request and this information is pushed to the umbrella site 1212, 1312, and 1412, as shown in FIGS. 12-14, where the umbrella site pushes the requested information back to the next merchant e-commerce website. If the user changes the requested information, such as is shown in FIG. 14, the information is updated for the rest of the user's shopping session so that the information is available over the network to be available to other merchant e-commerce websites. This feature ensures that the user's experience in the network of merchant e-commerce websites is enhanced and provides the user with a personalized experience.

In FIG. 12, a customer 1202 visits merchant e-commerce website 1204. The customer 1202 requests information from merchant e-commerce website 1204 which is pushed by merchant e-commerce website 1204 to umbrella site 1212. The Customer 1202 thereafter visits merchant e-commerce website 1206 where merchant e-commerce website 1206 requests information from umbrella site 1212.

In FIG. 13, the customer 1302 visits merchant e-commerce website 1304 and requests information from merchant e-commerce website 1304 which merchant e-commerce website 1304 pushes to umbrella site 1312. The customer 1302 thereafter visits merchant e-commerce website 1306 and requests information from umbrella site 1312. The customer then visits merchant e-commerce website 1308 where merchant e-commerce website 1308 requests information from umbrella site 1312.

In FIG. 14, the customer 1402 visits merchant e-commerce website 1404 that merchant e-commerce website 1404 pushes information to umbrella site 1412. The customer 1402 then visits merchant e-commerce website 1406 where merchant e-commerce website 1406 requests information from umbrella site 1412. The customer 1402 then visits merchant e-commerce website 1408, where merchant e-commerce website 1408 requests information from umbrella site 1412. Note that customer 1402 could request new information while at merchant e-commerce website 1408, where merchant e-commerce website 1408 pushes request to umbrella site 1412. Thereafter, the customer 1402 visits site merchant e-commerce website 1410 where merchant e-commerce website 1410 requests information from umbrella site 1412 which is now related to the request from merchant e-commerce website 1408.

Figure 15:
FIG. 15 illustrates a screen shot characterizing a user interface for a customer to view floor liner parts for the automotive vehicle pertaining to the search terms entered via the user interface of FIG. 6, which floor liner parts are being offered for sale by a plurality of different e-commerce merchants.

FIG. 15 shows a screen shot 1500 with a user interface for an automotive floor liner e-commerce website. By way of example, a customer inputs a search term pertaining only a vehicle type, such as by way of searching for "2010 Ford F-150", such that when the customer 1402 visits merchant e-commerce website 1404 to shop for automotive floor liners, only those automobile floor liners for the "2010 Ford F-150" are offered to customer 1402 to put into the virtual shopping cart. Horizontal 1518 and vertical 1520 panning can be user activated to move that portion of the display that is being rendered horizontally and vertically, respectively.

Figure 16:
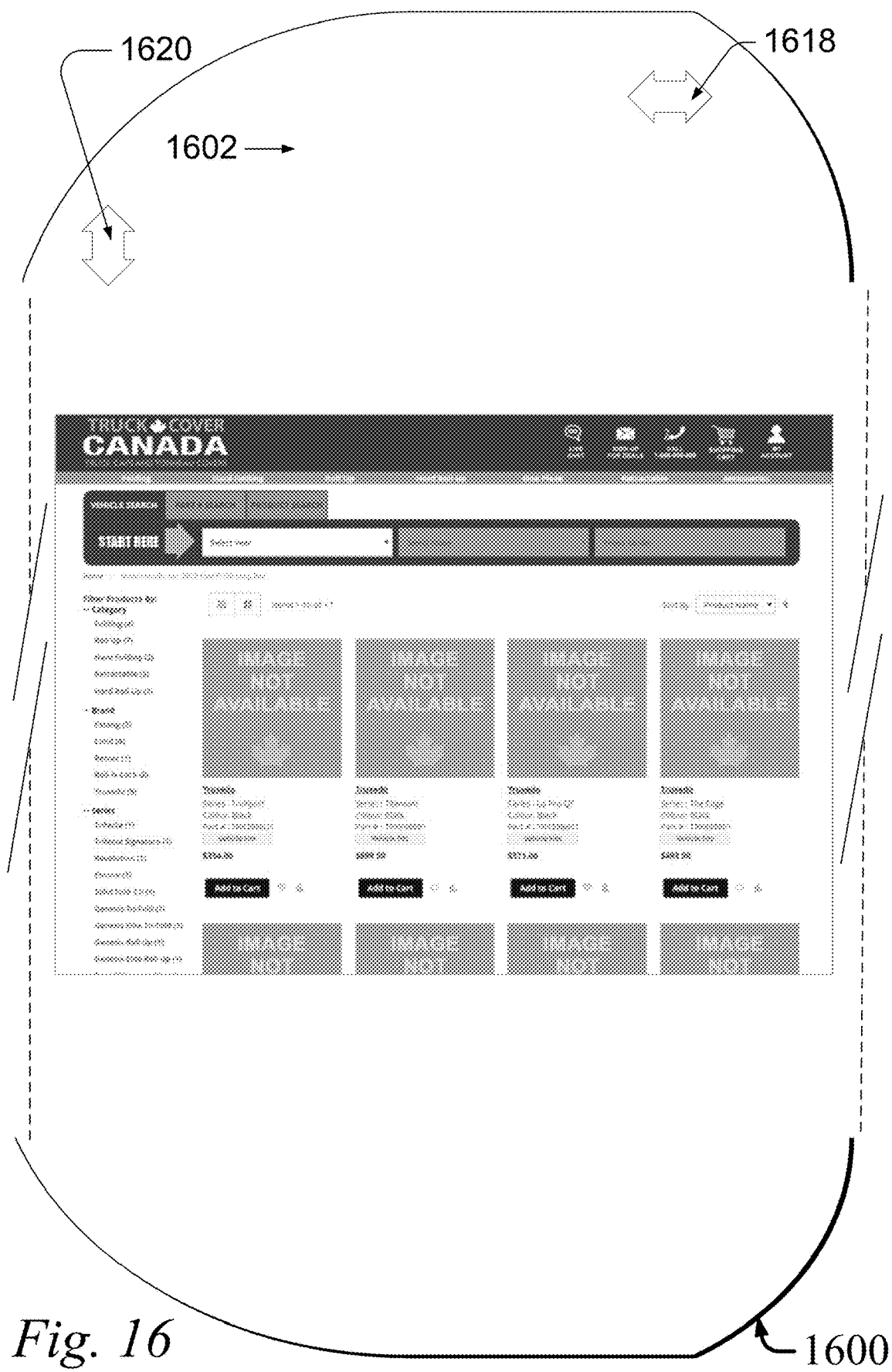
FIG. 16 illustrates a screen shot characterizing a user interface for a customer to view truck cover parts for the automotive vehicle pertaining to the search terms entered via the user interface of FIG. 6, which truck cover parts are being offered for sale by a plurality of different e-commerce merchants.

FIG. 16 shows a screen shot 1600, which is displayed to the customer after screen shot 1500, with a user interface for an automotive truck cover e-commerce website. By way of example, a customer inputs a search term pertaining only a vehicle type, such as by way of searching for "2010 Ford F-150", such that when the customer 1402 visits merchant e-commerce website 1404 to shop for automotive truck covers, only those automobile truck covers for the "2010 Ford F-150" are offered to customer 1402 to put into the virtual shopping cart. Horizontal 1618 and vertical 1120 panning can be user activated to move that portion of the display that is being rendered horizontally and vertically, respectively.

Figure 17:
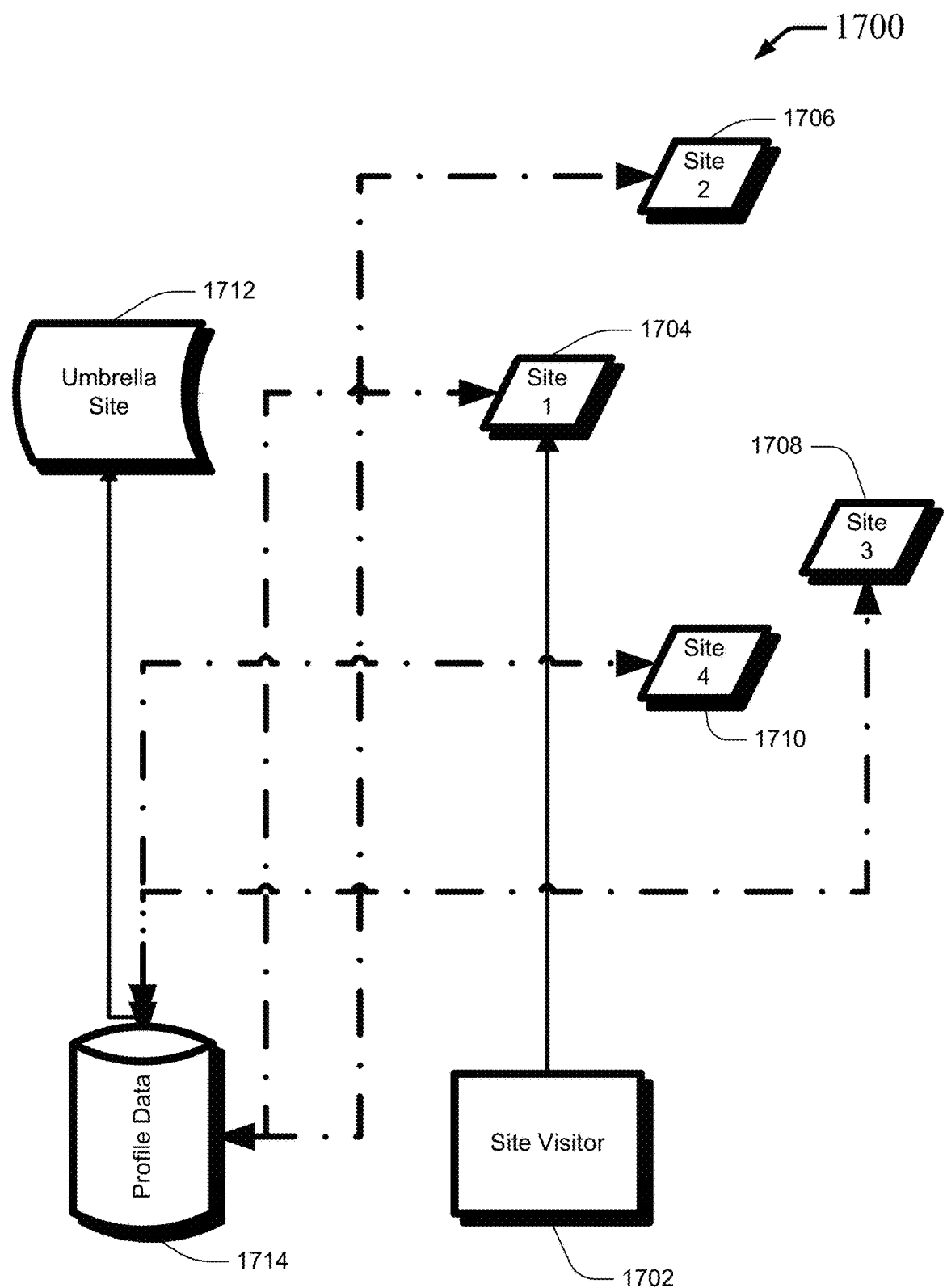
FIGS. 17-18 are flowcharts illustrating exemplary processes in which account information pertaining to a shopper is stored in a network accessible database for use by only some or at all of a plurality of different e-commerce merchant websites; The data gathered will be used to provide value to the associate and affiliated connected sites to allow for a reduced quantity of advertising expense, such as S.E.O. 'ad word' expense due to the cross selling nature of being part of this community. The co-operative nature of the umbrella of sites creates an environment that provides benefits for merchants and users.
Figure 18:
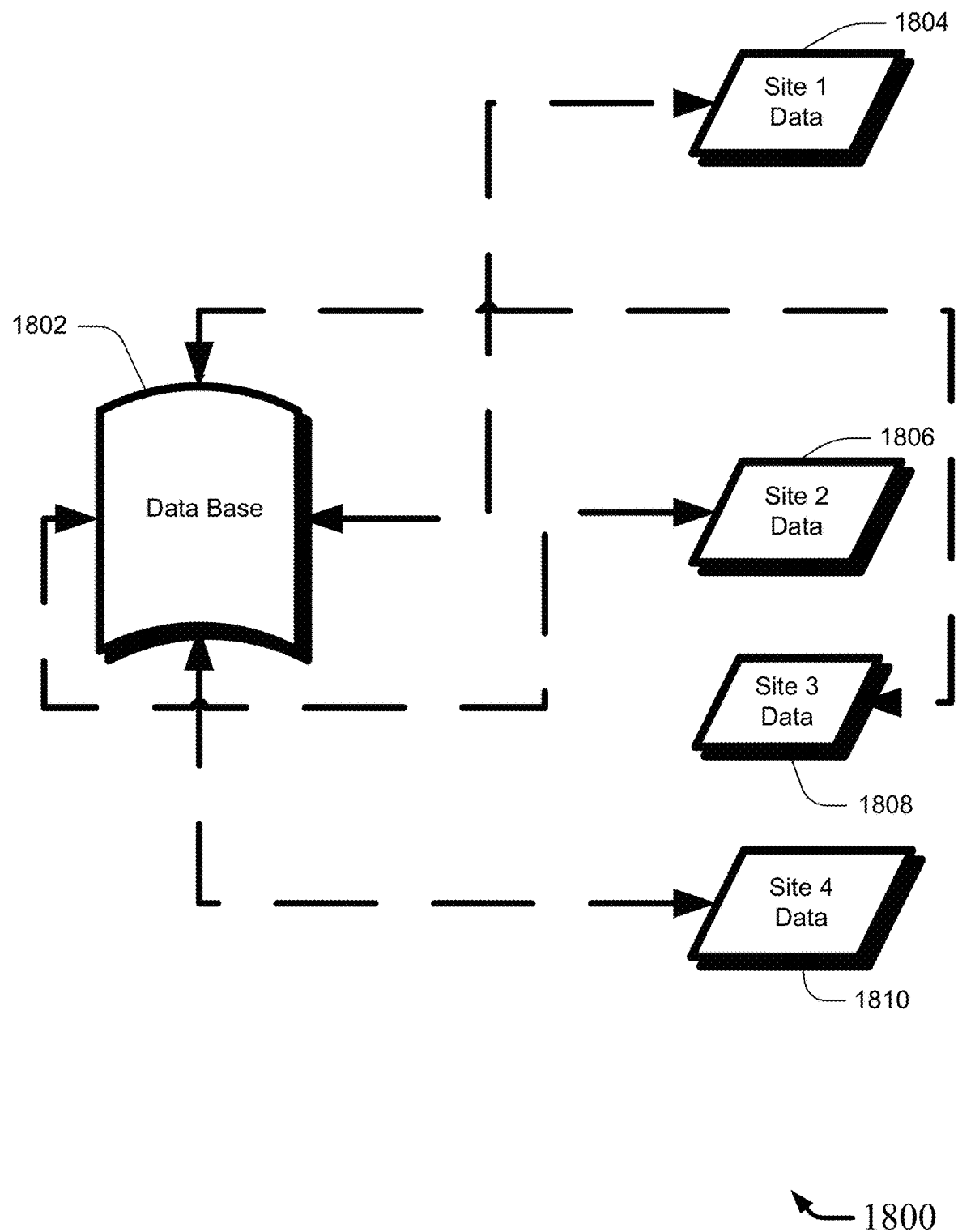

FIGS. 17-18 are flowcharts illustrating respective processes 1700, 1800 pertaining to a customer's ability to create information for, and allow the sharing of, a customer profile account. The information in the customer profile account can be shared over a network of merchant e-commerce websites. The customer's profile account information is shared with all of the connected merchant e-commerce websites to ensure each time the customer visits any merchant e-commerce website in the network, the customer will see and experience what they want, and when they want to see it. Preferably, the customer's profile account information will be securely contained and is pushed when requested by the customer as the customer visits and logs into any of the connected merchant e-commerce websites. The connecting of multiple specialty or boutique merchant e-commerce websites will thereby enhance the customer's internet experience. The shared information pertaining to the customer can include customer preferences, customer service preferences, customer billing preferences, customer freight preferences, standardized data that is to be re-used and re-purposed across all networked merchant e-commerce websites, and the use of plug-ins for social media that will track the customer's social interactions with the networked merchant e-commerce websites (e.g., tags, mentions).

Figure 19:
FIG. 19 illustrates a screen shot characterizing a user interface for the selection of which account information pertaining to a shopper, which information is stored in a network accessible database, and which information is to be shared over a network by select set of different e-commerce merchant websites.

FIG. 19 shows a screen shot 1900 of a merchant e-commerce website that sells automotive goods and services characterized as "truck stuff", where an umbrella website (e.g., see Reference Numeral 1412 in FIG. 14) helps with the administration data for the truck stuff merchant e-commerce website. Note, however, the truck stuff merchant e-commerce website can have its own data source and/or can share customer account profile information during a customer shopping session with other merchant e-commerce websites. Horizontal 1918 and vertical 1920 panning can be user activated to move that portion of the display that is being rendered horizontally and vertically, respectively.

Figure 20:
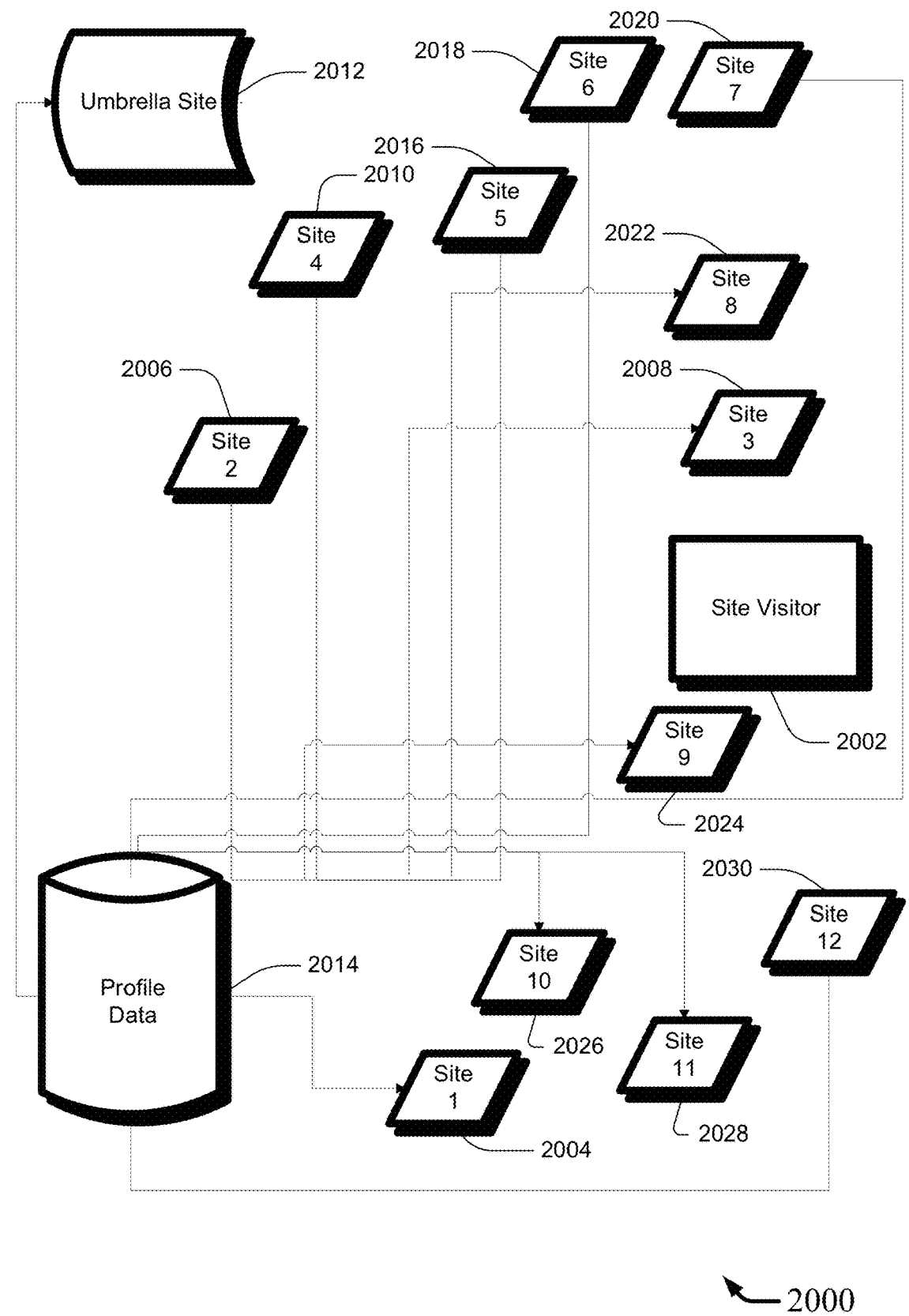
FIGS. 20-25 are flowcharts illustrating exemplary processes in which account information for each shopper is stored as profile data in a network accessible database for use by only some or at all of a plurality of different e-commerce merchant websites, where the profile data can be shared across the e-commerce merchant websites that are connected by way of a network so as to provide each shopper with a personalized shopping experience.
Figure 21:
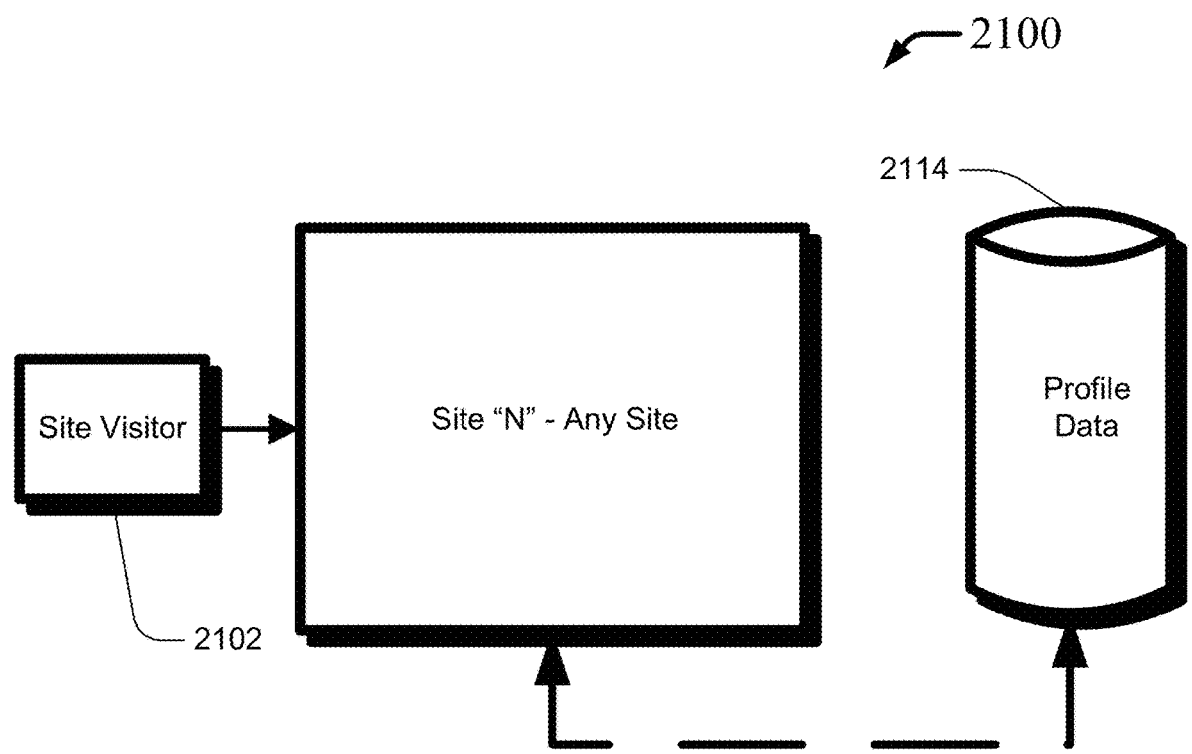

FIGS. 20-25 show flowcharts 2000, 2100, 2200, 2300, 2400 and 2500 illustrating respective processes for creating, accessing, and using information in customer profile accounts. As shown in FIGS. 20-21, customer profile data 2014, 2114 is kept in tables that can be used to store and gather customer information. The information in the customer profile data tables is gathered and retained for use by networked merchant e-commerce websites when the customer 2002, 2102 makes a future shopping visit. The information about the customer 2002, 2102 can be pushed into any of the entire networked merchant e-commerce websites 2004-2030 when requested, such as via umbrella site 2012, and can be accessed from any of the merchant e-commerce websites 2004-2030, thereby allowing the customer 2002, 2102 to enter any of the merchant e-commerce websites 2004-2030 and access information in the customer profile data 2014, 2114. The collection of different network connected merchant e-commerce websites 2004-2030 provides the customer with a personalized experience at any of the merchant e-commerce websites 2004-2030 so as to ensure that the customer sees those goods and services that the customer wants to see when the customer wants to see them. This concept provides customers with the fastest method of clicking and buying from any of the merchant e-commerce websites 2004-2030. As a customer modifies information in its customer profile data 2014, 2114, the customer's experience is enhanced and personalized, thereby making it more likely that the customer will spend more time shopping the collection of different network connected merchant e-commerce websites 2004-2030, where each connected merchant e-commerce website can use the modified information in customer profile data 2014, 2114 The value of shared data for both the user and the members of the umbrella site provides benefits for the member sites to compete with significantly larger sites that drive site traffic with significant ad word budgets and/or self-contained sites.

Figure 22:
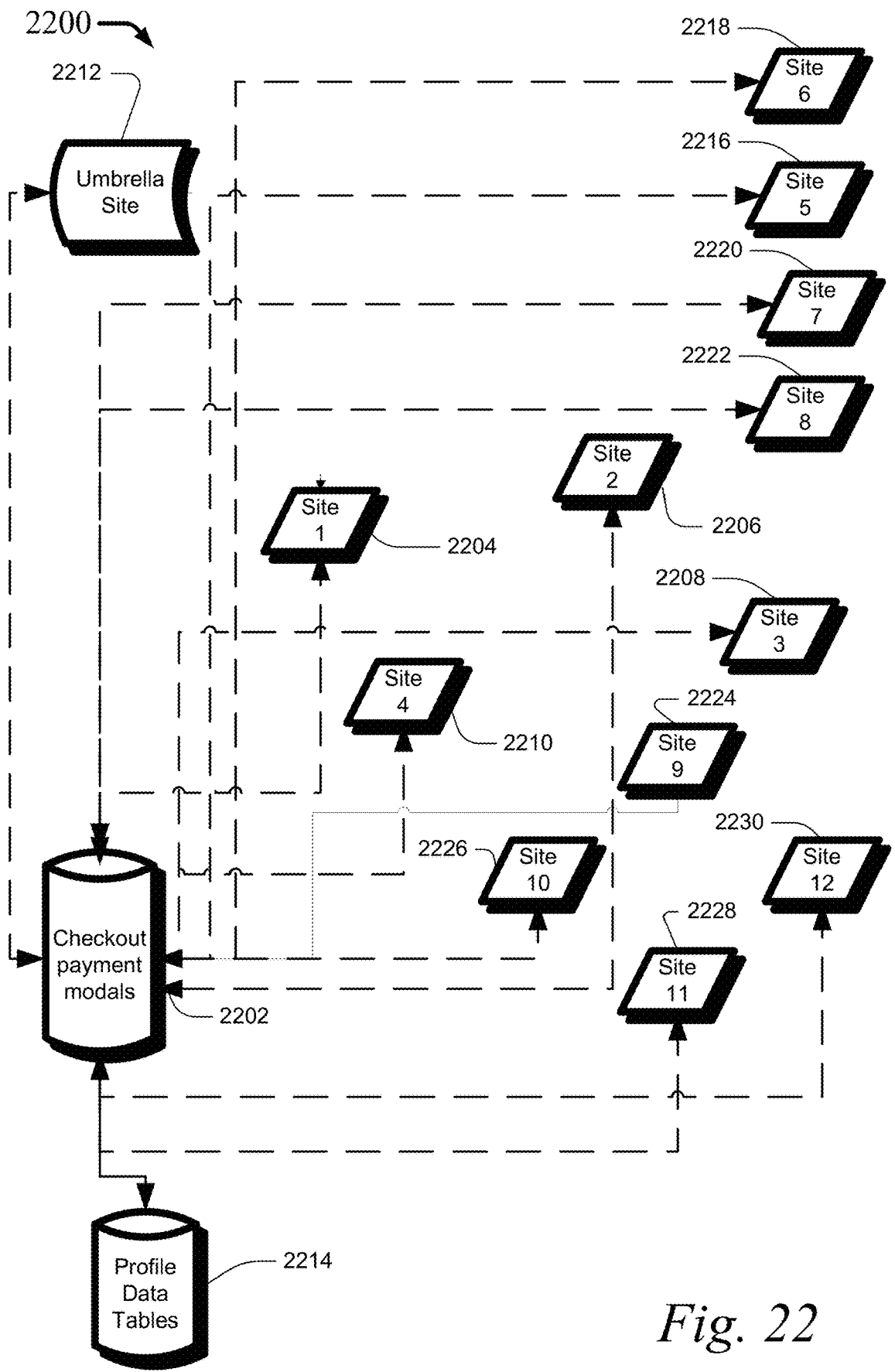
Figure 23:
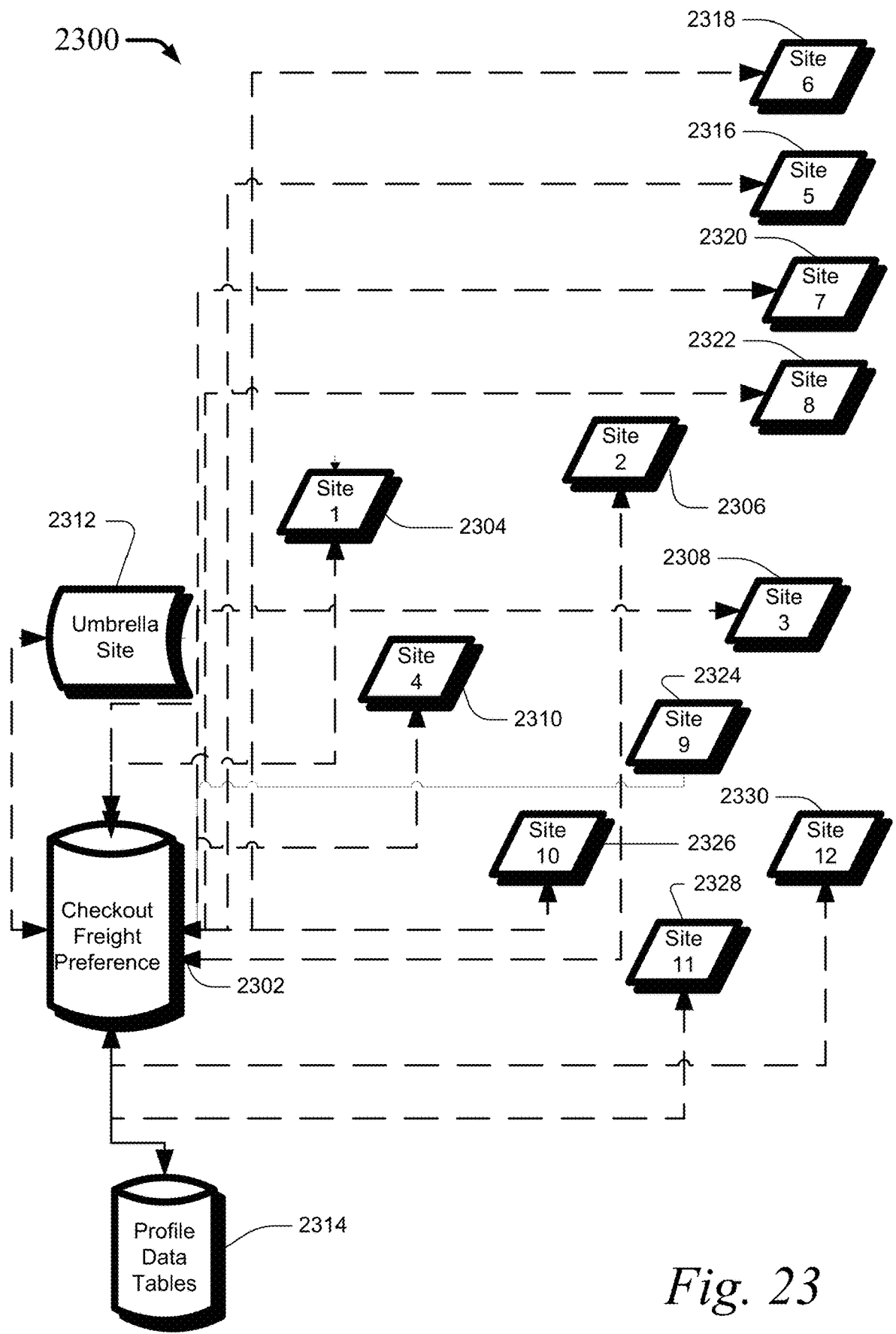
Figure 24:
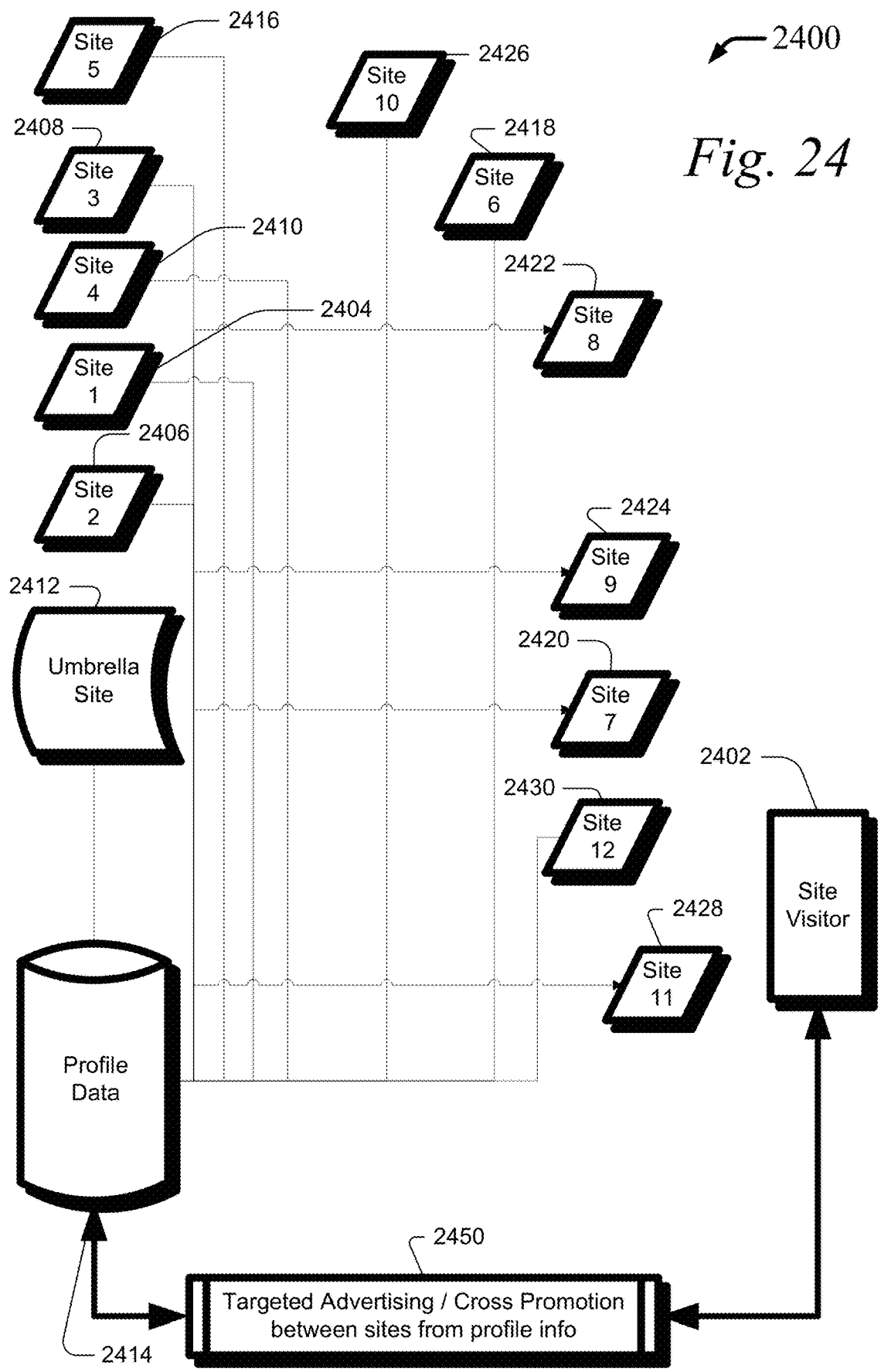

FIGS. 22-24 are flowcharts illustrating respective processes for a customer to shop a collection of different network connected merchant e-commerce websites 2204-2230, 2204-2230, 2404-2430 each of which has the use of information in customer profile data 2214, 2314, 2414. The customer account profile database can be used to allow the customer to provide information pertaining to the customer's preferred method of payment as shown in FIG. 22 at reference numeral 2202 so that the profile data will track and recognize the customer's preferred payment methods. When, in the future, the customer visits the collection of different network connected merchant e-commerce websites 2204-2230, 2204-2230, 2404-2430, the customer's profile will set the customer's preferred method of payment to the default method of payment, and can also take into account the customer's preferred type of freight company or method that best provides the customer comfort and security with the delivery of the customer's purchases. The profile data can be used to track and recognize the customer's preferred shipping methods such that, in the future, when the customer visits the collection of different network connected merchant e-commerce websites 2204-2230, 2204-2230, 2404-2430, the customer's profile will set the preferred method of shipping to the default method.

FIG. 24 shows flowchart 2400 illustrating a process for using information in a customer's account profile that can be gathered and shared between and among the collection of different network connected merchant e-commerce websites 2404-243. By using the customer's profile data along with other information gathered on the network, the collection of different network connected merchant e-commerce websites 2404-2430 can advertise and share information that is specific to the customer's interests. Having specific information in the profile data allows the information to be customized to the customer's interests and preferences. By way of example, if a customer's interests are limited only to "Ford Automobiles", then the user interface would render only those goods and services offered for sale by the collection of different network connected merchant e-commerce websites 2304-2430 that are specifically related to goods, services, advertising, and messages of or relating to Ford Automobiles. Moreover, gathering, retention, modification, and use of the customer's profile data will allow the processes to track and recognize the customer's interests and allow for targeted advertising to be directed to the customer when shopping with the collection of different network connected merchant e-commerce websites 2304-2430.

Figure 25:
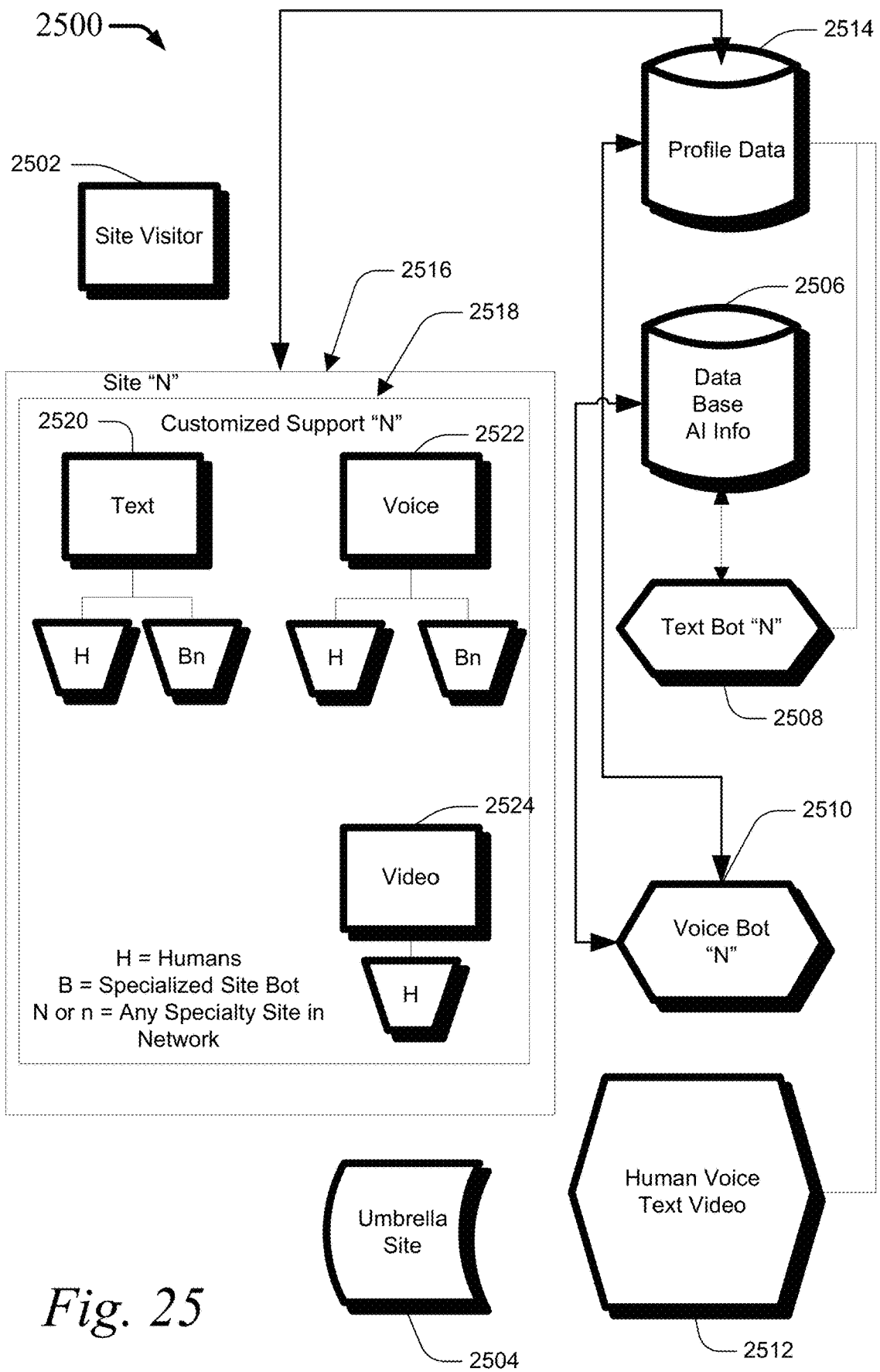

FIG. 25 shows a flowchart 2500 for a process in which information for a customer can be stored for subsequent sharing in profile data 2514 across a network of connected merchant e-commerce websites 1-N 2516. Each connected merchant e-commerce website (n) offers customized support 2518 by way of text functions 2520, voice functions 2522, and/or video functions 2524. Note that functions 2520-2524 can be enabled a human and/or robotically, and can be assisted via artificial intelligence using information in a network accessible database 2506. The associated and affiliated sites of the umbrella of sites will benefit significantly from this unique specialty site concept whereby they can participate with costly future web necessities such as artificial intelligence (AI).

Figure 26:
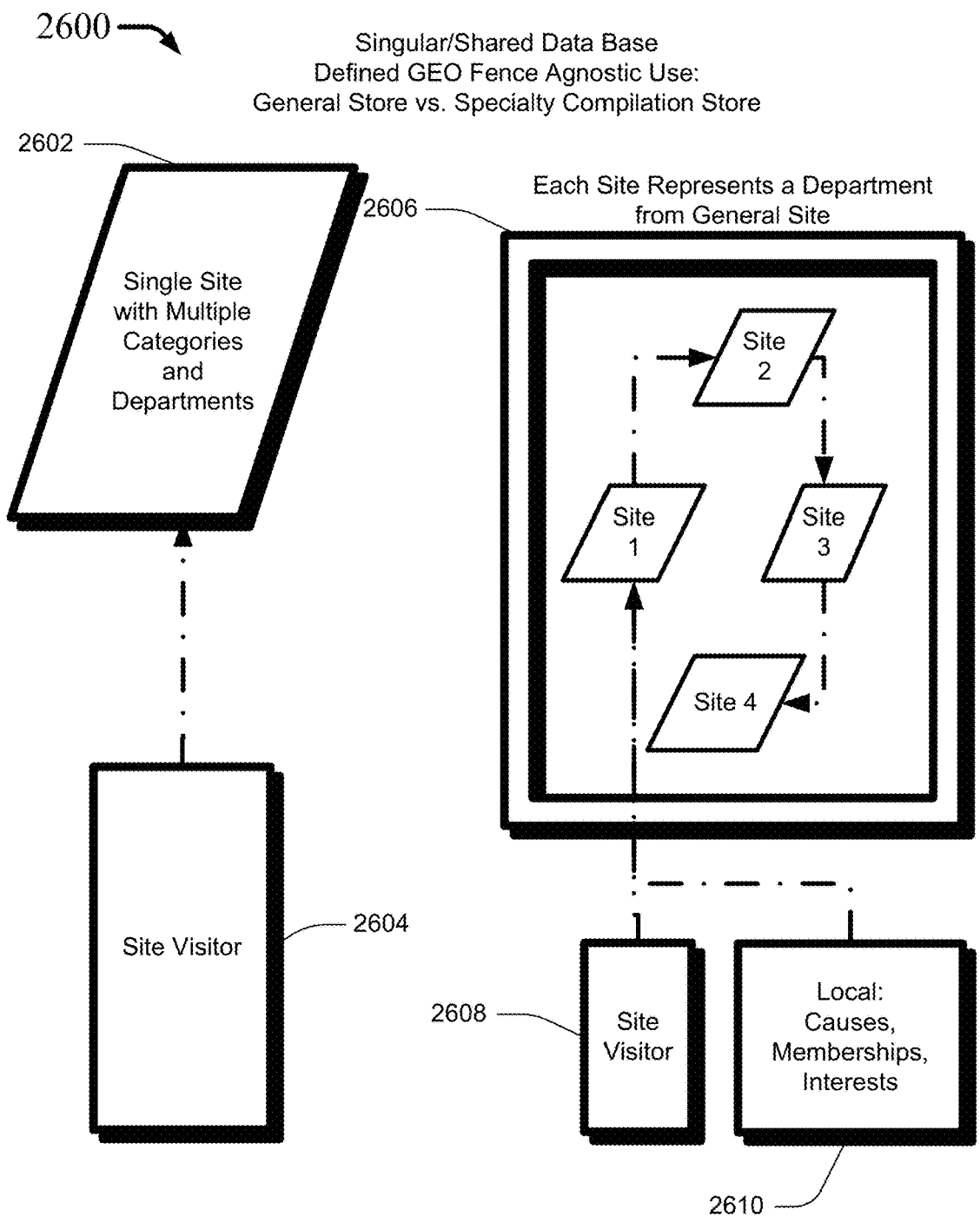
FIG. 26 is a flowchart illustrating an exemplary process involving a singular/shared data base accessed by a defined geofenced URL agnostic website application for a general store vs. specialty compilation store, where each website represents a department from a general website.
Figure 27:
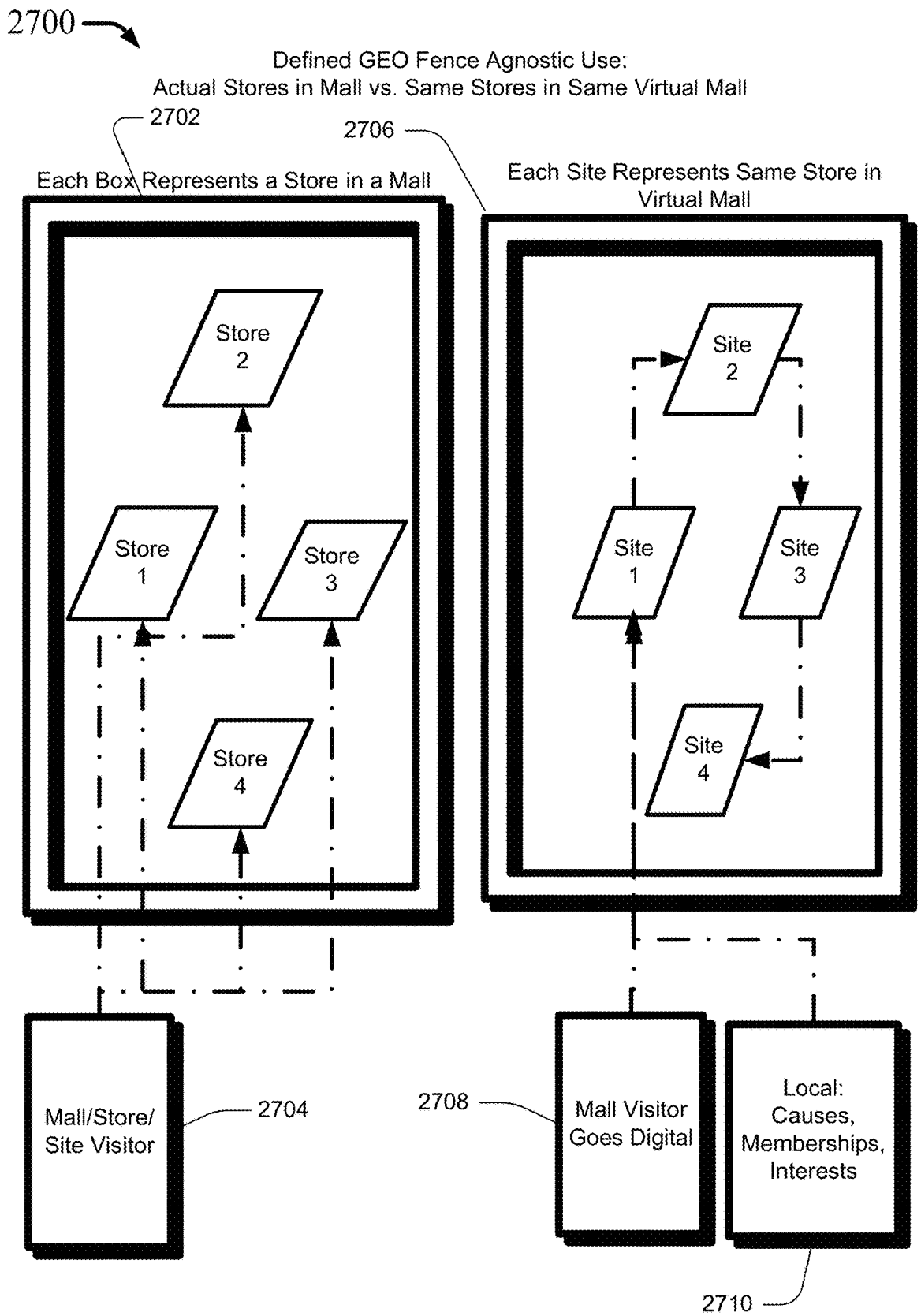
FIG. 27 is a flowchart illustrating an exemplary process involving a defined geofenced web URL agnostic application for actual stores in a mall versus the same stores in the same virtual mall, in which each box shown in the flowchart represents a store in a mall, and each website represents the same store in a virtual mall.
Figure 28:
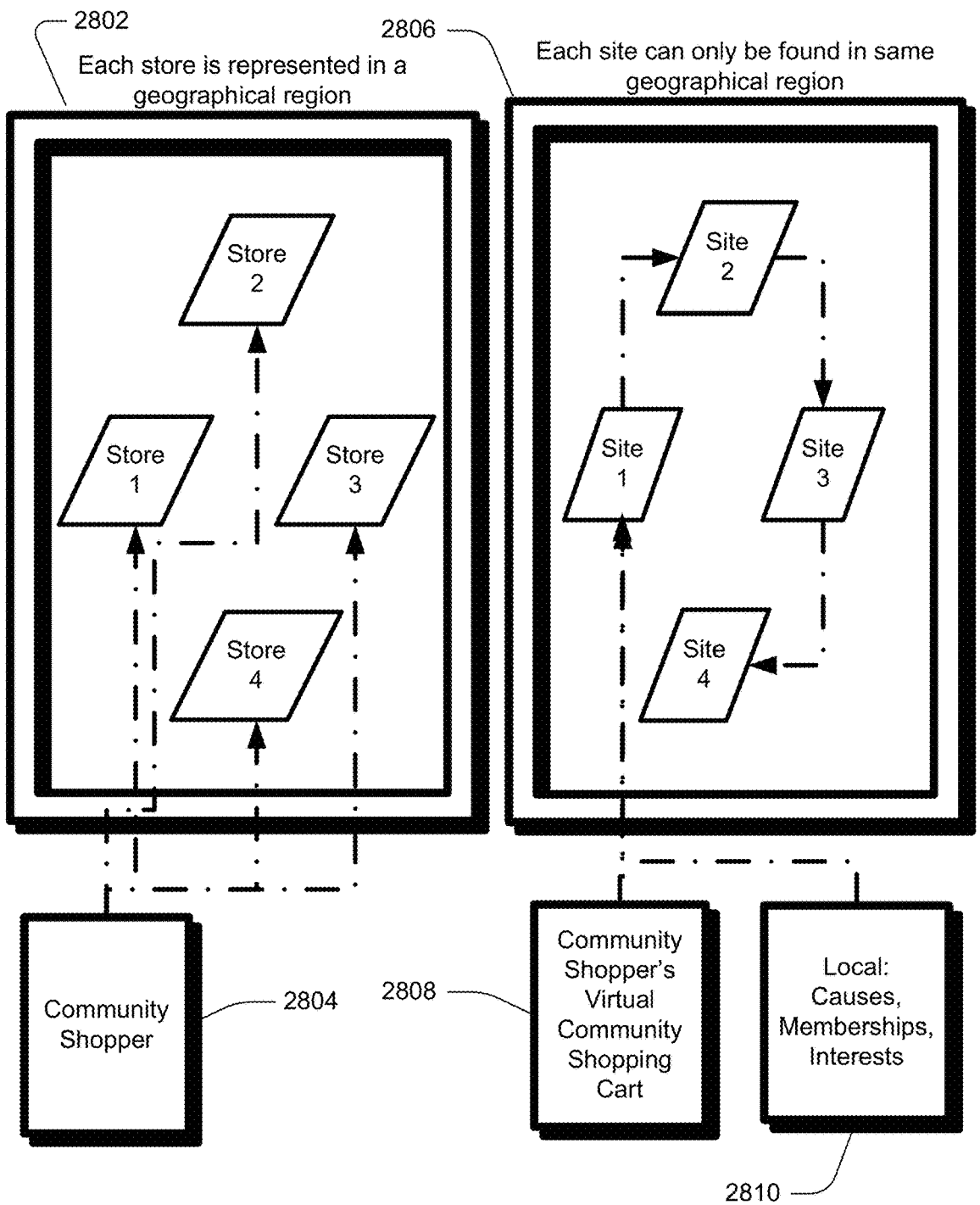
FIG. 28 is a flowchart illustrating an exemplary process involving a defined geofenced web URL agnostic application for a geographic community with stores and websites versus a geographic community with a network of specialty websites to promote local buying by local customer of local merchants, where each store is located in a geographic region, and where each store has a website representing that store in that geographical region.

Referring now to FIGS. 26-28, implementations support and enhance a local business community by creating a geofenced environment for local businesses, communities, government, non-profit entities (e.g., charitable and/or consumer affinity entities), and for the consumer. This unique geofence strategy enables the local community to derive benefits from the occurrence of local merchant-consumer transactions. Benefits provided by these implementations, via a localized digital network, can enhance the financial stability of merchants and non-profit entities in the local community as they respectively compete with large, online retailers take would otherwise attract a larger portion of the local consumer transactions. The localized digital network implementations disclosed here function as a digital commercial community connector by providing digital tools to like-minded local community merchants to be able to provide greater donations to local community non-profit entities as well as increases in transaction with local consumers in the community.

The specification and drawings illustrate tools by which local community merchants can cross sell and cross promote the goods and services other local community merchants for placement in the shopper's virtual shopping cart. Each local community merchant is allowed to select which of the other local community merchants with which to cross sell and promote. In practice, each such selection would be directed towards other local community merchant that are not in direct competition with the cross selling and promoting local community merchant. By way of example, the Merchant Identifier (MID) with which each merchant is classified can be used to identify and avoid cross selling and promoting direct competitors. Alternatively, a randomized process might allow an initial selection of local community merchants in close proximity to each other to cross sell and promote, followed by a review thereof to avoid the selection of direct competitors. By way of example, with a goal of increasing the number of transactions with local community customers seeking an evening of dinner and a show, a local motion picture theatre might select neighboring restaurants to cross sell and promote.

Webpages at which local community merchant cross sell and promotion other non-competitor local community merchant might be enhanced to indicate and identify the latter by way of an icon placed on geographic map showing the location of the latter type of merchant. By way of example heart-shaped logos on a webpage map on can show a consumer the locations of similarly minded local community merchants who are being cross sold and promoted by the merchant's website. Note that the map will be geofenced appropriately so as to indicate and identify only those local community merchants likely to benefit the local community by way of their transactions being conducted with local community customers.

The cross selling and cross promoting of the goods and services of other local community merchants for placement in the shopper's virtual shopping cart has a goal to support the local community by of donations by such merchant to charities and affinity entities selected by the consumer that conducts a transaction with the merchant. Note that pseudo MIDs can be used for logically distinguish and identify each merchant having one or more goods and/or services placed by the shopper into the virtual shopping cart. As, implementations provide a local shared virtual shopping cart that is filled with goods and services by way of cross-selling for a local community consumer.

Process 2600, shown in FIG. 26, is facilitated by way of singular data base and/or a data base that is shared with a plurality of local community merchants. An eCommerce website 2606 that facilitates process 2600 is defined for the geofenced plurality of local community merchants. Website 2606 allows a customer, a check-out portion of process 2600, to purchase the contents of the virtual shopping cart in a single transaction at any of the merchant e-commerce websites so to make the single purchase transaction agnostic as to the web address of the merchant e-commerce website at which the single purchase transaction was conducted by the customer. FIG. 26 contrasts a general store single website 2602 versus a specialty compilation store eCommerce website 2606. The single website 2602, having a site visitor 2604, is shown to feature the sale of multiple categories of goods and services by a plurality of different departments. In contrast, at reference numeral 2606, each website 1-4, having a site visitor 2608, represents a department from the general website 2606 at which there is featured multiple categories of goods and services by a plurality of different departments from which website visitor 2608 can select goods and services to place into a shared virtual shopping cart. In summary, FIG. 26 illustrates an implementation of a URL agnostic approach that takes a single website featuring a plurality of different categories of goods and services being offered for sale by a plurality of different departments. Many of these website's organizations have specific memberships that provide benefits to consumers. Using the URL agnostic approach, these organizations can enhance the user experience by providing specific site data.

FIG. 27 contrasts the model of actual stores 1-4 in a shopping mall 2702 versus an eCommerce virtual mall website 2706 having embedded therein a plurality of websites 1-4 each of which represents the same stores 1-4 in mall 2702, albeit virtual stores, in the virtual shopping mall 2706 that is being shopped by a mall/store website visitor 2706. The eCommerce mall website 2706 allows website visitor 2706 to purchase the contents of a virtual shopping cart, which may contain goods and/or services selected for purchase from more than one of websites 1-4, in a single transaction at any of the merchant e-commerce websites 1-4 so to make the single purchase transaction agnostic as to the web address of the merchant e-commerce website at which the single purchase transaction was conducted by website visitor 2706. In summary, FIG. 27 illustrates a URL agnostic use for a specific area or community that provides local community consumers and local community merchants alike with opportunities to provide a heightened localized experience allowing them to support a local strip or destination mall. The purpose or usage of these implementations is to allow the local community merchants that currently share a defined geographical area, such as a strip mall, to network together to provide an enhanced experience to the local community. This Merchant-Community Network provides a unique benefit to the local community's consumers because the local community merchants can target those customers in the region community. This targeted use over time will allow the Merchant-Network to enhance the experience and gather local data that can be leveraged to provide.

FIG. 28 contrasts the model of a geographically defined local community having therein actual stores 1-4 with their respective website as shown at reference numeral 2802 being shopped by a community shopper 2804 versus a geographically defined local community providing an eCommerce model defined by a network of websites each selling only a special selection of goods and services different from that of other websites in the network. Note also that each website 1-4 shown at reference numeral 2806 represents a merchant that has a geographic location within the same geographic region that defines the local community. A virtual shopper selects goods and services from website 1-4 for placement in virtual community shopping cart 2808. The eCommerce mall website 2806 allows each website shopper to purchase the contents of virtual shopping cart 2808, which may contain goods and/or services selected for purchase from more than one of websites 1-4, in a single transaction at any of the merchant e-commerce websites 1-4 so to make the single purchase transaction agnostic as to the web address of the merchant e-commerce website 1-4 at which the single purchase transaction was conducted by website shopper. As such, there is a promotion of local buying by local customer from local merchants. In summary, FIG. 28 illustrates a multi-merchant eCommerce virtual shopping cart for use in a URL agnostic network that allows for multiple uses and applications that can provide an improved localized experience for a local community. As defined by a physical address or postal code, the URL agnostic application provides the local community users/customers the ability to experience a specific range of websites that are applicable to the region/community in which they live, work and play in. The geographical components of the implementations disclosed herein allow the consumer to contribute to those stores that are physically located within the typical defined geographical region they consider to be the area/boundary they typically support and regularly shop as defined by a specific distance or time threshold from where they live or work.

FIGS. 1-28 illustrate implementations by which there can be a promotion of local buying by local customer from local merchants by providing a series of associated merchant websites or respective merchant websites that each sell narrowly defined product categories to shoppers who browse to select products for placement into a shopping cart. While each website is operated and controlled by a different merchant or a single merchant, each website has access to a shared server farm where information about each shopper is stored. Also shared is a virtual e-commerce shopping cart that the shopper can use to check out at any of the merchant websites even though the virtual e-commerce shopping cart may contain products from multiple different merchant websites. Various implementations illustrated in FIGS. 1-28 are intended to be used in various combinations with various implementations illustrated in FIGS. 29-35 to provide even greater promotions of local buying by local customers from local merchants.

Figure 29:
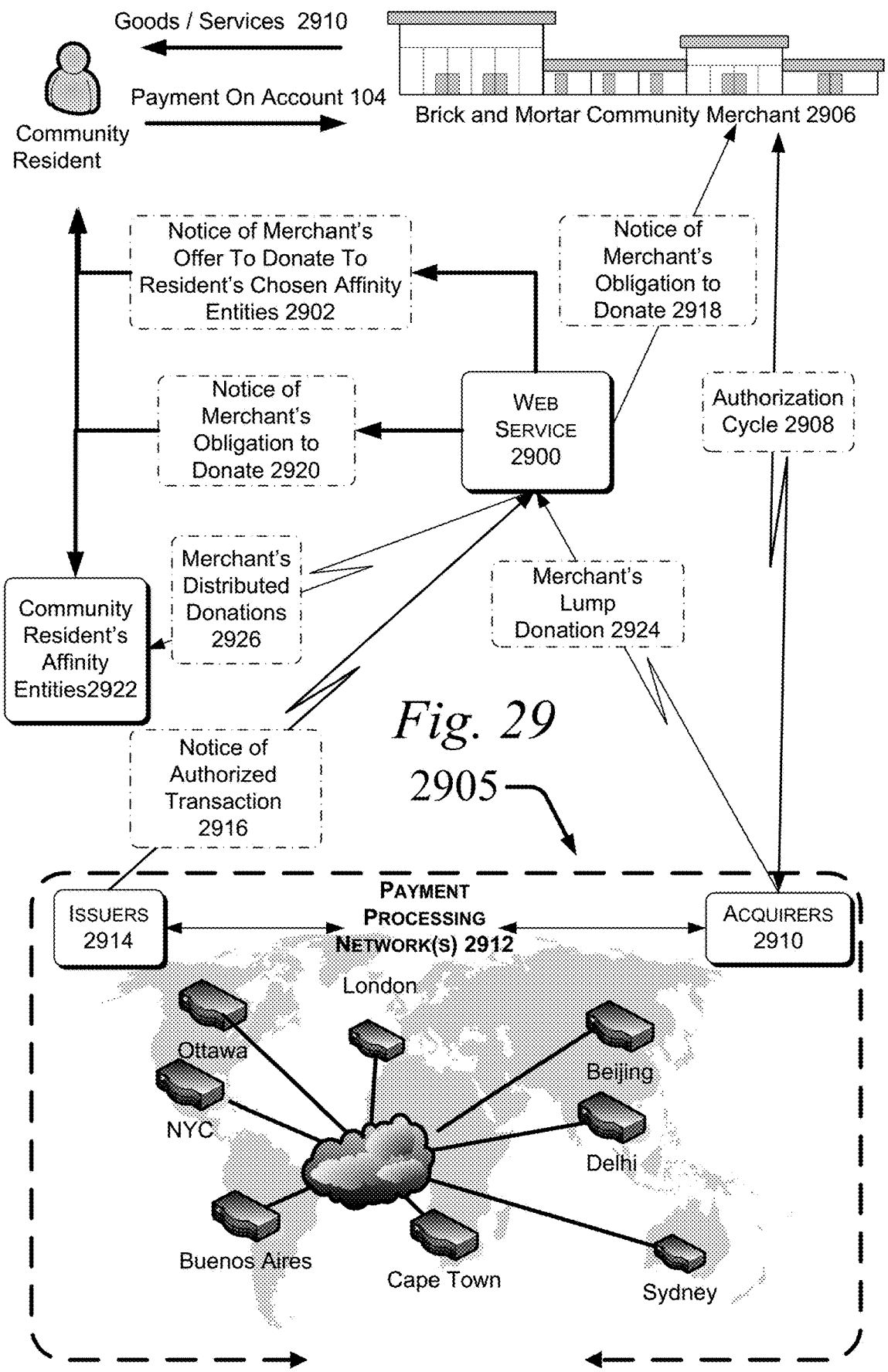
FIGS. 29-30 are flowcharts illustrating respective exemplary processes that allow an account holder to make a purchase of goods and/or services from a merchant, where the account holder's transaction obligates the merchant to make a donation an affinity entity that make also be a charitable organization (e.g., a charity)

Referring now to FIGS. 26-29, an environment is depicted for a global acquired account payment processing system 2905 as shown in FIG. 29. FIG. 29 shows a community resident who is incentivized to transact by way of a merchant's offer 2902 to a make a donation in exchange for the community resident purchasing goods and services 2900 by the community resident's payment on an account 2904 that was issued by an issuer 2914 to the community resident. FIGS. 26-29, respectively at reference numerals 2610-2810, show one or more local causes, local memberships, or local interests with which each website 1-4, respectively at reference numerals 2606-2806, are associated and to which each merchant corresponding to each website 1-4 will make a donation when a transaction is conducted with a community resident for implementations discussed below with respect to FIGS. 29-35. Note that, in some implementations, the merchant sets terms and conditions under which the donation will be made, while the community resident selects those affinities entities to which the merchant's donations are to be made.

The merchant, who may be operating a brick and mortar store in the community where the community resident resides, inputs data about the transaction on the community resident's account into a Point of Service terminal (POS) 2906. The POS, for example, can be a cash register, a web enabled mobile device (e.g., a tablet computing device), etc. The POS 2906 transmits the input data, as part of an authorization request in an authorization cycle for the transaction, to an acquirer 2910 for the merchant. Acquirer 2910, who is one of many entities in an Acquired Account Payment Processing System 2905, sends the authorization request through a payment-processing network 2912, as facilitated by one or more transaction handlers, to the issuer 2912 who issued the account to the community resident. In response to the authorization request, the issuer 2912 sends an authorization response for ultimate delivery back to the merchant's POS 2906 by transmissions backwards through the payment-processing network 2912 via the merchant's acquirer 2910.

If the transaction is authorized by issuer 2914, an entity in the Acquired Account Payment Processing System 2905, such as the issuer 2914, sends a message 2916 containing particulars of the transaction to a Web Service 2900 indicating that a transaction on the community resident's account was approved for being conducted by the community resident with the merchant whose offer to donate was selected by the community resident.

Optionally, the data input into POS 2906 can include additional monies received from the customer by the merchant that are also to be donated, via the merchant, to a designated affinity entity or charity. In that case, message 2916 would also contain these particulars.

Upon receipt of message 2916, a donation to the community affinity entity by the user's selected merchant can be calculated according terms and conditions specified by the merchant.

Web Service 2900 retains the derived donation for subsequent audit purposes to insure compliance by each community merchant in its donation commitments to each of the one or more affinity entities or charities. The Web Service 2900 may transmit a message containing notice of a donation, or the particularly derived donation, as shown at reference numerals 2918-2920 to respective logical addresses of the obligated merchant 2906, the affinity entities 2922, and the community resident/account holder—and/or to respective agents thereof. The terms and conditions that obligate the merchant-offeror to make a donation may, but need not, include discounts, rebates, or other monetary or non-monetary incentives. As such, the community resident is incentivized to buy from the merchant's store at least by the merchant's agreement to donate to an affinity entity or charity.

The affinity entity or charity, which may be selected at the discretion of the community resident, may be any entity to which the community resident has an affinity, regardless of where it is located or whom it serves. Alternatively, the affinity entity or charity may be limited to those organizations that provide a good and/or service to a community in which both community residences and merchants have an affinity—such as by their common geographic location. This affinity entity may provide food and clothing to needy families in their common community. This affinity entity, for example, may provide teaching and demonstrations of entrepreneurial skills to community's unemployed or under employed. Another affinity entity may provide venues where sports education can be provided to local competing youth. Yet another affinity entity may provide care and feeding to abandoned domesticated animals, such as pets. The affinity entity may also cultivate desirable citizenship and public policy through offerings of education and entertainment services—whether in person, on-line, or both. Given the foregoing, the reader will understand that the affinity entity can be either a for-profit or a non-profit organization, and may optionally be required to provide a good or a service to a local community to which both merchants and customers in the same community have an affinity, by their common location, to advance and/or promote the community.

In some implementations, each merchant will identity the affinity entity to whom the merchant-offer will make a donation. To identify the affinity entity, a customer identifier, as received by Web Service 2900 in message 2916, will look up the community where the customer resides and where the merchant-offer has a brick and mortar store. Web Service 2900 uses information in or derived from message 2916 to determine whether the merchant and its customer have the same local community. By way of example, data in message 2916 can include an identifier for the customer, and a database of merchants and their respective merchant-offers can include geographic location information. This geographic location information is matched against the geographic location information for the residence of the customer. Merchant and customer identifiers can be assigned to the merchant and its customer during or prior to any transaction, such as when each are registered with or otherwise sign up for participation with Web Service 2900. This registration process can include the collection of physical and logical addresses for each or for their respective agents.

Once physical address information for the merchant-offeror and its customer are known, the local community of each of the merchant and its customer can be determined—in some implementations. The local community determination can be made on any of several different methods, or combinations thereof. Once such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same, or within a predetermined proximity, as that of its customer's residence.

Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community.

Alternatively, a navigation algorithm, using any of various different travel methods (e.g., walking, automobile, bicycle, mass transit, etc.), can be used to determine whether the time, using one or more travel methods, is within a predetermined time limit to ascertain whether or not the merchant and its customer share the same local community or 'neighborhood'. By way of example, the merchant and its customer might be determined to be within the same local community if the automobile drive time, as determined from one or more databases of contemporary cartographic road system information, to navigate between the merchant's brick and mortar store and the customer's residence is less than a predetermined time threshold (e.g., 17 minutes).

A further alternative implementation will identify the population density of both the merchant's brick and mortar store and the customer's residence. If the population density exceeds a predetermined density, then the merchant and its customer might be determined to be within the same local community if the time to walk, bicycle or take public transportation between the merchant's brick and mortar store and the customer's residence, as determined from one or more databases of contemporary topographic, mass transit, and/or pedestrian cartographic system information, is less than a predetermined time threshold (e.g., 55 minutes). Such implementations may also access databases to consider real time traffic conditions.

Still another such comparison can be whether the merchant's place of business and its customer's residence are proximate or are the same according to voting, electoral, or political districts. The district use can be determined by an official method, an unofficial method, or a combination of methods. By way of example, measurements known within the political gerrymander sciences can be used, including but not limited to a minimum district to convex polygon ratio, shortest split line algorithm, minimum isoperimetric quotient, etc.

The local community corresponding to that of the merchant and its customer, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owned and leased properties, etc. Given the foregoing, an algorithm might find that the merchant and its customer are members of the same community, not members of the same community, or are both members of more than one of the same communities as determined by the algorithm.

Similar or different algorithms that are used to determine the respective local community of the merchant and its customer can also be used to determine the local community of an affinity entity such as that shown on FIG. 29 at reference numeral 2922, or as that shown as an Affinity Entity (k) 396 in FIG. 31, as discussed herein below.

In some implementations, if the local community of the merchant, its customer, and an affinity entity that has been selected by the customer or by other methods are the same, then the business rule selected by the merchant will determine the amount of the donation that the merchant will make to the selected affinity entity. In some implementations, the affinity entity to whom a merchant is to make a donation can only be selected the customer, and not the merchant. In such implementations, the goals or purposes of an affinity entity will not cause tension between merchant and customer in that the identity of the affinity entity is unknown to the merchant though being selected anonymously by the customer. As such, the merchant need not be told or be given any notice, directly or indirectly, as to the identity of the affinity, entity or charity selected the customer with whom the merchant is conducting a transaction. Rather, the merchant might only be told or be given notice to make a single payment of, or period payments to, a single affinity entity who, as trustee or agent, will thereafter make respective disbursements for all registered merchants accordingly to those affinity entities that had been selected those customers with whom those merchants had conducted transactions.

Various implementations can ensure that a merchant who, by force of reason or conscience, does not want to make a donation to a particular affinity entity or charity, need not do so directly, as any and all merchant donations are made blindly through other avenues or collection points that make all merchant donation disbursements to all affinity entities or charities. Accordingly, each merchant will have notice of its total periodic donations without knowing the identity of the intended recipients, thereby leaving the direction of donations fully within the discretion of the merchants' customers. Note that a limitation can optionally placed upon the customer's choice of affinity entity or charity such that the choice must be made only among those affinity entities or charities that serve the local community of the merchant, its customer, or both. Such implementations may leave the currency amount of the merchant's donation fully within the discretion of the merchant.

Web Service 2900 can use respective identifiers for the merchant and its customer (e.g., account holder) to access and retrieve geographic information for each, and then apply an algorithm to the retrieved geographic information to determine the respective local communities of the merchant and its customer, as discussed above. By way of example, the local community can be progressively granular in nature, such as: $1^{st}$ the United States of America; $2^{nd}$ the state of New York; $3^{rd}$ the portion of New York called "Long Island"; $4^{th}$ the county of Nassau within the state of New York; $5^{th}$ a portion of the Nassau County called North Hempstead; and then $6^{th}$ the specific geographic location of "Port Washington". This final level of geographic granularity indicates a community in which both merchant and customer are members, neighbors, residents, and/or the like.

The final level of geographic granularity can be used to perform a look-up against one or more databases to which Web Service 2900 has access. This access and lookup is used by Web Service 2900 to identify: (i) the affinity entity or charity for that community which, in this example, might be the Port Washington Food Bank located in Port Washington, N.Y., which charity might have been specified by the customer; and (ii) the respective identifier of the merchant's business rule (and/or the customer's business rule) that is to be used to make a calculation of the currency amount of the donation that the merchant is to make to the affinity entity or charity for that community. Business rule(s) is/are used with the currency amount of the customer's payment in order to calculate the currency amount of the donation that is to be made by the merchant to the affinity entity or charity for that community. Note that the donation can be directed to a plurality of affinity entities for the local community according to directions that had been previously specified by the customer. For example, the customer may have specified that each merchant donation is to be split evenly, or in specified portions totaling one hundred percent (100%), between five (5) local community affinity entities, for example: (i) a local youth sports team cooperative; (ii) a local charter junior high school; (iii) a local house of worship; (iv) a local political party; and (v) a local for-profit college specializing business entrepreneurialism.

Referring now to FIG. 29, the community resident can take the merchant's conditional offer 2902 to the local merchant's brick and mortar store POS 2906. After showing the offer 2902 to the merchant at the POS 2906, the community resident conducts a transaction on an account 2904 issued by an issuer to the community resident to pay of the transaction and buy goods and/services 2910 received by the community resident.

Note that terms and conditions of the transaction may differ from that of the offer presented by the community resident at the local merchant's brick and mortar store. As such, the merchant's offer to donate might not be specific to a particular good or service, but can be specific as to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or only if the currency amount of the transaction exceeds a predetermined amount, or a combination of the foregoing.

Although some terms of the offer may differ from some terms of subsequent transactions between the merchant and its customer, nevertheless, the merchant's offer to make a donation to an affinity entity (e.g., a local charity) fundamentally provides an incentive that causes, at least in part, the local community resident to navigate to the local merchant's brick and mortar store, come into the store, shop, and ultimately conduct a transaction that will bring revenue to the local merchant and its community. Advantageously, the absence of specificity in the offer as to a particular good or service allows many implementations to operate without modification to the merchant's input of data about the transaction at the POS 2906, without modifications to the POS 2906 itself, and without modifications to software executing on POS 2906.

Optionally, a community resident (e.g., customer) may accept the merchant's offer 2902 in advance of going to the POS 2906. Such advance acceptance may take place electronically, such as in response to the community resident's electronic receipt of offer 2902. Such an electronic acceptance to offer 2902 can be by way of a transmission of information from the community resident to the merchant. The transmitted information can include: (i) an identifier for the registered customer who intends to accept the merchant's offer 2902; (ii) the calculated distance and/or time for the customer to navigate from a geographic location associated with the customer (e.g., home location, work location, vacation location, etc.) to the merchant's brick and mortar store of the POS 2906 by walking, bicycling, automobile and/or mass transit; (iii) the terms and conditions of the offer including any expiration thereof; (iv) optionally any other information already conveyed to the customer, such as a statement about the donation that the merchant will make to the Affinity Entity(ies) 2922 when the customer conducts a timely transaction with merchant; and (v) other unexpired offers or advertisements that may or may not have been conveyed to the customer, terms and conditions of such other offer(s), etc.

Figure 30:
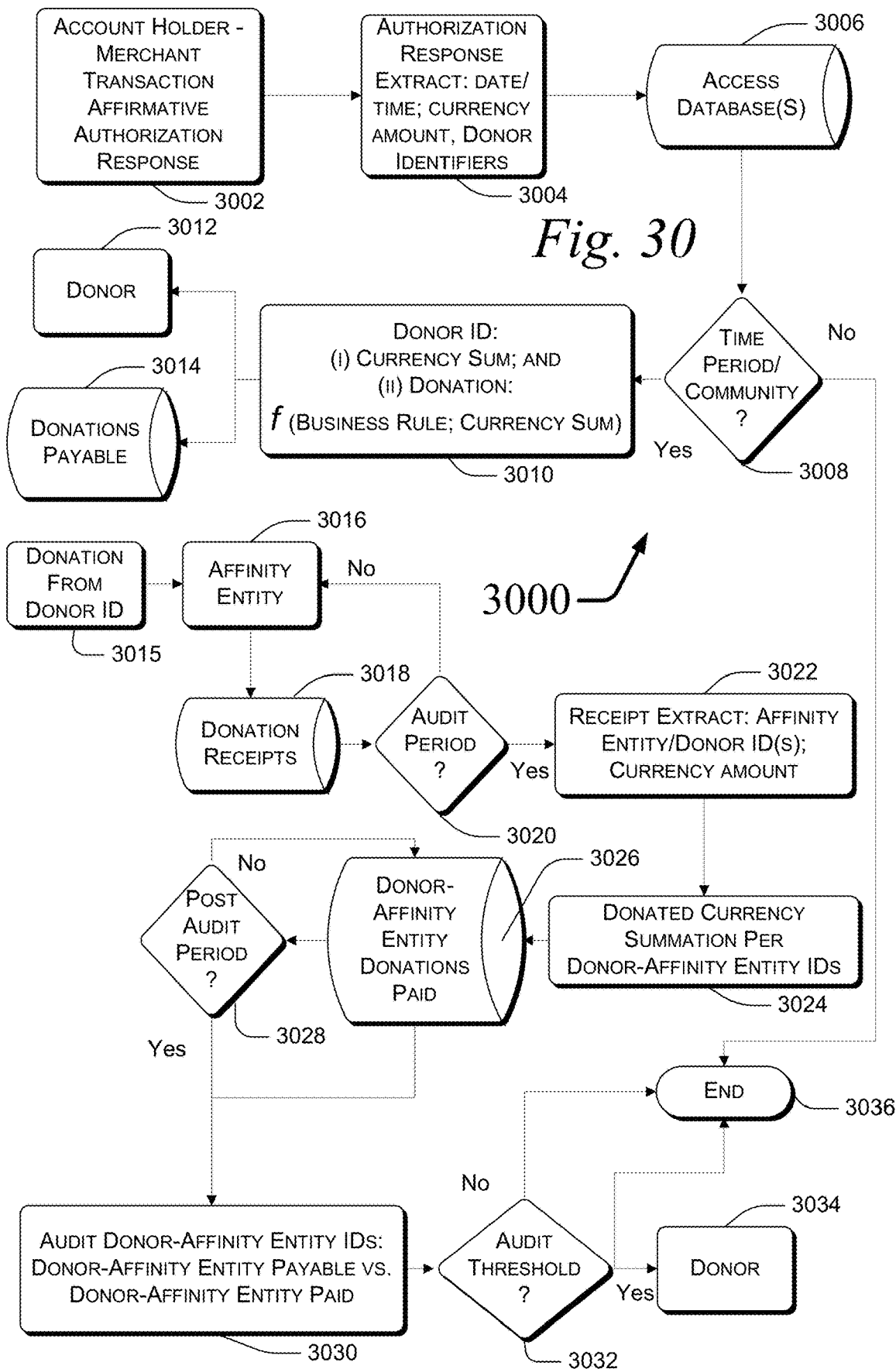
Figure 31:
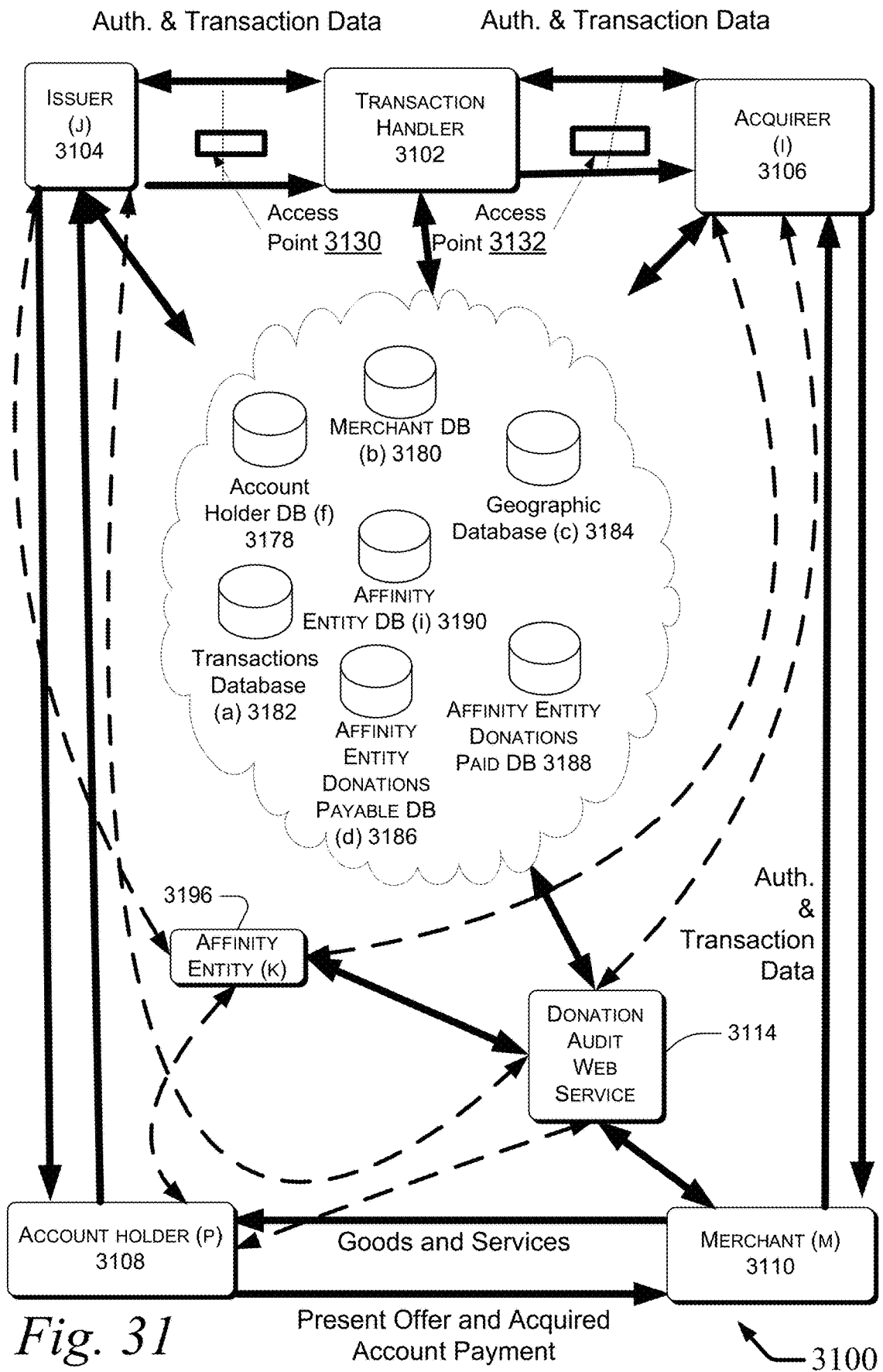
FIG. 31 illustrates an exemplary payment processing system in which the processes of FIGS. 29-30 can be performed, where the system processes transactions conducted by merchants with account holders, wherein, for each transaction, there is a provision of a service and/or good by the merchant to the account holder for the transaction which is conducted on an account issued to the account holder by an issuer, there is an authorizing and remunerating of an electronic payment by the account holder in conducting the transaction on the account with the merchant, and there are one or more donations by the merchant that are made to respective affinity entities or charities incident to the transaction.

Referring to FIG. 30, a flowchart illustrates a Process 3000 that can be performed by a system, such as a system including Web Service 2900 in FIG. 29 and/or Donation Audit Web Service 3114 seen in FIG. 31, for using local merchants' commitments to make charitable contributions as incentives to local residents to conduct transactions with local merchants. Prior to step 3002 of Process 3000, as discussed above with respect to FIG. 29, a registered local community resident conducts a transaction on an account issued to the resident at a brick and mortar store of a local community merchant. Prior to this transaction, as discussed above with respect to FIG. 29, the registered local community resident may receive one or more such offers 2902, either passively and/or actively by request.

At step 3002 of FIG. 2, information is received as derived from a positive authorization response originating from an issuer of an account, or its agent, upon which the transaction was conducted by the customer/account holder with the merchant who made offer 2902 as describe above with respect to FIG. 29. Data from this information can be extracted at step 3004 by a POS such as POS 2906 seen in FIG. 29, including, by way of example and not by way of limitation, the date and time of the transaction, a total currency amount to be paid to the merchant at clearing and settlement on the customer's account, respective identifiers for the merchant and customer, etc.

Identifiers retrieved at steps 3002-3004 can be used to access one or more databases at step 3006. The date and time for the transaction can be compared to ensure the non-expiration of the offer made by the merchant to the customer in a query at step 3008. While an invalid offer determination ends Process 3000 at step 3036, Process 3000 proceeds to step 3010 when the offer is valid as determined at query 3008.

At step 3010, rules for calculating the merchant's donation are made for one or more affinity entity recipients via retrieval of information using data acquired in steps 3002-3004. These calculations can include steps to access one or more databases as shown at reference numerals 3012-3014, including transmitting to and/or storing the calculated donations in one or more merchant donor databases 3012 and/or in one or more merchant donations payable databases 3014.

Subsequent to the acquired transaction on the resident's account as processed in steps 3002-3014 of Process 3000, the local merchant makes the calculated donation to the local affinity entity as shown at step 3015. The local affinity entity, as shown at step 3016, sends notice of the donation's receipt for storage in one or more databases as shown at step 3018.

After a predetermined audit time period as passed as determined by a query at step 3020, an audit is conducted to insure compliance by each community merchant in its donation commitments to each of the one or more affinity entities or charities for which prior notice of such donations were provided to the merchant. This audit can include adding up all required donations for each local merchant to each affinity entity or charity as shown at step 3022. The donation summation for each local merchant to each affinity entity or charity derived at step 3024 is compared to information in one or more databases 3026 to ascertain compliance of each merchant with its donation obligations. Stated otherwise, the local merchant has a certain amount of time after a predetermined audit period, as determined at step 3028, by which to complete or make all of the merchant's donation obligations to all affinity entities.

Differences between donations paid and donations still payable by each local merchant are calculated at step 3030, which differences are subjected to an audit threshold query at step 3032. If a local merchant's donations paid is non-compliant with donations still payable, as may be determined by the audit threshold query at step 3032, then Process 3000 moves to step 3034 to notify the local merchant, or its agent, accordingly of its deficiency. Otherwise, affirmative results at query 3032 causes Process 3000 to terminate at step 3036 which may also include notice of compliance being transmitted to each such complaint local merchant, its customers, and/or each of the local affinity entities. Each such notice can be either by way of summary report, donations to respective affinity entities by the merchant, and variations thereof. Note also that progressive summaries of donations can be widely broadcast periodically incident to fundraising campaigns, capital development initiatives, and times of community need, thereby providing social motivation and incentives to an entire community of participating shoppers to help charities simply by purchasing from participating merchants.

In other implementations, Process 3000 includes the exaction of data from information derived incident to a positive authorization response for an acquired transaction conducted on a resident's account, such as chronological information pertaining to the transaction including date and time, a currency amount of the transaction, and any other data desired to assist in a proper calculation of the merchant's obligatory donation to affinity entity 3016. By way of example, an identifier for the merchant can be extracted, as well as an identifier for the local community resident as offered to the merchant by the same. The account number, by way of non-limiting example, can be a Primary Account Number (PAN) including a Bank Identifier Number (BIN) for a credit or debit card that is kept by the merchant in a 'card-on-file' database.

Note that, in various implementations, business rules can be set and used such that obligatory donations to Affinity Entity(ies) 3016 can be made by one or more of the following participants in a payment processing system: the account holder, the account holder's issuer, the merchant, the merchant's acquirer, and the transaction handler. Via access to one or more databases at step 3006, and by using the merchant and/or account holder identifiers extracted from the information derived from the positive authorization response, more information can be retrieved. Thereafter, database access can retrieve business rules used to calculate one or more donations that are to be made to the charities or affinity entities by one or more donors respectively corresponding to the account holder, the account holder's issuer, the merchant, the merchant's acquirer, and the transaction handler. Each such donation can be a function of the currency amount of the transaction and the retrieved business rule(s).

In some implementations, donations, per extracted donor IDentifier (ID), are made for those transactions that occur during a predetermined time-period and, optionally, within a predefined geographic location as determined by a query (not shown). If the result regarding a community, geography, or neighborhood query is affirmative, process 3000 moves to step 3010 where the donations that are to be made by the donor participants in the payment processing system are calculated as a function of the respective business rules. Otherwise, no donation is made and process 3000 terminates at step 3036. Stated otherwise, in such implementations, Process 3000 is intended to obligate a local merchant to make a donation to a local affinity entity (e.g., a local charity) when a local resident conducts a transaction at the local merchant's brick and mortar store in the same community where the local resident resides. Note that the terms 'local', 'resident', 'residential', 'community', neighborhood, and the like, can be alternatively defined as described elsewhere herein.

As in other implementations described above, donations calculated at step 3010 are communicated to the local merchant donor, or its agent, at step 3012, and are stored in a donations payable database 3014. Thereafter, donations 3015 are received at affinity entities 3016 at step 3015 from donors identified by either respective donor IDs, which can be the identifier for the merchant or for other payment processing system participants. Donations received are stored in donation receipts database 3018. Data from donations that are made by donors via communication to affinity entities 3016 during an audit period, as determined at query 3020, is extracted at step 3022. The donation-related data that is extracted at step 3022 can include the donor ID, and the currency amount of the donation. During the audit period, a sum of donations to each affinity entity 3016 made by each local merchant donor for the audit period is calculated and stored in a donor-Affinity Entity donation paid database 3026. After a predetermined time period, an audit period begins, as determined by query 3028. During the audit time period, differences in donations paid are compared to donations payable for each donor at step 3030. Differences exceeding a predetermined audit threshold, as determined by query 3032, are communicated to the respective local merchant donors, or their respective agents, at step 3034. Of course, the charitable audit functions, such as have been described above, can be performed by an agent of any donor and/or of a loyalty system organization charged with implementing all or portions of process 3000. Such an auditing agent can be, by way of non-limiting example, a certified public accountancy agency, a non-government regulatory agency, a governmental agency, and the like.

As further discussed above with respect to various implementations, a donation mechanism can be set up such that the merchant-donor makes blind donations, either directly or indirectly, to a single donation disbursement entity who in turn disburses the donations to those affinity entities selected by the customers of the merchant-donor. This donation mechanism provides neither knowledge nor notice to merchant-donor as to the identities of its donation recipients, thereby avoiding circumstances that force a merchant, by virtue of its prior commitment, to donate to a local community affinity entity or charity whose role or purpose is inimical or otherwise repugnant to the merchant-donor. As such, the donation mechanism leaves the direction of the merchant's donation fully within the discretion of the customer, limited only, in some implementations, by the restriction that the customer can only select from among those affinity entities or charities that serve the local community that is in common to both the customer and the merchant-donor, while leaving the actual currency amount of the donation fully within the discretion of the merchant-donor.

Referring now to FIG. 31, an exemplary process 3100 is depicted of a particular financial transaction system, such as may be described as an open loop system, in which an account holder (p) 3108 conducts a financial transaction with a Merchant (m) 310. By way of example, the Account Holder (p) 3108's financial transaction with the Merchant (m) 310 may have been incentivized by the Merchant (m) 310's agreement to make a donation to an Affinity Entity (k) 395 in the local community as defined by the Merchant (m) 310 through an ad incentive which, optionally, can be communicated to Account Holder (p) 3108, whether requested or not.

In FIG. 31, by way of explanation for the nomenclature of reference numerals used and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 3104-3110 and 3176-3190, and 3196 in FIG. 31 are illustrated with a block, but indicate one or more elements can be present. For example, Issuer (j) 3104 is one of a possible plurality of issuers, where j may range from 1 to a large integer 'J'.

Account Holder (p) 3108 presents an electronic payment device (i.e.; a credit card) to a Merchant (m) 310 as tender for a financial transaction such as a purchase of goods and services. As part of the transaction, the Account Holder (p)'s 3108 payment device can be a credit card, debit card, prepaid card, cellular telephone, Personal Digital Assistant (PDA), etc. Those of skill in the art will recognize that other financial transactions and instruments other than credit cards may also be used, including, but not limited to, a prepaid card, a gift card, a debit card, a token equivalent of an account as communicated via cellular telephony, near field communications, and the like. For purposes of illustration and explanation, however, reference will be made to a credit card.

The payment device can be manually keyed into a POS or can be read by a reader operated by the Merchant (m) 310, whereupon account information is read from the payment device and a request for authorization is transmitted to the Merchant (m) 310's Acquirer (i) 3106. Each Acquirer (i) 3106 is a financial organization that processes credit card transactions for businesses, for example merchants, and is licensed as a member of a Transaction Handler 3102 such as a credit card association (i.e., Visa Inc., MasterCard, etc.) As such, each Acquirer (i) 3106 establishes a financial relationship with one or more Merchants (n) 310.

The Acquirer (i) 3106 transmits the account information to the Transaction Handler 3102, who in turn routes the authorization request to the account holder's issuing bank, or Issuer (j) 3104. The Issuer (j) 3104 returns information via an authorization response to the Transaction Handler 3102 who returns the information to the Merchant (m) 3110 through the Acquirer (i) 3106. The Merchant (m) 310, now knowing whether the Account Holder (p) 3108's credit card account is valid and supports a sufficient credit balance, may complete the transaction and the Account holder (p) 3108 in turn receives goods and/or services in exchange. Most credit card associations instruct merchants that, after receiving an affirmative authorization response, the detailed credit card account information obtained by a point of service terminal (e.g., such as via a magnetic stripe scanner) must be deleted.

To reconcile the financial transactions and provide for remuneration, information about the transaction is provided by the Merchant (m) 310 to Acquirer (i) 3106, who in turn routes the transaction data to the Transaction Handler 3102 who then provides the transaction data to the appropriate Issuer (j) 3104. The Issuer (j) 3104 then provides funding for the transaction to the Transaction Handler 3102 through a settlement bank. The funds are then forwarded to the Merchant's (n) 310 Acquirer (i) 3106 who in turn pays the Merchant (m) 3110 for the transaction conducted at step 362 less a merchant discount, if applicable. The Issuer (j) 3104 then bills the Account holder (p) 3108, and the Account holder (p) 3108 pays the Issuer 3104 with possible interest or fees.

Also shown in FIG. 31 are one or more Affinity Entities (k) 396 and a Donation Audit Web Service 314 that implementations processes by which donations to the one or more Affinity Entities (k) 396 from various donors, for instance, any Issuer (j) 3104, an Merchant (m) 3110, any Acquirer (i) 3106, and the Transaction Handler 3102. Donation Audit Web Service 314 implementations processes for the auditing of donations to the one or more Affinity Entities (k) 396. The Donation Audit Web Service 314 has access to information resources within the following databases: Account Holder DBs 378; Merchant DBs 380; Transaction Databases 382; Geographic Databases 384; Affinity Entity Donations Payable 386; Affinity Entity Donations Paid 388; and Affinity Entity Database 390.

By way of example, and not by way of limitation, construction of local, geographic, residential or community associations between merchants and their customers can include factors such as geographic, political, demographics, local transportation modes, navigational algorithms for geo-political regions, cartographic data, planned communities, population density, cultural divides, racial population constituencies, census statistics, socio-economic factors, and combinations thereof.

As shown in FIG. 31, Databases 378-790 can be connected by one or more private or public networks, virtual private networks, the Internet, or by other means known to those skilled in the art. Moreover, not every entity seen in FIG. 31 at reference numerals 3108, 3110, 3196 and 3194 must necessarily have real time, uninterrupted access to any or all of the Databases 3178-3190. Each such Database 378-390 can assign, read, write, and query permissions as appropriate to the various entities. For example, a Merchant (m) 310 may have read access to the one or more Transactions Databases 382.

Each Transactions Database (a) 3182 can be designed to store some or all of the transaction data originating at the Merchants (n) 3110 that use a payment device for each transaction conducted between an Account holder (p) 3108 and the Merchant (m) 3110. The transaction data can include information associated with the account of an Account holder (p) 3108, date, time, and an identifier sufficient to determine a physical geographic location where the transaction took place, among other more specific information including the amount of the transaction. The database can be searched using account information, date and time (or within proximity thereof), or by any other field stored in the database.

The Transactions Database (a) 382 is also designed to store information about each Merchant (m) 310, where the information can include a unique identification of each Merchant (m) 310, an identifier for each point of sale device in use by the Merchant (m) 310, and a physical geographic location of each store of the Merchant (m) 310.

Also included in the Transactions Database (a) 382 is account information for payment devices associated with Account holder (p) 3108, such as part or all of an account number, unique encryption key, account information, and account name of an account holder who is registered to participate in a system in which donations can be made to each Affinity Entity (k) 390 as per rules stored in Merchant Database (b) 380. After registering to participate in the donation system, an Account holder (p) 3108 initiates a qualifying purchase transaction with a Merchant (m) 310 by presenting a payment device (not shown) to the Merchant (m) 310. The payment device is typically presented at the Point Of Service terminal (POS) at which data thereon is read. Certain transaction information is transmitted from the POS (e.g., card track data) in route to the Merchant's (n) 310 Acquirer (i) 3106. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (m) 310, and the ultimate destination, such as the Acquirer (i) 3106. These points can include, without limitation, from the reader at the POS, the POS at the Merchant (m) 310 and a network router or computer that is connected to a network but is housed and maintained by the Merchant (m) 310 and between the Merchant (m) 310 and the Acquirer (i) 3106. The communication channel could be Ethernet, wireless internet, satellite, infrared transmission, or other known communication protocols. Some or all of the transmission may also be stored for record keeping, archival or data mining purposes with little or no encryption. For example, the Merchant (m) 310 may store transaction data, including certain account information in the Merchant's (n) 310 accounts on file database for reuse later.

During a transaction conducted by Merchant (m) 3106 on an account issued by Issuer (j) 3104 to Account Holder (p) 318, information relating to the qualifying purchase is retrieved from the POS at Merchant (m) 3106. The transaction information is comprised of account information together with other information about the transaction itself: time, date, location, value, etc. Certain of the transaction information are considered sensitive information including, without limitation, account number, credit card verification number, and account name.

For the Account Holder (p) 3108 to donate to each Affinity Entity (k) 3196 as may have been previously specified, the Account Holder (p) 3108's Issuer (j) 3104 can pay the Affinity Entity (k) 3196 and apply a debit in that currency amount on the Account Holder (p) 3108's periodic revolving credit statement. The Account Holder (p) 3108, upon receipt of the statement, can thereafter make a total payment to the Issuer (j) 3104 of the currency amount of the donation that appears as a debit on the statement along with the other credit charges that also appear on the Account Holder (p) 3108's statement.

As discussed below with respect to FIGS. 32a through 33b, both the Account Holder (p) 3108 and the Merchant (m) 3110 can change or disable a donation commitment at any time by accessing a server that serves web pages where respective user interfaces are provided. Thus, charitable donation commitments can be enabled or disabled using real time user interfaces. By way of example, and not by way of limitation, such servers can be hosted by the Donation Audit Web Service 3114 seen in FIG. 31.

In various implementations, Donation Audit Web Service 3114 seen in FIG. 31 receives information that confirms such a timely transaction between the customer and the merchant by way of receiving information derived from an authorization response for the transaction. As more fully described elsewhere herein with respect to FIG. 31, the information in the authorization response is typically generated by an Issuer (j) 3104 who issued an account to the Account Holder (p) 3108 (e.g., the customer or mobile device user) on which the timely transaction with the Merchant (m) 3110 was conducted. A positive authorization response reflects the Issuer (j) 3104's approval of the transaction on the account issued to Account Holder (p) 3108. Stated otherwise, and as shown in FIG. 31 and discussion herein below, Donation Audit Web Service 3114 receives the information derived from an authorization response from an acquired account payment processing system (i.e., see Ref. Num. 2905 in FIG. 29), where each of the Issuer (j) 3104, the Account Holder (p) 3108, and the Merchant (m) 3110 operate in the acquired account payment processing system.

Figure 33A:
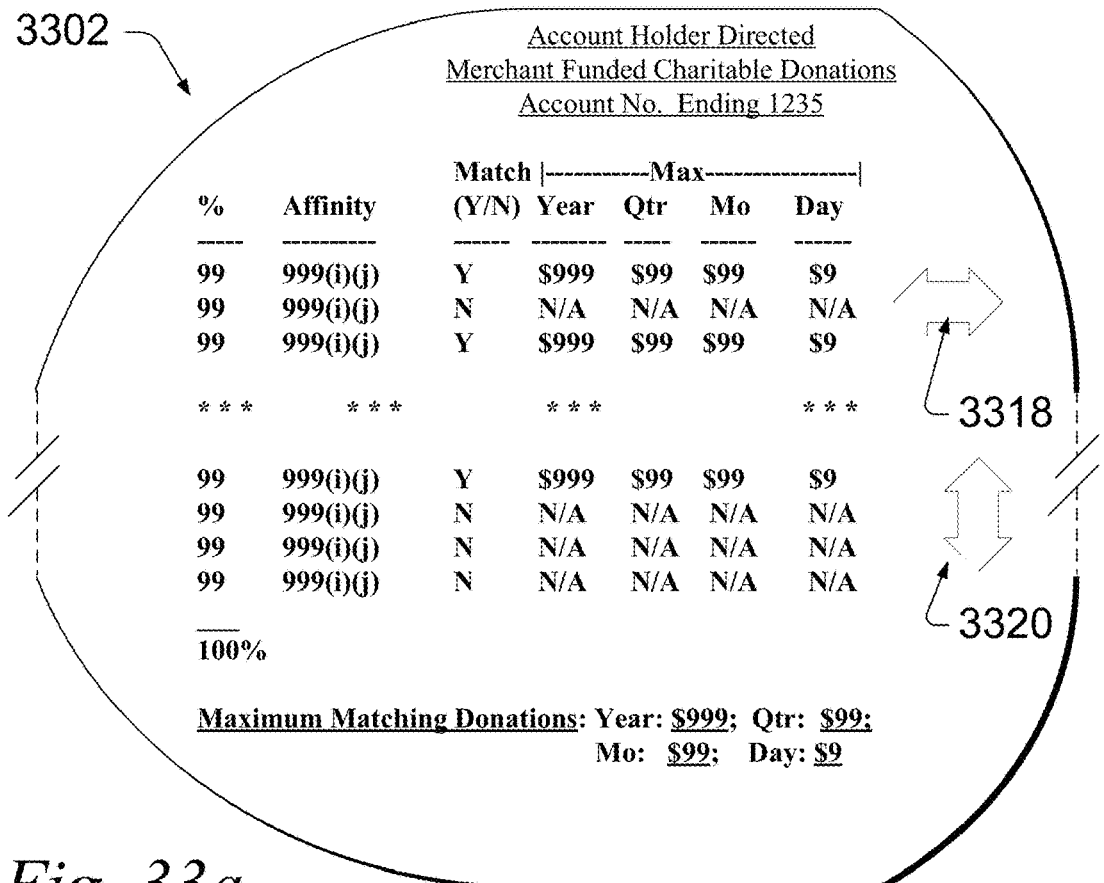
FIGS. 33a-33b illustrate screen shots characterizing exemplary user interfaces for an account holder to specify one or more affinity entities to whom a donation will be made by a merchant with whom the account holder conducts a transaction on an account issued to the account holder, and optionally also for the account holder to specify one or more affinity entities to whom a donation by the account holder will be made when the account holder conducts a transaction with the merchant on their account so as to match at least a portion of the donation by the merchant.
Figure 33B:
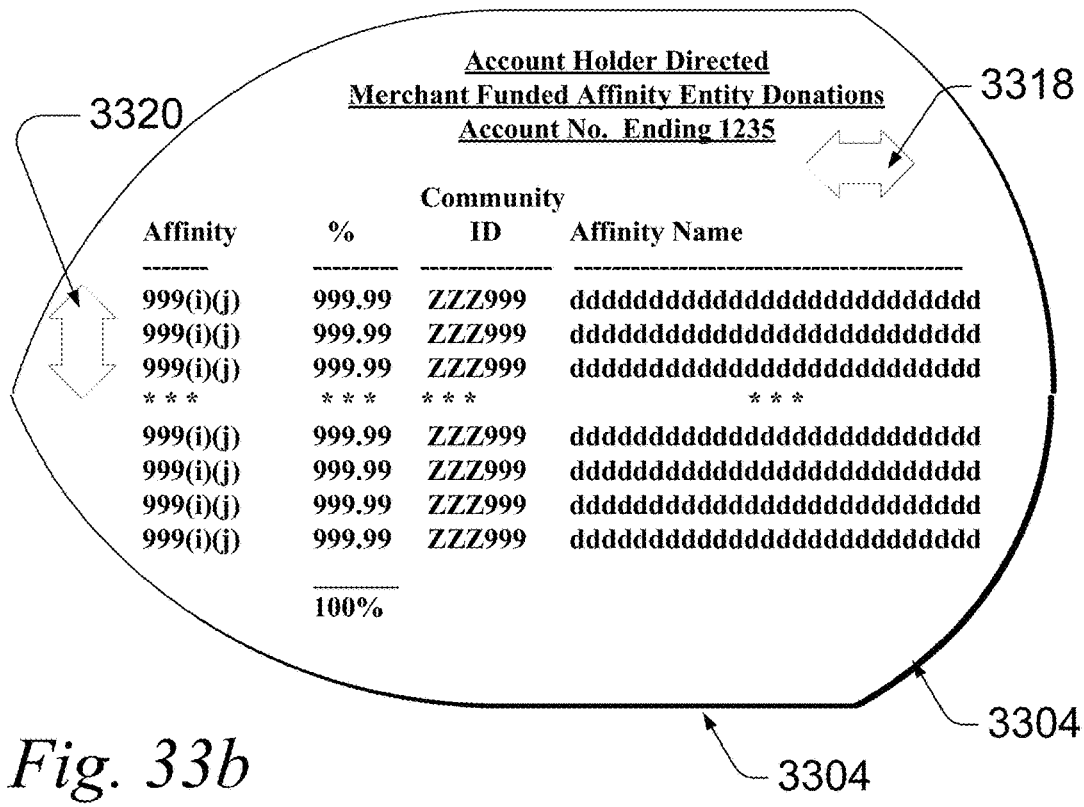

Once confirmation has been received by Donation Audit Web Service 3114 that a timely transaction has taken place been the merchant who made the offer and the customer who selected and confirmed that offer, a calculation is made of an amount of a donation that is to be made by the merchant-offeror according to terms of the offer. By way of example, the terms of the offer to make the donation to the community affinity entity or charity 396 may have been previously input for storage in Merchant DBs 3180 by way of the merchant's user interface provided by an application executing on a computing device, such as in conjunction with a screen shots 3202-3204 seen in FIGS. 32a-32b as described herein below. To give notice of the donation obligation that has arisen, the calculated donation can be sent in one or more transmissions from Donation Audit Web Service 3114 to one or more logical addresses such as: (i) the Merchant (m) 3110; (ii) the Affinity Entity 3196; (iii) the Customer or Account Holder (p) 3108—or to respective agents thereof. Optionally, information that identifies the Affinity Entity 3196; and/or (iii) the Account Holder (p) 3108 can be included in any such transmission.

Where the Affinity Entity 3196 to which the Merchant (m) 3110 is obligated by the timely transaction to make a donation is specified by the Account Holder (p) 3108 (e.g., such as by use of a user interface having a screen shots 3302-3304 seen in FIGS. 33a-33b, respectively), the identity of the Affinity Entity 3196 need not be communicated to the Merchant (m) 3110. Rather, the Merchant (m) 3110 can make a blind donation of the calculated amount to a third party for distribution to the Affinity Entity 3196 in the Account Holder (p) 3108's residential community. By such blind, albeit obligatory, merchant donations, conflicts and disagreements between Account Holder (p) 3108 and Merchant (m) 3110 as to right and proper objects of charity or affinity to the community can be avoided. As such, the Account Holder (p) 3108 will transaction with community Merchants 3110 by way of incentives from the community Merchants 3110 that they will donate to the Account Holder (p) 3108's favorite charity (e.g., Affinity Entity 3196), though the charity may not be the Merchant (m) 3110's favorite charity, or even a desirable charity, in that community. Nevertheless, the Merchant (m) 3110 has received the benefit of customers' foot traffic inside the merchant's local brick and mortar store, as well as the benefit of transactions with some of those customer who enter the merchant's brick and mortar store, where each such benefit is realized by the merchant's offer to make a donation to the customer's favorite charity(ies) if a timely transaction occurs subsequent to the merchant's offer.

Figure 32A:
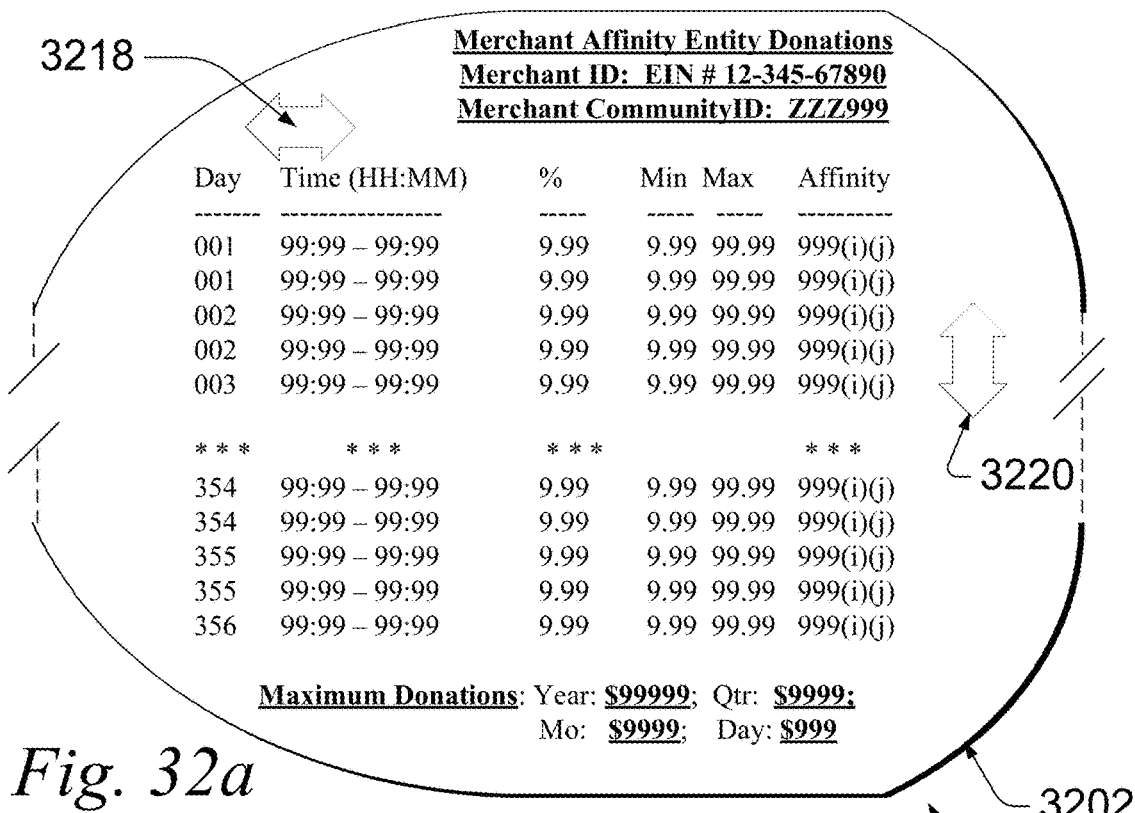
FIGS. 32a-32b illustrate screen shots characterizing exemplary user interfaces for a merchant to designate terms and conditions under which the merchant will make a donation incident to each transaction with each account holder.
Figure 32B:
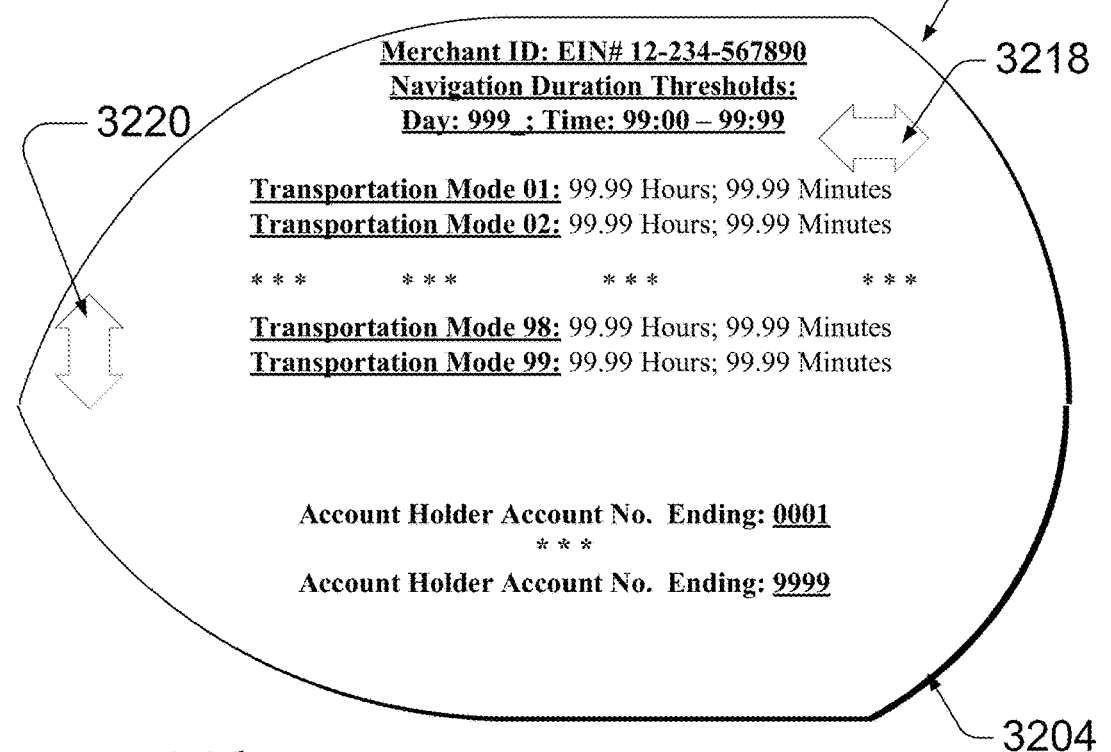

Referring now to FIGS. 32a-32b, screen shots 3202-3204 feature input capture and rendered display fields by which a Merchant (m) 3110, or agent thereof, can input terms and conditions under which the Merchant (m) 3110 is willing to become obligated to make a donation to an Affinity Entity (k) 3196. Each row in screen shot 3202-3204 represent all or a portion of the twenty-four (24) hour day of the 356 calendar days of one (1) year. Columns in each row of the table seen in screen shot 402 are, from left to right, as follows: $1^{st}$: the numerical calendar day of the year; $2^{nd}$-$3^{rd}$: the hyphenated starting and ending of a time period within the calendar day; $4^{th}$: a percentage of a currency amount of any one (1) transaction that the Merchant (m) 3110 will commit to make to an Affinity Entity (k) 3196; $5^{th}$: the minimum currency amount of the transaction before the commitment by the Merchant (m) 3110 to make the donation will arise; $6^{th}$: the maximum amount of donation that the Merchant (m) 3110 is willing to make for any one (1) transaction; and $7^{th}$: an identifier for the Affinity Entity (k) 3196 to whom the Merchant (m) 3110 is to make the donation as described in the row. Note that, in some implementations where the customer picks the affinity entity, then the seventh column may not have data entered. In other implementations, the seventh column is a constant affinity entity that does not change, for example, where the affinity entity is not changeable (e.g., The United Way, the Red Cross, etc.) The bottom of screen shot 3202 allows specification inputs for the Merchant (m) 3110 as to its maximum donation across all Affinity Entities 3196 (k) for any one day, month, quarter of a year, or year.

By way of example, and not by way of limitation, the data input by the Merchant (m) 3110, or agent thereof, for display on screen shot 3202 can obligate a donation to be made to an affinity entity that is higher at some days and times of the calendar year, and lower at other days and times of the calendar year. As such, it may be advantageous for the Merchant (m) 3110 to provide proportional incentives by way of a higher donation incentive for typical slow business time-period of different calendar days and a lower donation incentive for typically busier business time-period of different calendar days.

Much of a community resident's spending occurs near the physical address of the resident's home. As such, it may be economically desirable for a merchant to provide its donation incentive only to those residents whose physical address is close enough to be regularly incentive by the merchant's donation offer, while not offering this incentive to others who would be unlikely, due to physical separation, to regularly shop at the merchant's physical location. Accordingly, and depending upon factors such as the demographics, population density, affluence, etc. of the physical location of the merchant, the merchant may input different navigation ranges for different likely-to-be-frequent shoppers according to any of the transportation modes that these potential-frequent shoppers are likely to take should these shoppers know and understand the merchant's donation incentive offer that is being made to them if they conduct a transaction with the merchant. Accordingly, the merchant may input at screen shot 3204 any of various different travel methods (e.g., walking, automobile, bicycle, mass transit, etc.) and navigation time ranges.

Referring now to FIG. 32b, screen shot 3204 allows a merchant, or its agent, to input one more minimum and maximum navigation times for different times on different days of the year. Each input navigation time range is used to determine whether or not the merchant will be obligated to make a donation to an affinity entity or charity. In practice, information derived from an affirmative authorization response for a transaction between the merchant and an account holder is obtained. This information will contain sufficient data that can be further used to retrieve and/or determine physical address information for the merchant and the account holder. Once physical address information for the merchant and the account holder customer are known, these physical addresses are used with a navigation time algorithm to determine the navigation time from the physical address of the account to the physical address of the merchant. If the determined navigation time is within the input minimum and maximum navigation time for one or more transportation nodes seen in the middle of screen shot 3204 in FIG. 32b, and the date and the date and time of the transaction are within a time period and day as provided by the merchant's input as seen at the top of screen shot 3204, then the merchant will be obligated to make a donation to an affinity entity or charity. Otherwise, the merchant is not obligated to make a donation to an affinity entity or charity.

The one or more different transportation modes seen in screen shot 3204 of FIG. 32b each show minimum and maximum navigation times for different transportation modes. One such transportation mode can be by automobile, another by walking, and other by mass transit, another by a specific combination of different transportation modes (e.g., walk, subway, bus, and walk), etc.

Any of various navigation algorithms, both known and yet to be developed, can be used to determine whether the time, using one or more travel methods, is within the merchant's input navigation time range. The result of the algorithm's determination will ascertain whether or not the merchant and its customer share the same local community or 'neighborhood', and the merchant will accordingly be obligated to make donation when the customer buys something from the merchant. By way of example, the merchant and its customer might be determined to be within the same local community if the automobile drive time, as determined from one or more databases of contemporary cartographic road system information, to navigate between the merchant's brick and mortar store and the customer's residence is less than a predetermined time threshold (e.g., 17 minutes). The navigation algorithm used with the input from screen shot 3204 and the respective physical addresses of merchant and account holder can be varied.

As stated above, the majority share of a community resident's annual spend, at least for some communities, tends to stay in their local community, a merchant in that community would like to incentivize residents in that community to conduct transactions with the merchant. As such, the merchant residing in a heavy-local spending community can choose to make an offer to any such community resident that a donation will be made to one or more affinity entities or charities that are designated by the community resident. The merchant's donation, however, can be made conditional. One such condition can be that the community resident resides in the community where the transaction is conducted with the merchant—where the community residence criteria are made upon a derivation of a specific navigation algorithm. A commercial reason behind the merchant's donation incentive is to attract customers who are likely to be repeat customers who will frequently shop at the merchant's store. Although somewhat dependent upon the type of goods and services provided by the merchant, and the location where the merchant is physically located, the type of customer that is most likely to be a repeat, frequent customer might be determined to be one who lives or works relatively close to the merchant's store. As such, screen shots seen in FIGS. 32a-32b provide input fields to receive incentives directed towards likely frequent shoppers, while disallowing donation incentive to customer who will be unlikely to travel to the merchant's store frequently due to distance, difficulty of the commute, etc.

In some implementations, the obligation for the merchant to donate can be tested in a variety of ways. One test for the customer's residence can be made by calculating the duration of a trip to navigate from a geographic location associated with community resident to a geographic location associated with the merchant. This calculation can be made by using one of more navigation time estimation algorithms. Stated otherwise, the duration of a trip to navigate from a geographic location associated with an account holder to a geographic location associated with the merchant can be calculated by using one of more navigation time estimation algorithms. By way of example, and not by way of limitation, any of the following algorithms, either alone or in combination, can be used when calculating a navigation time between places respectively associated with customer and merchant: (i) Depth-First-Search (DFS); (ii) backtracking search; (iii) Dijkstra's algorithm; (iv) Krushkal's algorithm; (v) Prim's algorithm, (a.k.a. DJP algorithm; (vi) the Jarník algorithm or the Prim-Jarník algorithm; (vii) Reverse-Delete algorithm; (viii) Borůvka's algorithm; (ix) a navigation algorithm now conceived; (x) a navigation algorithm both conceived and reduced to practice; and/or (xi) a navigation algorithm that is developed in the future.

Another way to calculate navigation time between places respectively associated with customer and merchant is to outsource calculations to a public or private web service by transmitting the respective geographic place identifiers to an online navigation service for calculation of navigation time and receive by the navigation time estimate. By way of example, the pair of places can be sent to an online service for subsequent return of a navigation time estimate as are provided by a Google® maps service, a Bing® maps service, a Garmin® maps service, a Delorme maps service, a TomTom® maps service, a Mapquest® maps service. The navigation time estimate calculated, or received back from a web mapping service, can be a time for one or more transportation modes, including walking, automobile or taxi, bicycling, mass transit, or a combination thereof.

As shown in FIGS. 32a-32b, a merchant can designate, if each of several different time periods during each calendar day, the navigation time under which the merchant will make a donation to one or more charities designated by a customer who transacts with the merchant, as well as the corresponding percentage of the transaction amount that the merchant will donate. As such, a merchant can input data such that a greater or lesser donation is made as depends up the time, the day, and the navigation time, by any of several different modes of transportation, between locations respectively associated with the merchant and the customer who transacts with the merchant.

In the case of a geographic area having a high-density population (e.g., a city), a merchant may input small navigation times because local shoppers live close to the merchant's location. As such, the merchant is thereby committing to donate only those charities designed by customers who live close to the merchant—such as in 'walking distance'. Alternatively, in rural and sparsely populated areas, the merchant may input larger navigation times because local shoppers are likely to drive in an automobile as the most reasonable transportation mode to arrive at the merchant's store. As such, the merchant is thereby committing to donate only those charities designed by customers who live close enough to drive a reasonable distance to the merchant's store.

A merchant may choose not to make a donation to any customer who is identified with a residence or location that is too far from the merchant's location to represent potential frequent repeat business. As such, input by the merchant would be unfavorable towards any donation to the designated charities of a shopper who is unlikely to regularly shop at the merchant's business.

The navigation time input by the merchant might preferably be dependent upon the types of goods and services provided by the merchant. Merchant offering only commodity items, such as grocery stores, would be like to input shorter navigation times that merchants typically providing rare and hard-to-find items for which customers are more likely to be willing to make longer commutes in order to make purchases.

FIG. 32b allows a merchant to input different navigation time thresholds for any of several different kinds of transportation modes, such as walking, driving, mass transit, and their combinations. For instance, if at least one of the navigation times from a customer's residence to the merchant's store for different transportation modes is less that an input threshold, then the merchant will make a donation to the customer's identified charities after the customer's transaction with the merchant has been authorized.

FIG. 32b shows a portion of screen shot 3204 where the merchant can input an identifier for one or more customers (e.g., an account or member number), where the merchant will donate to each such customer's identified charities. Note that, in this implementation and variations thereof, the merchant's obligation to donate is fixed regardless of any navigation time that may apply for the customer to travel from the customer's resident to the merchant's store, although other criteria may apply, such as the date and time parameter seen in FIG. 32a which must be satisfied by the date and time of the transaction. Alternatively, input can be made by the merchant per screen shot 3204 in FIG. 32b such the merchant will donate to each identified customer's charities regardless of navigation time or time of day, though within the limits of donation see at the bottom of screen shot 3202.

The local community of each of the merchant and its customer can be determined in still other ways in other implementations, where the merchant's obligation to donate will not be fixed unless the respective physical addresses of merchant and customer are in the same community or neighborhood according to a predetermined algorithm. Any such local community determination can be made in any of several different methods, or combinations thereof, according to the merchant's preference as to what algorithm is mostly likely to attract the most favorable foot traffic to the merchant's brick and mortar store. One such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same or within a predetermined proximity as that of its customer's residence. Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community.

A further alternative implementation will use an algorithm that uses the population density of the merchant's brick and mortar store and the customer's residence, as well as real time transportation data such as traffic conditions, bus and subway availabilities, etc. If the population density exceeds a predetermined density, then the merchant and its customer might be determined to be within the same local community if the time to walk, bicycle or take public transportation between the merchant's brick and mortar store and the customer's residence, as determined from one or more databases of contemporary topographic, mass transit, and/or pedestrian cartographic system information, is less than a predetermined time threshold (e.g., 55 minutes).

Still another such comparison can be whether the merchant's place of business and its customer's residence are proximate or the same according to voting, electoral, or political districts. The district use can be determined by an official method, an unofficial method, or a combination of methods. By way of example, measurements known within the political gerrymander sciences can be used, including but not limited to a minimum district to convex polygon ratio, shortest split line algorithm, minimum isoperimetric quotient, etc.

The local community corresponding to that of the merchant and its customer, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owned and leased properties, etc. Given the foregoing, an algorithm might find that the merchant and its customer are members of the same community, not members of the same community, or are both members of more than one of the same communities as determined by the algorithm.

Similar or different algorithms that are used to determine the respective local community of the merchant and its customer can also be used to determine the local community of an affinity entity such as that shown on FIG. 29 at reference numeral 2922, or as that shown as an Affinity Entity (k) 3196 in FIG. 31, as discussed herein below. These determinations can be performed when a donation term is conditioned upon the location, neighborhood or community of the Affinity Entity (k) 3196.

Data input in the user interface depicted by screen shots 3202-3204 can be stored in one or more of the Merchant DBs 3180 or other location logically accessible, via one or more networks or otherwise, to Donation Audit Web Service 3114. These data can also be automatically pre-loaded for Merchant (m) 3110 via an automatic initiating service (e.g., an data auto-boarding or auto-populating operation) that allows the Merchant (m) 3110 to be automatically entered as a participant in a local community charitable donation program that incentivizes increased local resident foot traffic to each store location of the Merchant (m) 3110 in the local community. Note that auto-boarding allows small and medium sized merchants to enter such a program with little or no effort by using default data in auto-populating information to be used for the merchant's participation in the program.

As seen in FIGS. 32a-32b, each offer input by the merchant to donate to a local affinity entity is not be specific to a particular good or service that the merchant will provide to its customer in a transaction. Rather, the offer is specific to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or a combination of the foregoing. Although some terms of the offer may differ from some terms of the transaction, nevertheless, the merchant's offer to make a donation to a local affinity entity (e.g., a local charity) has the goal of fundamentally providing an incentive that causes, at least in part, the local community resident to navigate to the local merchant's brick and mortar store as new foot traffic, and ultimately to conduct a transaction that brings revenue to the brick and mortar store of the local merchant.

By way of exemplary implementation of data input to a field in screen shot 3202, a received identifier might identify a specific Affinity Entity (k) 3196 that is located in, and provide goods and services to, the borough of Greenwich Village at the southern portion of the geographical island of Manhattan in the city of New York of the State of New York, in the USA. By way of example, and not by way of limitation, an Affinity Entity Code having the character string "105(064) (q2e)", which would be input in the $7^{th}$ column of screen shot 3202, could have an interpretation where '105' represents the United States of America, the index '064' represents the state of New York, "q" represents the City of New York, "2" represents the combined boroughs of Manhattan, and "e" represents the borough of Greenwich Village at the southern portion of the geographical island of Manhattan in the city of New York of the State of New York. The name of the specific Affinity Entity (k) 3196 represented the character string "(105) (064) (q2e)" can be the Washington Square Food Bank, which may be located in, and provide goods and services to, the borough of Greenwich Village at the southern portion of the geographical island of Manhattan in the city of New York of the State of New York, in the USA.

Note that the merchant can use screen shot 3202 to specify multiple community IDs each representing a geographic location where the Account Holder (p) 3108 either has a residence or operates a business in the geographic location. Also note that, for each such community ID specified by the merchant, the second column of the rows of screen shot 3204 in FIG. 32b will preferably add up to 100%, thereby provide a percentage the donation made by the Merchant (m) 3110 with whom the Account Holder (p) 3108 conducting a transaction.

For screen shots 3202-3204, input and selection of data for each Affinity Entity can be via a typical user experience including but not limited to keyboard data entry, pull down menus, pictograph optical scanning with a cellular telephony device as read from print or electronic media rendering, etc. Horizontal 3218 and vertical 3220 panning can be user activated to move that portion of the display being rendered horizontally and vertically, respectively.

Referring now to FIGS. 33a-33b, a screen shot 3302 features input and displays fields by which an Account Holder (p) 3108, or agent thereof, can direct a third party donor, such as a Merchant (n) 3110 with whom the Account Holder (p) 3108 is conducting a transaction, to become legally bound to make a donation to an Affinity Entity (k) 3190. Alternatively, or in combination, these data fields can be auto-populated in an auto-boarding process that facilitates immediate participation by Account Holder (p) 3108 in the above described merchant donation program. Each row in screen shot 3302 represents a different affinity entity. Other donors so directed by the Account Holder (p) 3108's data entry can optionally include each issuer (j) 3104, the transaction handler 3102, and the acquirer (i) 3106. The Affinity Entity (k) 3196 is expressed in each row by an integer indexed in both 'i' and 'j' variables. By way of example, such an indexing system might identify a specific Affinity Entity (k) 3196 by the code 105(064) (q2e), where '105' represents the international charitable organization "United Way", the index '064' represents that organization's affiliated charity within the United States of America, and the index 'q2e' represents the borough of Greenwich Village at the southern portion of the geographical island of Manhattan in the city of New York of the State of New York.

Other columns in each row of the table seen in screen shot 3302 are, from left to right, as follows: $1^{st}$: the percentage of the donor's donation that the account holder directs to be donated to the charity identified in the $2^{nd}$ column; $3^{rd}$: a yes or no indication whether the account holder will match the donor's donation to that charity; and the 4$^{th}$ through the 7$^{th}$ columns: the maximum currency amounts that the Account Holder will commit to give to the identified charity for the current year, quarter, month and day, respectively. The bottom of screen shot 3302 allows a customer to specify the maximum total of all matching contributions to all affinity entities of charities that the Account Holder (p) 3108 is willing to commit for the current year, quarter, month and day, respectively.

Screen shot 3304 in FIG. 33*b* shows a plurality of rows. Each row includes an affinity entity, the percentage of any donation that the account holder requires to be made to that affinity entity, an identifier for a community associated with the affinity entity, and a description or name of the affinity entity. Note that the sum of the second column of the row must equal one hundred percent (100%).

For the Account Holder (p) 3108 to make the matching donations to the Affinity Entities that are specified in screen shot 3302 of FIG. 33*a*, the Account Holder (p) 3108's issuer (j) 3104 can pay the Affinity Entity (e) 3188 and place a debit in that currency amount on the Account Holder (p) 3108's periodic revolving credit statement. The Account Holder (p) 3108, upon receipt of the statement, can thereafter make a total payment to the issuer (j) 3104 of the currency amount of the donation that appears as a debit on the statement along with the other credit charges that also appear on the Account Holder (p) 3108's statement.

For screen shots 3202-3304, input and selection of data for each charity can be via a typical user experience including but not limited to keyboard data entry, pull down menus, pictograph optical scanning with a cellular telephony device as read from print or electronic media rendering, etc. Horizontal 3218, 3318 and vertical 3220, 3320 panning icons can be user activated to move the rendered display, respectively, on screen shots 3202-3304.

The Account Holder (p) 3108 and the Merchant (m) 3110 can change or disable a donation commitment at any time by accessing a server that serves web pages rendering screen shots 3202-3304. Thus, charitable donation commitments can be easily and instantly, and both enabled or disabled, using the real time user interface. By way of example, and not by way of limitation, one or more of such servers can be hosted by the Donation Audit Web Service 3114 seen in FIG. 31.

In some implementations, the fields provided by screen shot 3302 allow the customer to specify one or more affinity entities in their local community to which donations are to be made by merchants with whom the customer conducts transactions. In such implementations, each merchant is given notice of its total periodic donations. Such notice, however, can optionally be given without providing the merchant with any notice or knowledge as to the specific identity of those affinity entities that are to be the recipients of its donations. The donation mechanism can be set up such that the merchant makes blind donations, either directly or indirectly, to affinity entities in the local community of both the merchant and its customer who selects those local community affinity entities. Accordingly, the donation mechanism can leave direction of merchant's donations fully within the discretion of the merchant's customers, limited only by the restriction that the customer can only select from among those affinity entities that serve the local community that is in common to both the merchant and the customer, while leaving the actual amount of the merchant's donation fully within the discretion of the merchant as shown with respect to FIGS. 32*a*-32*b*.

Optionally, a further limitation on those local community affinity entities that can be selected by the customer can include an algorithm that accesses a rating, and/or that derives a rating, for an affinity entity. The algorithm can use one or more ratings given by one or more charity rating organizations, where the algorithm's result is used to determine whether or not the affinity entity is eligible for participation in the implementation as a registered affinity entity that is selectable by local community customers. The ratings can be retrieved by Donation Audit Web Service 3114 by its access to one or more databases where such ratings are input and maintained. Example of charity rating organizations which provide one or more ratings that could be used for various disclosed implementations include Guide Star, Charity Navigator, Give Well, Evangelical Council for Financial Accountability (ECFA), the Better Business Bureau Wise Giving Alliance Standards for Charity Accountability of the Council of Better Business Bureaus, Inc., and the like that now exist or may exist in the further. Moreover, the reader will understand that current or future developed algorithms for assessing local community affinity entities can be used to determine whether or not affinity entities are eligible for participation in the disclosed implementations as registered affinity entities that are selectable by local community customers and/or local merchants.

Still another implementation relates to an open loop cashless payment system that incents an account holder to transact with a merchant who agrees to make an auditable donation to an affinity entity or charity when the transaction is conducted on an account issued to the account holder. The account holder can direct the donation to a specific charity within a predetermined geographically determined community where the transaction was physically conducted. The account holder can register an obligation to make a donation matching that of the merchant, where the account holder's donation is initially paid by the account's issuer for reimbursement by the account holder to the issuer after the account holder receives their account statement. The merchant's acquirer, the issuer, and a transaction handler for the issuer and acquirer can also make donations as directed by the account holder. Various donor and account holder directed business rules limit the total currency amount of donations over specific calendar periods.

Referring again now to FIG. 31, further illustrations are seen of a telecommunications network that may make use of any suitable telecommunications network and may involve different hardware, different software and/or different protocols then those discussed below. FIG. 31 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments. These transactions are processed through the network's authorization, clearing and settlement services. Authorization occurs when an issuer approves or declines a sales transaction before a purchase is finalized or cash is dispersed. Clearing occurs when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice-the first time with only information needed for an authorization decision, an again later with additional information for clearing and settlement. A single message transaction is sent once for authorization and contains clearing and settlement information as well. Typically, authorization, clearing and settlement all occur on-line.

Referring now to FIGS. 29, 30, and 34-35, FIG. 31 includes access points 3130, 3132 between Transaction Handler 3102 and each Acquirer (i) 3106 and Issuer (j) 3104. Other entities such as drawee banks and third party authorizing agents may also connect to the financial; network through an access point (not shown). An interchange center has systems, such as those seen at reference numeral 3440 see in FIG. 34, so as to be a data processing center that may be located anywhere in the world. Each interchange center houses the computer system that performs the network transaction processing. The interchange center serves as the control point for the telecommunication facilities of the network, which comprises high-speed leased lines or satellite connections, for instance as may be based on IBM SNA protocol. Preferably, the communication lines that connect an interchange center (Transaction Handler 3102) to remote entities use dedicated high-bandwidth telephone circuits or satellite connections, for instance as may be based on the IBM SNA-LU0 communication protocol. Messages are sent over these lines using any suitable implementation of the ISO 8583 standard.

Access points 3130, 3132 are typically made up of small computer systems located at a processing center that interfaces between the center's host computer and the interchange center system 3440. The access point facilitates the transmission of messages and files between the host and the interchange center supporting the authorization, clearing and settlement of transaction. Telecommunication links between the Acquirer (i) 3196 and its access point 3132, and between the access point 3130 and Issuer (j) 3104 are typically local links within a center and use a proprietary message format as preferred by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. In addition, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 34:
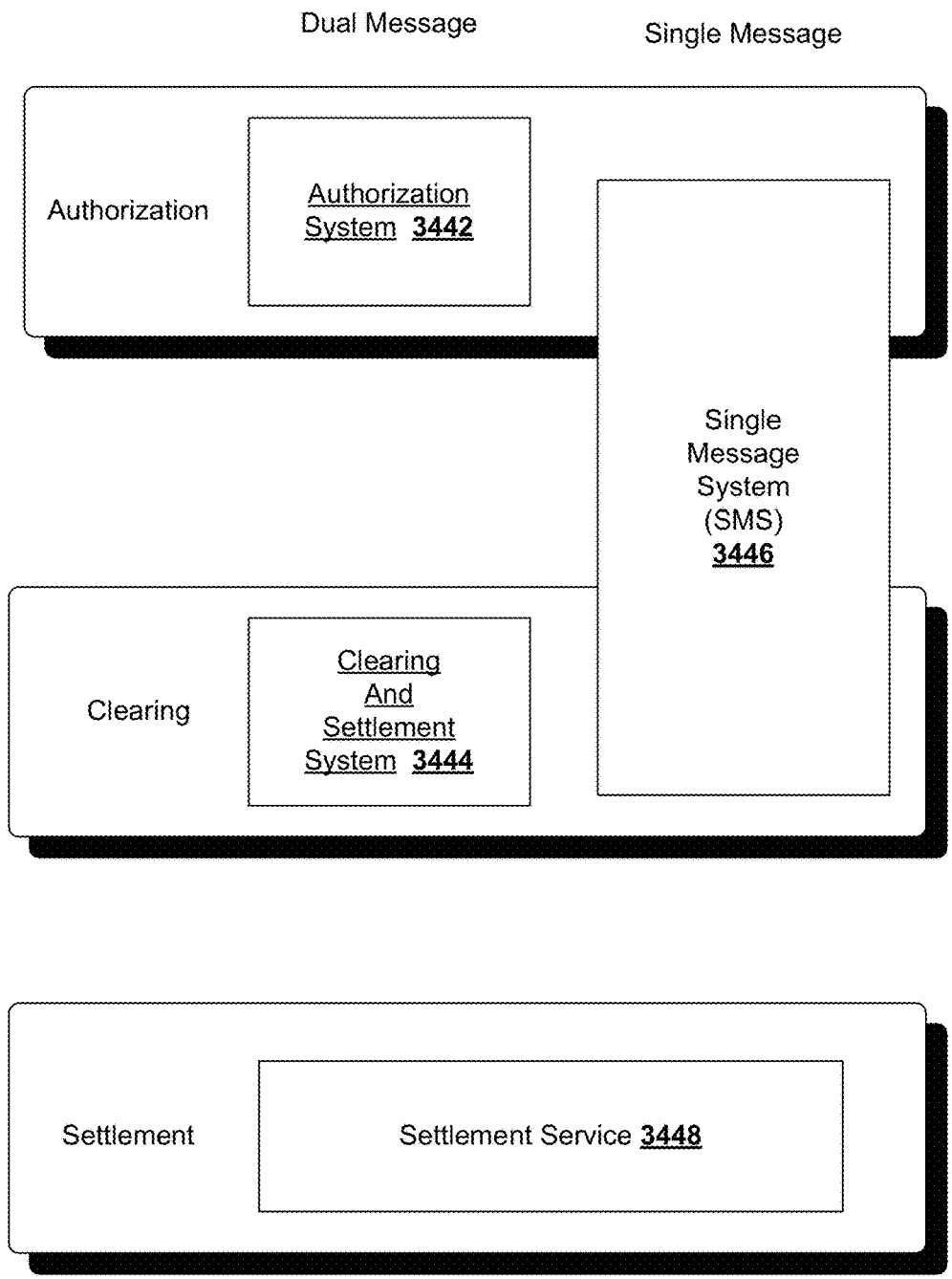
FIG. 34 illustrates exemplary systems housed within an interchange center to provide online and offline transaction processing for transactions conducted using the payment processing system illustrated in FIG. 31.

FIG. 34 illustrates Interchange Center systems 3440 housed within an interchange center to provide on-line and off-line transaction processing. For dual message transaction, authorization system 3442 provides authorization. Authorization system 3442 supports on-line and off-line functions, and its file includes internal systems tables, a customer database and a merchant central file. The on-line functions of system 3442 support dual message authorization processing. This processing involves routing, account holder and card verification and stand-in processing, and other functions such as file maintenance. Reporting includes authorization reports, exception file and advice file reports, POS reports and billing reports. A bridge from system 3442 to a Single Message System (SMS) 3446 makes it possible for issuers and acquirers to use system 3442 to communicate with other issuers and acquirers using system 3446 and access the SMS gateways to outside networks.

Clearing and settlement system 3444 clears and settles previously authorized dual message transactions. System 3444 collects financial and non-financial information and distributes reports between members. It also calculates fees, charges and settlement totals and produces reports to help with reconciliation. A bridge forms an interchange between system 3444 processing centers and system 3448 processing centers.

Single message system 3446 processes full financial transactions and can also process dual message authorization and clearing transactions, as well as communicate with system 3442 using a bridge and accesses outside networks as required. System 3446 processes cashless issued account-based acquired transactions, for instance Visa, Plus, Interlink. Maestro, Cirrus, and others. By way of example, SMS files comprise internal system tables that control system access and processing, and an account holder database, which contains files of account holder data used for Personal IDentifier (PIN) verification and stand-in processing authorization. System 3446 has on-line functions that perform real-time account holder transaction processing and exception processing for authorization as well as full financial transactions. System 3446 also accumulates reconciliation and settlement totals. System 3446 also has off-line functions that process settlement and funds transfer requests and provide settlement and activities reporting. Settlement service 3448 consolidates the settlement functions of system 3444 and 3446 for cashless issued account-based acquired transactions into a single service for all products and services. Clearing continues to be performed separately by system 3444 and system 3446.

Figure 35:
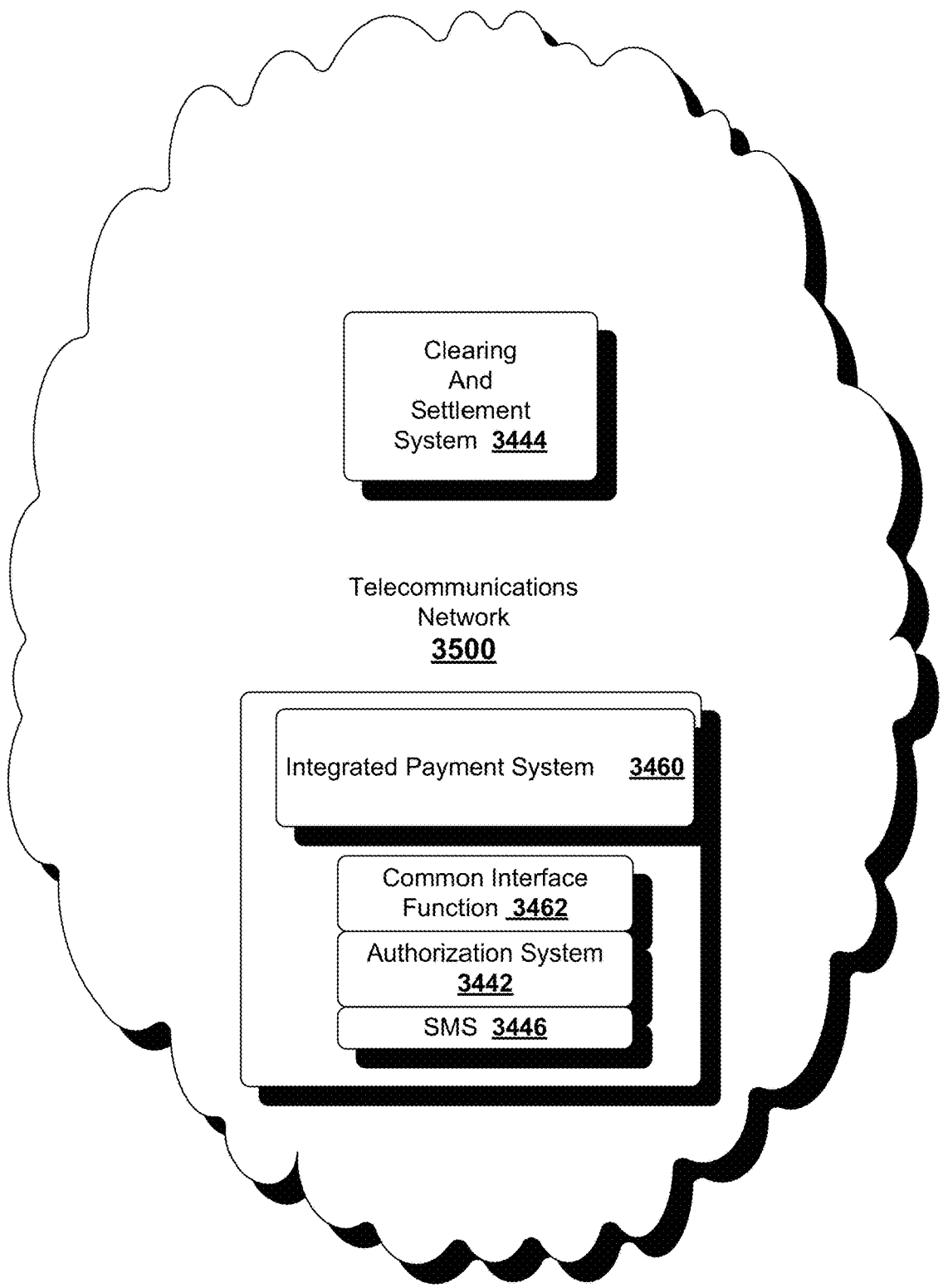
FIG. 35 illustrates further exemplary details of the systems illustrated in FIG. 34.

FIG. 35 illustrates another view of components of FIG. 34 in a telecommunications network 3500. Integrated payment system 3460 is the primary system for processing all on-line authorization and financial request transactions. System 3460 reports both dual message and single message processing. In both cases, settlement occurs separately. The three main software components are the common interface function 3462, authorization system 3442 and single message system 3446.

Common interface function 3462 determines the processing required for each message received at an interchange center. It chooses the appropriate routing, based on the source of the message (system 3542, 3444 or 3446), the type of processing request and the processing network. This component performs initial message editing, and, when necessary, parses the message and ensures that the content complies with basic message construction rules. Common interface function 3462 routes messages to their system 3442 or system 3446 destinations.

Referring again now to FIGS. 29, 31, and 34-35, further illustrations are seen of a telecommunications network that may make use of any suitable telecommunications network and may involve different hardware, different software and/or different protocols then those discussed below. FIGS. 29, 31, and 34-35 can include a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments. These transactions are processed through the network's authorization, clearing and settlement services. Authorization occurs when an issuer approves or declines a sales transaction before a purchase is finalized or cash is dispersed. Clearing occurs when a transaction is delivered from an acquirer to an issuer for posting to the customer's account. Settlement is the process of calculating and determining the net financial position of each member for all transactions that are cleared. The actual exchange of funds is a separate process.

Permutations of Implementations

It is intended that implementations illustrated in FIGS. 1-28 can be used in with implementations illustrated in FIGS. 29-35 in one or more permutations thereof, where each such permutation is a variation of such implementations in which one implementation or a set or number of such implementation are performed by those entities and resources illustrated in FIGS. 1-35.

In at least some implementations, the system may include one or more processors (e.g., digital signal processors, microprocessors, etc.), each being adapted to execute instructions to perform at least some of the methods, operations, and processes described herein with respect to the figures. Such instructions may be stored or held in storage media as instructions. Moreover, a non-transient computer readable medium can include such software as instructions executed by hardware to perform steps of methods described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described databases for storage media may comprise primary, secondary, and/or tertiary storage media. Primary storage media may include memory such as random access memory and/or read-only memory, for example. Secondary storage media may include a mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in non-transitory computer readable medium that can be loaded onto a general-purpose computer, a special purpose computer, or other programmable apparatus.

In the preceding detailed description, numerous specific details have been set forth to provide a thorough understanding of claimed subject matter. However, it will be understood by those skilled in the art that claimed subject matter may be practiced without these specific details. In other instances, methods and systems that would be known by one of ordinary skill have not been described in detail so as not to obscure claimed subject matter.

What is claimed is:

1. An Internet server hardware system for enabling a loyalty program to be operable via the Internet to engage in real time data communications with one of more account issuers respectively issuing accounts to account holders and one or more merchant acquirers respectively issuing accounts to merchants, the Internet server hardware system further enabling the loyalty program to be linked to the one or more account issuers, and thereby their account holders, by operation of a loyalty system, the loyalty system being operable to enable the creation, implementation and management of one or more loyalty programs that provide benefits to members of the loyalty programs in connection with transactions between the account holders and one or more merchants associated with the loyalty system, wherein there are registered on the loyalty system one or more account issuers of an account issuer system, wherein there are registered on the loyalty system one or more merchant acquirers of a merchant acquirer system associated with the one or more account issuers, wherein there are registered a plurality of the account holders as members of the loyalty program, wherein the operator of the loyalty system, the one or more account issuers, and the merchants establish rules for accrual and processing of benefits from the merchants to account holders associated with the one or more account issuers in connection with transactions between the account holders and the merchants with the loyalty system, and wherein the Internet server hardware system comprises:

means for serving for delivery to a web browser corresponding to an e-commerce customer who is an account holder, for each of a plurality of received search terms, a virtual shopping cart and a webpage of a merchant e-commerce website, wherein the serving is performed such that the merchant e-commerce website served to the web browser logically corresponds to a merchant domain name that is limited to one of a plurality of different merchant domain names respectively and logically corresponding to other said merchant e-commerce websites that are logically associated, and in network communication, with an umbrella domain site corresponding to an umbrella specialty site network that includes a shared server farm wherein there is stored:
  a consumer profile corresponding to each said e-commerce customer; and
  each said virtual shopping cart corresponding to each said e-commerce customer, wherein the storage at the shared server farm is in network communication with the other said merchant e-commerce websites;
  whereby a payment from each said e-commerce customer can be received by only one said merchant domain name for an entirety of the contents of each said virtual shopping cart from the corresponding said e-commerce customer such that each said e-commerce customer can make a full payment for the entirety of the contents of the corresponding said virtual shopping cart at any of the other said merchant e-commerce websites even though the virtual shopping cart may contain products from multiple different said merchant e-commerce websites;
means for retrieving, from the umbrella domain site, information pertaining to:
  the e-commerce customer;
  contents of the virtual shopping cart that includes a plurality of different items each sold by a different said merchant e-commerce website; and
  payment information pertaining to a payment received by only one said merchant domain name for an entirety of the contents of the virtual shopping cart from the e-commerce customer;
means for preparing, using the retrieved customer information, an invoice for the entirety of the contents of the virtual shopping cart, wherein the preparing is performed such that the invoice attributes a partial payment, derived from the payment information, to each of a plurality of merchants respectively corresponding each said item in the virtual shopping cart such that a sum of the partial payments equals to the payment received by the one said merchant domain name for the entirety of the contents of the virtual shopping cart;
means for receiving, for each said partial payment, acknowledgement of:
  an authorization request for a transaction between the account holder and the corresponding said merchant; and
  an authorization response to the authorization request sent from the account issuer corresponding to the account holder to the merchant acquirer corresponding to the corresponding said merchant; and
means, for each said partial payment for which the authorization response has been authorized by the account issuer corresponding to the account holder, for deriving, using a business rule, a donation to be made to an affinity entity by each of the plurality of merchants respectively corresponding each said item in the virtual shopping cart.

2. The Internet server hardware system as defined in claim 1, wherein each said item offered for sale at each said merchant e-commerce website is mutually exclusive to each said item offered for sale at each other said merchant e-commerce website.

3. The Internet server hardware system as defined in claim 1, wherein the steps further comprise transmitting a message to a logical address containing the donation to be made by the corresponding said merchant to the affinity entity.

4. The Internet server hardware system as defined in claim 1, wherein the hardware is an Internet server hardware system for dynamically generating loyalty program communications with a web-enabled computing device.

5. The Internet server hardware system as defined in claim 4, wherein the web-enabled computing device is a web-enabled mobile computing device.

6. A non-transient computer readable medium comprising software executed by the Internet server hardware system as defined in claim 1.

7. An Internet server hardware system for enabling a loyalty program to be operable via the Internet to engage in real time data communications with one of more account issuers respectively issuing accounts to account holders and one or more merchant acquirers respectively issuing accounts to merchants, the Internet server hardware system further enabling the loyalty program to be linked to the one or more account issuers, and thereby their account holders, by operation of a loyalty system, the loyalty system being operable to enable the creation, implementation and management of one or more loyalty programs that provide benefits to members of the loyalty programs in connection with transactions between the account holders and one or more merchants associated with the loyalty system, wherein there are registered on the loyalty system one or more account issuers of an account issuer system, wherein there are registered on the loyalty system one or more merchant acquirers of a merchant acquirer system associated with the one or more account issuers, wherein there are registered a plurality of the account holders as members of the loyalty program, wherein the operator of the loyalty system, the one or more account issuers, and the merchants establish rules for accrual and processing of benefits from the merchants to account holders associated with the one or more account issuers in connection with transactions between the account holders and the merchants with the loyalty system, and wherein the Internet server hardware system comprises:

means for serving for delivery to a web browser corresponding to an e-commerce customer who is an account holder, for each of a plurality of received search terms, a virtual shopping cart and a webpage of a merchant e-commerce website, wherein the serving is performed such that:
the merchant e-commerce website served to the web browser logically corresponds to a merchant domain name that is limited to one of a plurality of different merchant domain names respectively and logically corresponding to the other said merchant e-commerce websites that are logically associated, and in network communication, with an umbrella domain site having a primary domain name of which the plurality of different merchant domain names are not subdomain names, wherein the umbrella domain site corresponds to an umbrella specialty site network that includes a shared server farm wherein there is stored:
a consumer profile corresponding to each said e-commerce customer; and
each said virtual shopping cart corresponding to each said e-commerce customer, wherein the storage at the shared server farm is in network communication with the other said merchant e-commerce websites;
whereby a payment from each said e-commerce customer can be received by only one said merchant domain name for an entirety of the contents of each said virtual shopping cart from the corresponding said e-commerce customer such that each said e-commerce customer can make a full payment for the entirety of the contents of the corresponding said virtual shopping cart at any of the other said merchant e-commerce websites even though the virtual shopping cart may contain products from multiple different said merchant e-commerce websites; and
each said merchant e-commerce website offers for sale items mutually exclusive to items offered for sale by the other said merchant e-commerce websites;
means for retrieving, from the umbrella domain site, information pertaining to:
the e-commerce customer;
contents of the virtual shopping cart that includes a plurality of different items each sold by a different said merchant e-commerce website; and
payment information pertaining to a payment received by only one said merchant domain name for an entirety of the contents of the virtual shopping cart from the e-commerce customer;
means for preparing, using the retrieved customer information, an invoice for the entirety of the contents of the virtual shopping cart, wherein the preparing is performed such that the invoice attributes a partial payment, derived from the payment information, to each of a plurality of merchants respectively corresponding each said item in the virtual shopping cart such that a sum of the partial payments equals to the payment received by the one said merchant domain name for the entirety of the contents of the virtual shopping cart, wherein;
the e-commerce customer is associated with a physical address stored as network accessible information stored in the umbrella domain site;
each said merchant domain name corresponds to a merchant associated with a physical address stored as network accessible information stored in the umbrella domain site; and
the serving further comprises:
for each of the plurality of received search terms:
comparing the received search term to metadata associated with the plurality of different merchant domain names; and
when:
the received search term matches the metadata associated with one said merchant e-commerce website, then accessing the umbrella domain site to retrieve the respective physical addresses of the e-commerce customer and the merchant corresponding to the matching one said merchant e-commerce website; and
when the respective physical addresses of the e-commerce customer and the merchant corresponding to the matching one said merchant e-commerce website are determined to be located within a same community by a predetermined community definition, then serving for delivery to the web browser corresponding to the e-commerce customer the matching said webpage of the merchant e-commerce website;

means for receiving, for each said partial payment, acknowledgement of:
  an authorization request for a transaction between the account holder and the corresponding said merchant; and
  an authorization response to the authorization request sent from the account issuer corresponding to the account holder to the merchant acquirer corresponding to the corresponding said merchant; and
means, for each said partial payment for which the authorization response has been authorized by the account issuer corresponding to the account holder, for transmitting a message to a logical address corresponding to the e-commerce customer containing information about a donation to be made by the corresponding said merchant to an affinity entity, wherein the donation is derived from a business rule.

8. The Internet server hardware system as defined in claim 7, wherein each said item offered for sale at each said merchant e-commerce website is mutually exclusive to each said item offered for sale at each other said merchant e-commerce website.

9. The Internet server hardware system as defined in claim 7, wherein the predetermined community definition is that the respective physical addresses of the e-commerce customer and the merchant corresponding to the matching one said merchant e-commerce website are within an area selected from the group consisting of:
  the same governmentally issued postal code;
  the same political or legal division that is at least one of a province, state, county, prefecture, city, city-state, and borough; and
  an area separated by a distance navigable by a predetermined transportation mode within a predetermined maximum navigation time as determined by a predetermined a navigation time algorithm.

10. A non-transient computer readable medium comprising software executed by the Internet server hardware system to as defined in claim 7.

11. A non-transitory computer-readable medium or media having stored thereon computer interpretable instructions which when executed by a server perform a method for enabling a loyalty program to engage in real time data communications with one of more account issuers respectively issuing accounts to account holders and one or more merchant acquirers respectively issuing accounts to merchants, the method further enabling the loyalty program to be linked to the one or more account issuers, and thereby their account holders, by operation of a loyalty system, the loyalty system being operable to enable the creation, implementation and management of one or more loyalty programs that provide benefits to members of the loyalty programs in connection with transactions between the account holders and one or more merchants associated with the loyalty system, wherein there are registered on the loyalty system one or more account issuers of an account issuer system, wherein there are registered on the loyalty system one or more merchant acquirers of a merchant acquirer system associated with the one or more account issuers, wherein there are registered a plurality of the account holders as members of the loyalty program, wherein the operator of the loyalty system, the one or more account issuers, and the merchants establish rules for accrual and processing of benefits from the merchants to account holders associated with the one or more account issuers in connection with transactions between the account holders and the merchants with the loyalty system, and wherein the Internet server hardware system comprises:
  means for serving for delivery to a web browser corresponding to an e-commerce customer, for each of a plurality of received search terms, a virtual shopping cart and a webpage of a merchant e-commerce website, wherein the serving is performed such that the merchant e-commerce website served to the web browser logically corresponds to a merchant domain name that is limited to one of a plurality of different merchant domain names respectively and logically corresponding to other said merchant e-commerce websites that are logically associated, and in network communication, with an umbrella domain site corresponding to an umbrella specialty site network that includes a shared server farm wherein there is stored:
    a consumer profile corresponding to each said e-commerce customer; and
    each said virtual shopping cart corresponding to each said e-commerce customer, wherein the storage at the shared server farm is in network communication with the other said merchant e-commerce websites;
  whereby a payment from each said e-commerce customer can be received by only one said merchant domain name for an entirety of the contents of each said virtual shopping cart from the corresponding said e-commerce customer such that each said e-commerce customer can make a full payment for the entirety of the contents of the corresponding said virtual shopping cart at any of the other said merchant e-commerce websites even though the virtual shopping cart may contain products from multiple different said merchant e-commerce websites;
  means for retrieving, from the umbrella domain site, information pertaining to:
    the e-commerce customer;
    contents of the virtual shopping cart that includes a plurality of different items each sold by a different said merchant e-commerce website; and
    payment information pertaining to a payment received by only one said merchant domain name for an entirety of the contents of the virtual shopping cart from the e-commerce customer;
  means for preparing, using the retrieved customer information, an invoice for the entirety of the contents of the virtual shopping cart, wherein the preparing is performed such that the invoice attributes a partial payment, derived from the payment information, to each of a plurality of merchants respectively corresponding each said item in the virtual shopping cart such that a sum of the partial payments equals to the payment received by the one said merchant domain name for the entirety of the contents of the virtual shopping cart;
  means for receiving, for each said partial payment, acknowledgement of:
    an authorization request for a transaction between the account holder and the corresponding said merchant; and
    an authorization response to the authorization request sent from the account issuer corresponding to the account holder to the merchant acquirer corresponding to the corresponding said merchant; and
  means, for each said partial payment for which the authorization response has been authorized by the account issuer corresponding to the account holder, for deriving, using a business rule, a donation to be made to an affinity entity.

12. The non-transitory computer-readable medium or media as defined in claim 11, wherein each said item offered for sale at each said merchant e-commerce website is mutually exclusive to each said item offered for sale at each other said merchant e-commerce website.

13. The non-transitory computer-readable medium or media as defined in claim 11, wherein the server further comprises means for transmitting a message to a logical address containing the donation to be made to the affinity entity by each said merchant respectively corresponding each said item in the virtual shopping cart.

14. The non-transitory computer-readable medium or media as defined in claim 11, wherein the server is an Internet server hardware system for dynamically generating loyalty program communications with a web-enabled computing device.

15. The non-transitory computer-readable medium or media as defined in claim 11, wherein the web-enabled computing device is a web-enabled mobile computing device.

16. An Internet server hardware system for enabling a loyalty program to be operable via the Internet to engage in real time data communications with one of more account issuers respectively issuing accounts to account holders and one or more merchant acquirers respectively issuing accounts to merchants, the method further enabling the loyalty program to be linked to the one or more account issuers, and thereby their account holders, by operation of a loyalty system, the loyalty system being operable to enable the creation, implementation and management of one or more loyalty programs that provide benefits to members of the loyalty programs in connection with transactions between the account holders and one or more merchants associated with the loyalty system, wherein there are registered on the loyalty system one or more account issuers of an account issuer system, wherein there are registered on the loyalty system one or more merchant acquirers of a merchant acquirer system associated with the one or more account issuers, wherein there are registered a plurality of the account holders as members of the loyalty program, wherein the operator of the loyalty system, the one or more account issuers, and the merchants establish rules for accrual and processing of benefits from the merchants to account holders associated with the one or more account issuers in connection with transactions between the account holders and the merchants with the loyalty system, and wherein the Internet server hardware system comprises:

means for serving for delivery to a web browser corresponding to an e-commerce customer who is an account holder, for each of a plurality of received search terms, a virtual shopping cart and a webpage of a merchant e-commerce website, wherein the serving is performed such that:

the merchant e-commerce website served to the web browser logically corresponds to a merchant domain name that is limited to one of a plurality of different merchant domain names respectively and logically corresponding to the other said merchant e-commerce websites that are logically associated, and in network communication, with an umbrella domain site having a primary domain name of which the plurality of different merchant domain names are not subdomain names, wherein the umbrella domain site corresponds to an umbrella specialty site network that includes a shared server farm wherein there is stored:

a consumer profile corresponding to each said e-commerce customer; and each said virtual shopping cart corresponding to each said e-commerce customer, wherein the storage at the shared server farm is in network communication with the other said merchant e-commerce websites;

whereby a payment from each said e-commerce customer can be received by only one said merchant domain name for an entirety of the contents of each said virtual shopping cart from the corresponding said e-commerce customer such that each said e-commerce customer can make a full payment for the entirety of the contents of the corresponding said virtual shopping cart at any of the other said merchant e-commerce websites even though the virtual shopping cart may contain products from multiple different said merchant e-commerce websites; and each said merchant e-commerce website offers for sale items mutually exclusive to items offered for sale by the other said merchant e-commerce websites;

means for retrieving, from the umbrella domain site, information pertaining to:

the e-commerce customer;

contents of the virtual shopping cart that includes a plurality of different items each sold by a different said merchant e-commerce website; and payment information pertaining to a payment received by only one said merchant domain name for an entirety of the contents of the virtual shopping cart from the e-commerce customer;

means for preparing, using the retrieved customer information, an invoice for the entirety of the contents of the virtual shopping cart, wherein the preparing is performed such that the invoice attributes a partial payment, derived from the payment information, to each of a plurality of merchants respectively corresponding each said item in the virtual shopping cart such that a sum of the partial payments equals to the payment received by the one said merchant domain name for the entirety of the contents of the virtual shopping cart, wherein;

the e-commerce customer is associated with a physical address stored as network accessible information stored in the umbrella domain site;

each said merchant domain name corresponds to a merchant associated with a physical address stored as network accessible information stored in the umbrella domain site; and the serving further comprises:

for each of the plurality of received search terms:

comparing the received search term to metadata associated with the plurality of different merchant domain names; and when:

the received search term matches the metadata associated with one said merchant e-commerce website, then accessing the umbrella domain site to retrieve the respective physical addresses of the e-commerce customer and the merchant corresponding to the matching one said merchant e-commerce website; and when the respective physical addresses of the e-commerce customer and the merchant corresponding to the matching one said merchant e-commerce website are determined to be located within a same community by a predetermined community definition, then serving for delivery to the web browser corresponding to the e-commerce customer the matching said webpage of the merchant e-commerce website;

means for receiving, for each said partial payment, acknowledgement of:
an authorization request for a transaction between the account holder and the corresponding said merchant; and
an authorization response to the authorization request sent from the account issuer corresponding to the account holder to the merchant acquirer corresponding to the corresponding said merchant; and for each said partial payment for which the authorization response has been authorized by the account issuer corresponding to the account holder, means for deriving, using a business rule, a donation to be made by each of the plurality of merchants respectively corresponding each said item in the virtual shopping cart.

17. The Internet server hardware system as defined in claim 16, wherein:
the donation is designed to be made to an affinity entity selected by the e-commerce customer; and
the affinity entity has a geographic location in the same local community as the e-commerce customer.

18. The Internet server hardware system as defined in claim 16, wherein each said item offered for sale at each said merchant e-commerce website is mutually exclusive to each said item offered for sale at each other said merchant e-commerce website.

* * * * *